(12) United States Patent
Haggie et al.

(10) Patent No.: US 12,443,594 B1
(45) Date of Patent: Oct. 14, 2025

(54) SYSTEM MODIFICATION OF A SEARCH-RELATED STATEMENT IN A GRAPHICAL USER INTERFACE

(71) Applicant: Splunk Inc., San Francisco, CA (US)

(72) Inventors: Thomas Haggie, Victoria (CA); Justin Lew, Burnaby (CA); Jonathan Ng, Vancouver (CA); Faya Peng, San Francisco, CA (US); Ioan Popa, Fremont, CA (US); Jacob Sebastian Stark, San Jose, CA (US); Matthew Kevin Stokes, Waterloo (CA)

(73) Assignee: SPLUNK Inc., San Francisco, CA (US)

( * ) Notice: Subject to any disclaimer, the term of this patent is extended or adjusted under 35 U.S.C. 154(b) by 268 days.

(21) Appl. No.: 18/162,598

(22) Filed: Jan. 31, 2023

(51) Int. Cl.
*G06F 16/00* (2019.01)
*G06F 16/242* (2019.01)
*G06F 40/30* (2020.01)

(52) U.S. Cl.
CPC ...... *G06F 16/2425* (2019.01); *G06F 16/2423* (2019.01); *G06F 40/30* (2020.01)

(58) Field of Classification Search
CPC ... G06F 16/2425; G06F 16/2423; G06F 40/30
See application file for complete search history.

(56) References Cited

U.S. PATENT DOCUMENTS

| | | | |
|---|---|---|---|
| 2009/0222438 A1* | 9/2009 | Strandell | G06F 16/9537 707/999.005 |
| 2018/0150565 A1* | 5/2018 | Asgekar | G06F 16/29 |
| 2019/0121855 A1* | 4/2019 | Alexander | G06F 16/248 |

* cited by examiner

*Primary Examiner* — Paul Kim
(74) *Attorney, Agent, or Firm* — Kilpatrick Townsend & Stockton LLP

(57) ABSTRACT

A system generates a user interface that enables a user to generate a chart from one or more statements of a data processing package. Via one or more user interactions with the user interface, the system may receive one or more chart parameters for a chart. Using a statement from the data processing package and the one or more chart parameters, the system may generate an additional statement and append the generated statement to the data processing package to form an enriched data processing package. The system may communicate the enriched data processing package to a search service for execution. The system may display the results in an interactive chart.

20 Claims, 17 Drawing Sheets

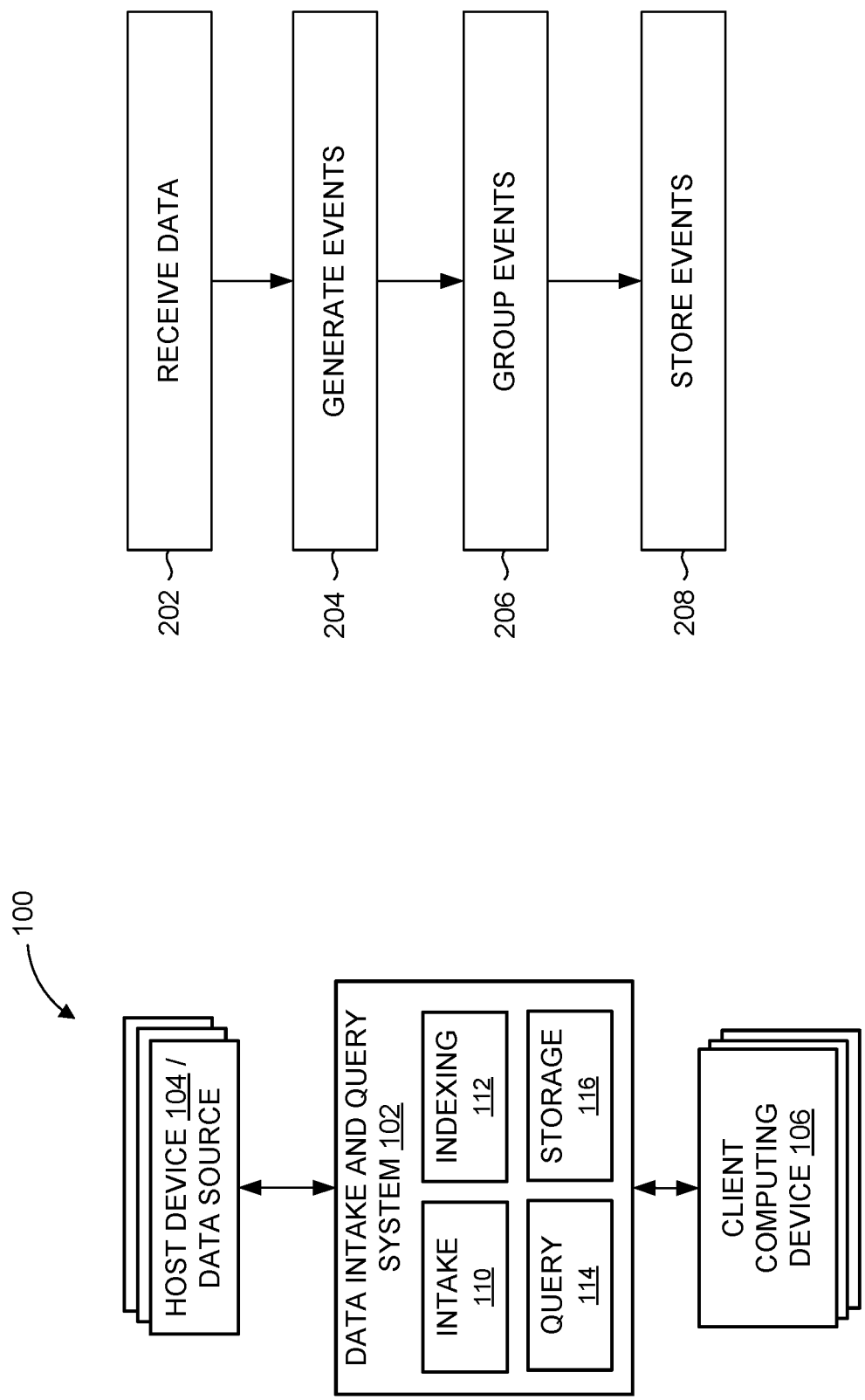

302

302A 127.0.0.1 – eva [10/Oct/2000:13:55:36-0700] "GET/apache.gif HTTP/1.0" 200  2326  0.0947
127.0.0.1 – emerson [10/Oct/2000:13:56:36-0700] "GET/eastwood.gif HTTP/1.0" 200 2980 0.0899         302C        302B
127.0.0.3 – eliza [10/Oct/2000:13:57:36-0700] "GET/ezra.gif HTTP/1.0" 200 2900 0.0857
[Sunday Oct 10 1:58:33 2010] [error] [client 127.10.1.1.015] File does not exist: /home/emmeline/pub_html/images/alisia.gif         302E                302D
91.205.189.15 - - [28/Apr/2014:18:22:16] *GET /oldlink?itemId=EST-14&JSESSIONID=SD6SL7FF7ADFF53113 HTTP 1.1" 200 1665 "http://www.buttercupgames.com/oldlink?itemId=EST-14" "Mozilla/5.0 (Windwos NT 6.1; WOW 64) AppleWebKit/536.5 (KHTML, like Gecko) Chrome/19.0.1084.46 Safari/536.5" 159

304

```
docker: {
        container_id: f7360a148a670c4c257f4ee024be81284b6017d72ae41ea8ee5d
}                                            304A
kubernetes: {
        container_name: kube-apiserver
        host: ip-172-20-43-173.ec2.internal
        labels: {
          k8s-app: kube-apiserver
        }
master_url: https://100.64.0.1:443/api
namespace_id: e5af26aa-4ef9-11e8-a4e1-0a2bf2ab4bba
namespace_name: kube-system
pod_id: 0a73017b-4efa-11e8-a4e1-0a2bf2ab4bba
pod_name: kube-apiserver-ip-172-20-43-173.ec2.internal    304B
}
  log: I0503 23:04:12.595203     1 wrap.go:42] GET /apis/admissionregistrations.k8s.io/v1beta1/validatingwebhookconfiguration 200 [[kube-apiserver/v1.9.3 (linux/amd64) kubernetes/d283541] 127.0.0.1:55026 stream: stdout
  time: 2018-05-03T23:04:12.619948395Z
}
```

306

| time | ID | CPU | memory |
|---|---|---|---|
| 10/10/00 12:01:00.013 | eliza | 14% | 80% |
| 10/10/00 12:01:05.153 | eva | 26% | 70% |

FIG. 3A

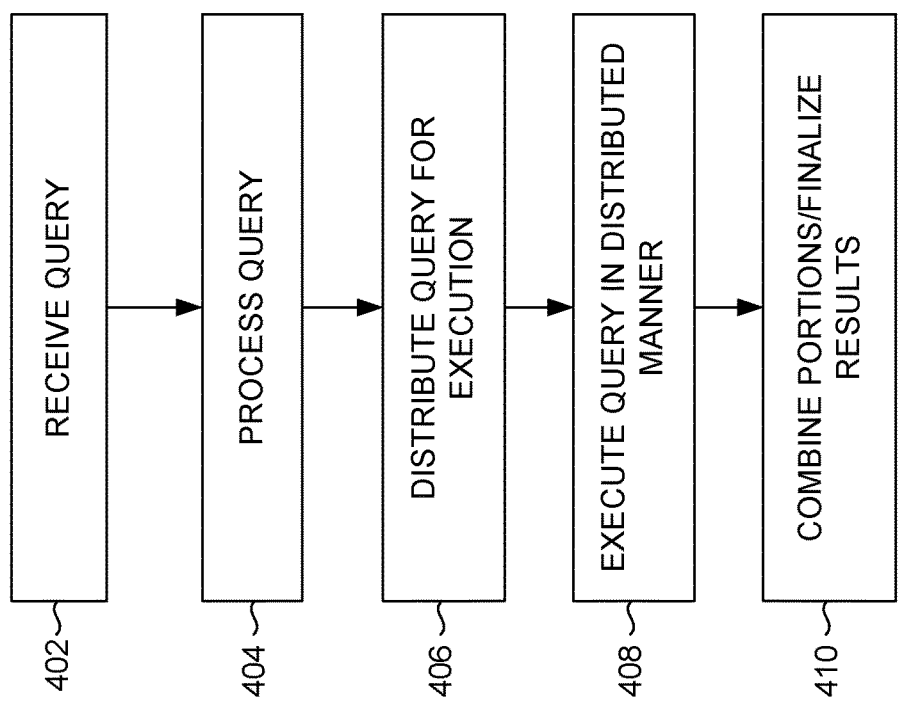

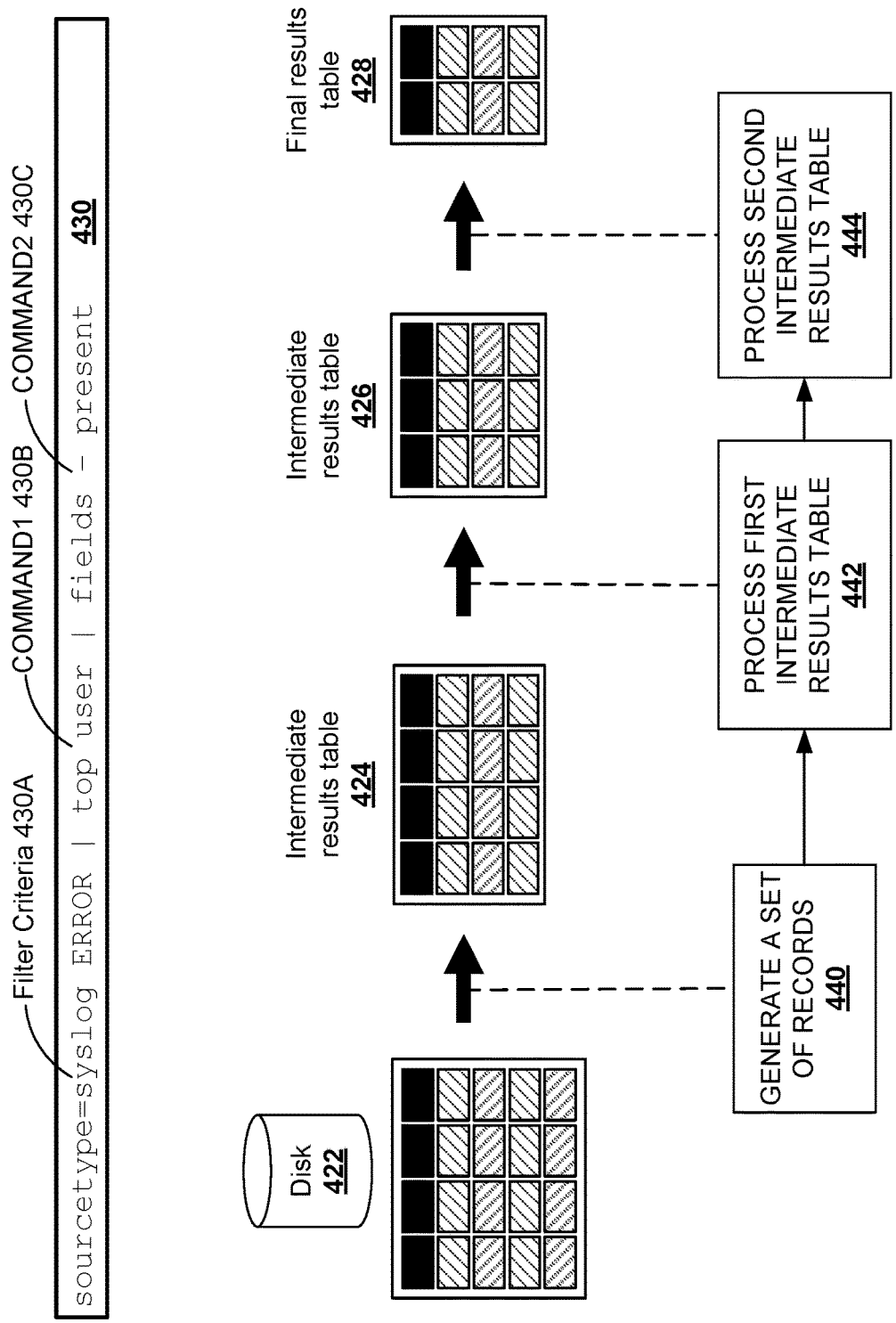

SYSTEM MODIFICATION OF A SEARCH-RELATED STATEMENT IN A GRAPHICAL USER INTERFACE

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Information technology (IT) environments may include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data ("machine data"). The machine data may include log data, performance data, diagnostic data, metrics, tracing data, or any other data that may be analyzed to diagnose equipment performance problems, monitor user interactions, and to derive other insights.

The large amount and diversity of data systems containing large amounts of structured, semi-structured, and unstructured data relevant to any search query may be massive, and continues to grow rapidly. This technological evolution may give rise to various challenges in relation to managing, understanding and effectively utilizing the data. To reduce the potentially vast amount of data that may be generated, some data systems pre-process data based on anticipated data analysis needs. In particular, specified data items may be extracted from the generated data and stored in a data system to facilitate efficient retrieval and analysis of those data items at a later time. At least some of the remainder of the generated data is typically discarded during pre-processing.

However, storing massive quantities of minimally processed or unprocessed data (collectively and individually referred to as "raw data") for later retrieval and analysis is becoming increasingly more feasible as storage capacity becomes more inexpensive and plentiful. In general, storing raw data and performing analysis on that data later may provide greater flexibility because it enables an analyst to analyze all of the generated data instead of only a fraction of it. Although the availability of vastly greater amounts of diverse data on diverse data systems provides opportunities to derive new insights, it also gives rise to technical challenges to search and analyze the data in a performant way.

BRIEF DESCRIPTION OF THE DRAWINGS

Illustrative examples are described in detail below with reference to the following figures:

FIG. 1 is a block diagram of an embodiment of a data processing environment.

FIG. 2 is a flow diagram illustrating an embodiment of a routine implemented by the data intake and query system to process, index, and store data.

FIG. 3A is a block diagram illustrating an embodiment of machine data received by the data intake and query system.

FIG. 4A is a flow diagram illustrating an embodiment of a routine implemented by the query system to execute a query.

FIG. 4B provides a visual representation of the manner in which a pipelined command language or query may operate.

FIG. 6 is a non-limiting example of a GUI that may be generated by the user interface system.

FIGS. 7A-7F are diagrams illustrating example GUIs generated by the user interface system.

DETAILED DESCRIPTION

Figure 3B:
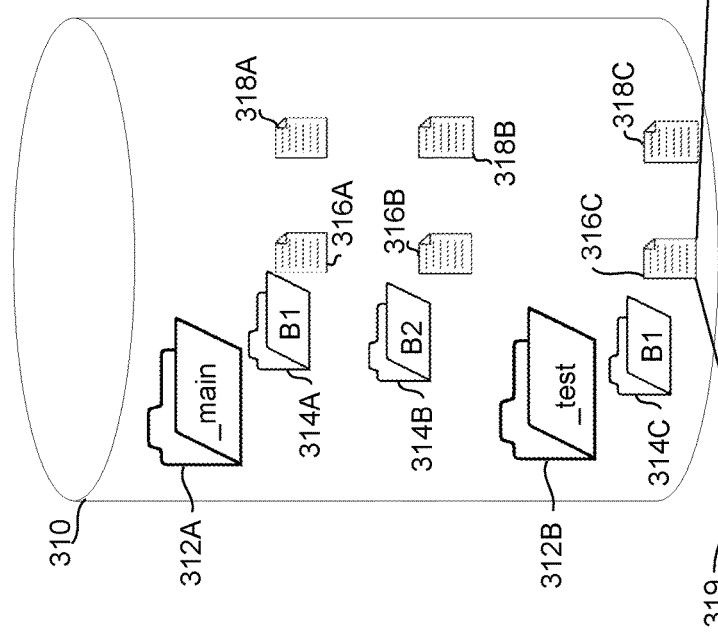
FIGS. 3B and 3C are block diagrams illustrating embodiments of various data structures for storing data processed by the data intake and query system.

Modern data centers and other computing environments may comprise anywhere from a few host computer systems to thousands of systems configured to process data, service requests from remote clients, and perform numerous other computational tasks. During operation, various components within these computing environments often generate significant volumes of machine data. Machine data is any data produced by a machine or component in an information technology (IT) environment and that reflects activity in the IT environment. For example, machine data may be raw machine data that is generated by various components in IT environments, such as servers, sensors, routers, mobile devices, Internet of Things (IoT) devices, etc. Machine data may include system logs, network packet data, sensor data, application program data, error logs, stack traces, system performance data, etc. In general, machine data may also include performance data, diagnostic information, and many other types of data that may be analyzed to diagnose performance problems, monitor user interactions, and to derive other insights.

A number of tools are available to analyze machine data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and is discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time may provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which may collectively be very time-consuming to analyze. In another example, mobile devices may generate large amounts of information relating to data accesses, application performance, operating system performance, network performance, etc. There may be millions of mobile devices that concurrently report these types of information.

These challenges may be addressed by using an event-based data intake and query system, such as the SPLUNK® ENTERPRISE, SPLUNK® CLOUD, or SPLUNK® CLOUD SERVICES system developed by Splunk Inc. of San Francisco, California. These systems represent the leading platform for providing real-time operational intelligence that enables organizations to collect, index, and search machine data from various websites, applications, servers, networks, and mobile devices that power their businesses. The data intake and query system is particularly useful for analyzing data, which is commonly found in system log files, network data, metrics data, tracing data, and other data input sources.

In the data intake and query system, machine data is collected and stored as "events." An event comprises a portion of machine data and is associated with a specific point in time. The portion of machine data may reflect activity in an IT environment and may be produced by a component of that IT environment, where the events may be searched to provide insight into the IT environment, thereby improving the performance of components in the IT environment. Events may be derived from "time series data," where the time series data comprises a sequence of data points (e.g., performance measurements from a computer system, etc.) that are associated with successive points in time. In general, each event has a portion of machine data that is associated with a timestamp. The time stamp may be derived from the portion of machine data in the event, determined through interpolation between temporally proximate events having known timestamps, and/or may be determined based on other configurable rules for associating timestamps with events.

In some instances, machine data may have a predefined structure, where data items with specific data formats are stored at predefined locations in the data. For example, the machine data may include data associated with fields in a database table. In other instances, machine data may not have a predefined structure (e.g., may not be at fixed, predefined locations), but may have repeatable (e.g., non-random) patterns. This means that some machine data may comprise various data items of different data types that may be stored at different locations within the data. For example, when the data source is an operating system log, an event may include one or more lines from the operating system log containing machine data that includes different types of performance and diagnostic information associated with a specific point in time (e.g., a timestamp).

Examples of components which may generate machine data from which events may be derived include, but are not limited to, web servers, application servers, databases, firewalls, routers, operating systems, and software applications that execute on computer systems, mobile devices, sensors, Internet of Things (IoT) devices, etc. The machine data generated by such data sources may include, for example and without limitation, server log files, activity log files, configuration files, messages, network packet data, performance measurements, sensor measurements, etc.

The data intake and query system may use flexible schema to specify how to extract information from events. A flexible schema may be developed and redefined as needed. The flexible schema may be applied to events "on the fly," when it is needed (e.g., at search time, index time, ingestion time, etc.). When the schema is not applied to events until search time, the schema may be referred to as a "late-binding schema."

During operation, the data intake and query system receives machine data from any type and number of sources (e.g., one or more system logs, streams of network packet data, sensor data, application program data, error logs, stack traces, system performance data, etc.). The system parses the machine data to produce events each having a portion of machine data associated with a timestamp and stores the events. The system enables users to run queries against the stored events to, for example, retrieve events that meet filter criteria specified in a query, such as criteria indicating certain keywords or having specific values in defined fields. Additional query terms may further process the event data, such as, by transforming the data, etc.

As used herein, the term "field" may refer to a location in the machine data of an event containing one or more values for a specific data item. A field may be referenced by a field name associated with the field. As will be described in more detail herein, in some cases, a field is defined by an extraction rule (e.g., a regular expression) that derives one or more values or a sub-portion of text from the portion of machine data in each event to produce a value for the field for that event. The set of values produced are semantically related (such as IP address), even though the machine data in each event may be in different formats (e.g., semantically related values may be in different positions in the events derived from different sources).

As described above, the system stores the events in a data store. The events stored in the data store are field-searchable, where field-searchable herein refers to the ability to search the machine data (e.g., the raw machine data) of an event based on a field specified in search criteria. For example, a search having criteria that specifies a field name "UserID" may cause the system to field-search the machine data of events to identify events that have the field name "UserID." In another example, a search having criteria that specifies a field name "UserID" with a corresponding field value "12345" may cause the system to field-search the machine data of events to identify events having that field-value pair (e.g., field name "UserID" with a corresponding field value of "12345"). Events are field-searchable using one or more configuration files associated with the events. Each configuration file may include one or more field names, where each field name is associated with a corresponding extraction rule and a set of events to which that extraction rule applies. The set of events to which an extraction rule applies may be identified by metadata associated with the set of events. For example, an extraction rule may apply to a set of events that are each associated with a particular host, source, or source-type. When events are to be searched based on a particular field name specified in a search, the system may use one or more configuration files to determine whether there is an extraction rule for that particular field name that applies to each event that falls within the criteria of the search. If so, the event is considered as part of the search results (and additional processing may be performed on that event based on criteria specified in the search). If not, the next event is similarly analyzed, and so on.

As noted above, the data intake and query system may utilize a late-binding schema while performing queries on events. One aspect of a late-binding schema is applying extraction rules to events to extract values for specific fields during search time. More specifically, the extraction rule for a field may include one or more instructions that specify how to extract a value for the field from an event. An extraction rule may generally include any type of instruction for extracting values from machine data or events. In some cases, an extraction rule comprises a regular expression, where a sequence of characters forms a search pattern. An extraction rule comprising a regular expression is referred to herein as a regex rule. The system applies a regex rule to machine data or an event to extract values for a field associated with the regex rule, where the values are extracted by searching the machine data/event for the sequence of characters defined in the regex rule.

In the data intake and query system, a field extractor may be configured to automatically generate extraction rules for certain fields in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema may be developed on an ongoing basis until the time a query is actually executed. This means that extraction rules for the fields specified in a query may be provided in the query itself or may be located during execution of the query. Hence, as a user learns more about the data in the events, the user may continue to refine the late-binding schema by adding new fields, deleting fields, or modifying the field extraction rules for use the next time the schema is used by the system. Because the data intake and query system maintains the underlying machine data and uses a late-binding schema for searching the machine data, it enables a user to continue investigating and learn valuable insights about the machine data.

In some embodiments, a common field name may be used to reference two or more fields containing equivalent and/or similar data items, even though the fields may be associated with different types of events that possibly have different data formats and different extraction rules. By enabling a common field name to be used to identify equivalent and/or similar fields from different types of events generated by disparate data sources, the system facilitates use of a "common information model" (CIM) across the disparate data sources.

In some embodiments, the configuration files and/or extraction rules described above may be stored in a catalog, such as a metadata catalog. In certain embodiments, the content of the extraction rules may be stored as rules or actions in the metadata catalog. For example, the identification of the data to which the extraction rule applies may be referred to a rule and the processing of the data may be referred to as an extraction action.

1.0. Operating Environment

FIG. 1 is a block diagram of an embodiment of a data processing environment 100. In the illustrated embodiment, the environment 100 includes a data intake and query system 102, one or more host devices 104, and one or more client computing devices 106 (generically referred to as client device(s) 106).

The data intake and query system 102, host devices 104, and client devices 106 may communicate with each other via one or more networks, such as a local area network (LAN), wide area network (WAN), private or personal network, cellular networks, intranetworks, and/or internetworks using any of wired, wireless, terrestrial microwave, satellite links, etc., and may include the Internet. Although not explicitly shown in FIG. 1, it will be understood that a client computing device 106 may communicate with a host device 104 via one or more networks. For example, if the host device 104 is configured as a web server and the client computing device 106 is a laptop, the laptop may communicate with the web server to view a website.

A client device 106 may correspond to a distinct computing device that may configure, manage, or sends queries to the system 102. Examples of client devices 106 may include, without limitation, smart phones, tablet computers, handheld computers, wearable devices, laptop computers, desktop computers, servers, portable media players, gaming devices, or other device that includes computer hardware (e.g., processors, non-transitory, computer-readable media, etc.) and so forth. In certain cases, a client device 106 may include a hosted, virtualized, or containerized device, such as an isolated execution environment, that shares computing resources (e.g., processor, memory, etc.) of a particular machine with other isolated execution environments.

The client devices 106 may interact with the system 102 (or a host device 104) in a variety of ways. For example, the client devices 106 may communicate with the system 102 (or a host device 104) over an Internet (Web) protocol, via a gateway, via a command line interface, via a software developer kit (SDK), a standalone application, etc. As another example, the client devices 106 may use one or more executable applications or programs to interface with the system 102.

A host device 104 may correspond to a distinct computing device or system that includes or has access to data that may be ingested, indexed, and/or searched by the system 102. Accordingly, in some cases, a client device 106 may also be a host device 104 (e.g., it may include data that is ingested by the system 102 and it may submit queries to the system 102). The host devices 104 may include, but are not limited to, servers, sensors, routers, personal computers, mobile devices, internet of things (IoT) devices, or hosting devices, such as computing devices in a shared computing resource environment on which multiple isolated execution environment (e.g., virtual machines, containers, etc.) may be instantiated, or other computing devices in an IT environment (e.g., device that includes computer hardware, e.g., processors, non-transitory, computer-readable media, etc.). In certain cases, a host device 104 may include a hosted, virtualized, or containerized device, such as an isolated execution environment, that shares computing resources (e.g., processor, memory, etc.) of a particular machine (e.g., a hosting device or hosting machine) with other isolated execution environments.

As mentioned, host devices 104 may include or have access to data sources for the system 102. The data sources may include machine data found in log files, data files, distributed file systems, streaming data, publication-subscribe (pub/sub) buffers, directories of files, data sent over a network, event logs, registries, streaming data services (examples of which may include, by way of non-limiting example, Amazon's Simple Queue Service ("SQS") or Kinesis™ services, devices executing Apache Kafka™ software, or devices implementing the Message Queue Telemetry Transport (MQTT) protocol, Microsoft Azure EventHub, Google Cloud PubSub, devices implementing the Java Message Service (JMS) protocol, devices implementing the Advanced Message Queuing Protocol (AMQP)), cloud-based services (e.g., AWS, Microsoft Azure, Google Cloud, etc.), operating-system-level virtualization environments (e.g., Docker), container orchestration systems (e.g., Kubernetes), virtual machines using full virtualization or paravirtualization, or other virtualization technique or isolated execution environments.

In some cases, one or more applications executing on a host device may generate various types of machine data during operation. For example, a web server application executing on a host device 104 may generate one or more web server logs detailing interactions between the web server and any number of client devices 106 or other devices. As another example, a host device 104 implemented as a router may generate one or more router logs that record information related to network traffic managed by the router. As yet another example, a database server application executing on a host device 104 may generate one or more logs that record information related to requests sent from other devices (e.g., web servers, application servers, client devices, etc.) for data managed by the database server. Similarly, a host device 104 may generate and/or store computing resource utilization metrics, such as, but not limited to, CPU utilization, memory utilization, number of processes being executed, etc. Any one or any combination of the files or data generated in such cases may be used as a data source for the system 102.

In some embodiments, an application may include a monitoring component that facilitates generating performance data related to host device's operating state, including monitoring network traffic sent and received from the host device and collecting other device and/or application-specific information. A monitoring component may be an integrated component of the application, a plug-in, an extension, or any other type of add-on component, or a stand-alone process.

Such monitored information may include, but is not limited to, network performance data (e.g., a URL requested, a connection type (e.g., HTTP, HTTPS, etc.), a connection start time, a connection end time, an HTTP status code, request length, response length, request headers, response headers, connection status (e.g., completion, response time(s), failure, etc.)) or device performance information (e.g., current wireless signal strength of the device, a current connection type and network carrier, current memory performance information, processor utilization, memory utilization, a geographic location of the device, a device orientation, and any other information related to the operational state of the host device, etc.), device profile information (e.g., a type of client device, a manufacturer, and model of the device, versions of various software applications installed on the device, etc.) In some cases, the monitoring component may collect device performance information by monitoring one or more host device operations, or by making calls to an operating system and/or one or more other applications executing on a host device for performance information. The monitored information may be stored in one or more files and/or streamed to the system 102.

In general, a monitoring component may be configured to generate performance data in response to a monitor trigger in the code of a client application or other triggering application event, as described above, and to store the performance data in one or more data records. Each data record, for example, may include a collection of field-value pairs, each field-value pair storing a particular item of performance data in association with a field for the item. For example, a data record generated by a monitoring component may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

In some embodiments, such as in a shared computing resource environment (or hosted environment), a host device 104 may include logs or machine data generated by an application executing within an isolated execution environment (e.g., web server log file if the isolated execution environment is configured as a web server or database server log files if the isolated execution environment is configured as database server, etc.), machine data associated with the computing resources assigned to the isolated execution environment (e.g., CPU utilization of the portion of the CPU allocated to the isolated execution environment, memory utilization of the portion of the memory allocated to the isolated execution environment, etc.), logs or machine data generated by an application that enables the isolated execution environment to share resources with other isolated execution environments (e.g., logs generated by a Docker manager or Kubernetes manager executing on the host device 104), and/or machine data generated by monitoring the computing resources of the host device 104 (e.g., CPU utilization, memory utilization, etc.) that are shared between the isolated execution environments. Given the separation (and isolation) between isolated execution environments executing on a common computing device, in certain embodiments, each isolated execution environment may be treated as a separate host device 104 even if they are, in fact, executing on the same computing device or hosting device.

Accordingly, as used herein, obtaining data from a data source may refer to communicating with a host device 104 to obtain data from the host device 104 (e.g., from one or more data source files, data streams, directories on the host device 104, etc.). For example, obtaining data from a data source may refer to requesting data from a host device 104 and/or receiving data from a host device 104. In some such cases, the host device 104 may retrieve and return the requested data from a particular data source and/or the system 102 may retrieve the data from a particular data source of the host device 104 (e.g., from a particular file stored on a host device 104).

The data intake and query system 102 may ingest, index, and/or store data from heterogeneous data sources and/or host devices 104. For example, the system 102 may ingest, index, and/or store any type of machine data, regardless of the form of the machine data or whether the machine data matches or is similar to other machine data ingested, indexed, and/or stored by the system 102. In some cases, the system 102 may generate events from the received data, group the events, and store the events in buckets. The system 102 may also search heterogeneous data that it has stored, or search data stored by other systems (e.g., other system 102 systems or other non-system 102 systems). For example, in response to received queries, the system 102 may assign one or more components to search events stored in the storage system or search data stored elsewhere.

As will be described herein in greater detail below, the system 102 may use one or more components to ingest, index, store, and/or search data. In some embodiments, the system 102 is implemented as a distributed system that uses multiple components to perform its various functions. For example, the system 102 may include any one or any combination of an intake system 110 (including one or more components) to ingest data, an indexing system 112 (including one or more components) to index the data, a storage system 116 (including one or more components) to store the data, and/or a query system 114 (including one or more components) to search the data, etc.

In the illustrated embodiment, the system 102 is shown having four subsystems 110, 112, 114, 116. However, it will be understood that the system 102 may include any one or any combination of the intake system 110, indexing system 112, query system 114, or storage system 116. Further, in certain embodiments, one or more of the intake system 110, indexing system 112, query system 114, or storage system 116 may be used alone or apart from the system 102. For example, the intake system 110 may be used alone to glean information from streaming data that is not indexed or stored by the system 102, or the query system 114 may be used to search data that is unaffiliated with the system 102.

In certain embodiments, the components of the different systems may be distinct from each other or there may be some overlap. For example, one component of the system 102 may include some indexing functionality and some searching functionality and thus be used as part of the indexing system 112 and query system 114, while another computing device of the system 102 may only have ingesting or search functionality and only be used as part of those respective systems. Similarly, the components of the storage system 116 may include data stores of individual components of the indexing system and/or may be a separate shared data storage system, like Amazon S3, that is accessible to distinct components of the intake system 110, indexing system 112, and query system 114.

In some cases, the components of the system 102 are implemented as distinct computing devices having their own computer hardware (e.g., processors, non-transitory, computer-readable media, etc.) and/or as distinct hosted devices (e.g., isolated execution environments) that share computing resources or hardware in a shared computing resource environment.

For simplicity, references made herein to the intake system 110, indexing system 112, storage system 116, and query system 114 may refer to those components used for ingesting, indexing, storing, and searching, respectively. However, it will be understood that although reference is made to two separate systems, the same underlying component may be performing the functions for the two different systems. For example, reference to the indexing system indexing data and storing the data in the storage system 116 or the query system searching the data may refer to the same component (e.g., same computing device or hosted device) indexing the data, storing the data, and then searching the data that it stored.

As will be described in greater detail herein, the intake system 110 may receive data from the host devices 104 or data sources, perform one or more preliminary processing operations on the data, and communicate the data to the indexing system 112, query system 114, storage system 116, or to other systems (which may include, for example, data processing systems, telemetry systems, real-time analytics systems, data stores, databases, etc., any of which may be operated by an operator of the system 102 or a third party). Given the amount of data that may be ingested by the intake system 110, in some embodiments, the intake system may include multiple distributed computing devices or components working concurrently to ingest the data.

The intake system 110 may receive data from the host devices 104 in a variety of formats or structures. In some embodiments, the received data corresponds to raw machine data, structured or unstructured data, correlation data, data files, directories of files, data sent over a network, event logs, registries, messages published to streaming data sources, performance metrics, sensor data, image and video data, etc.

The preliminary processing operations performed by the intake system 110 may include, but is not limited to, associating metadata with the data received from a host device 104, extracting a timestamp from the data, identifying individual events within the data, extracting a subset of machine data for transmittal to the indexing system 112, enriching the data, etc. As part of communicating the data to the indexing system, the intake system 110 may route the data to a particular component of the intake system 110 or dynamically route the data based on load-balancing, etc. In certain cases, one or more components of the intake system 110 may be installed on a host device 104.

1.4.2. Indexing System Overview

As will be described in greater detail herein, the indexing system 112 may include one or more components (e.g., indexing nodes) to process the data and store it, for example, in the storage system 116. As part of processing the data, the indexing system may identify distinct events within the data, timestamps associated with the data, organize the data into buckets or time series buckets, convert editable buckets to non-editable buckets, store copies of the buckets in the storage system 116, merge buckets, generate indexes of the data, etc. In addition, the indexing system 112 may update various catalogs or databases with information related to the buckets (pre-merged or merged) or data that is stored in the storage system 116 and may communicate with the intake system 110 about the status of the data storage.

As will be described in greater detail herein, the query system 114 may include one or more components to receive, process, and execute queries. In some cases, the query system 114 may use the same component to process and execute the query or use one or more components to receive and process the query (e.g., a search head) and use one or more other components to execute at least a portion of the query (e.g., search nodes). In some cases, a search node and an indexing node may refer to the same computing device or hosted device performing different functions. In certain cases, a search node may be a separate computing device or hosted device from an indexing node.

Queries received by the query system 114 may be relatively complex and identify a set of data to be processed and a manner of processing the set of data from one or more client devices 106. In certain cases, the query may be implemented using a pipelined command language or other query language. As described herein, in some cases, the query system 114 may execute parts of the query in a distributed fashion (e.g., one or more mapping phases or parts associated with identifying and gathering the set of data identified in the query) and execute other parts of the query on a single component (e.g., one or more reduction phases). However, it will be understood that in some cases multiple components may be used in the map and/or reduce functions of the query execution.

In some cases, as part of executing the query, the query system 114 may use one or more catalogs or databases to identify the set of data to be processed or its location in the storage system 116 and/or may retrieve data from the storage system 116. In addition, in some embodiments, the query system 114 may store some or all of the search results in the storage system 116.

In some cases, the storage system 116 may include one or more data stores associated with or coupled to the components of the indexing system 112 that are accessible via a system bus or local area network. In certain embodiments, the storage system 116 may be a shared storage system 116, like Amazon S3 or Google Cloud Storage, that are accessible via a wide area network.

As mentioned and as will be described in greater detail below, the storage system 116 may be made up of one or more data stores storing data that has been processed by the indexing system 112. In some cases, the storage system includes data stores of the components of the indexing system 112 and/or query system 114. In certain embodiments, the storage system 116 may be implemented as a shared storage system 116. The shared storage system 116 may be configured to provide high availability, highly resilient, low loss data storage. In some cases, to provide the high availability, highly resilient, low loss data storage, the shared storage system 116 may store multiple copies of the data in the same and different geographic locations and across different types of data stores (e.g., solid state, hard drive, tape, etc.). Further, as data is received at the shared storage system 116 it may be automatically replicated multiple times according to a replication factor to different data stores across the same and/or different geographic locations. In some embodiments, the shared storage system 116 may correspond to cloud storage, such as Amazon Simple Storage Service (S3) or Elastic Block Storage (EBS), Google Cloud Storage, Microsoft Azure Storage, etc.

In some embodiments, indexing system 112 may read to and write from the shared storage system 116. For example, the indexing system 112 may copy buckets of data from its local or shared data stores to the shared storage system 116. In certain embodiments, the query system 114 may read from, but may not write to, the shared storage system 116. For example, the query system 114 may read the buckets of data stored in shared storage system 116 by the indexing system 112 but may not be able to copy buckets or other data to the shared storage system 116. In some embodiments, the intake system 110 does not have access to the shared storage system 116. However, in some embodiments, one or more components of the intake system 110 may write data to the shared storage system 116 that may be read by the indexing system 112.

As described herein, in some embodiments, data in the system 102 (e.g., in the data stores of the components of the indexing system 112, shared storage system 116, or search nodes of the query system 114) may be stored in one or more time series buckets. Each bucket may include raw machine data associated with a timestamp and additional information about the data or bucket, such as, but not limited to, one or more filters, indexes (e.g., TSIDX, inverted indexes, keyword indexes, etc.), bucket summaries, etc. In some embodiments, the bucket data and information about the bucket data is stored in one or more files. For example, the raw machine data, filters, indexes, bucket summaries, etc. may be stored in respective files in or associated with a bucket. In certain cases, the group of files may be associated together to form the bucket.

The system 102 may include additional components that interact with any one or any combination of the intake system 110, indexing system 112, query system 114, and/or storage system 116. Such components may include, but are not limited to an authentication system, orchestration system, one or more catalogs or databases, a gateway, etc.

An authentication system may include one or more components to authenticate users to access, use, and/or configure the system 102. Similarly, the authentication system may be used to restrict what a particular user may do on the system 102 and/or what components or data a user may access, etc.

An orchestration system may include one or more components to manage and/or monitor the various components of the system 102. In some embodiments, the orchestration system may monitor the components of the system 102 to detect when one or more components has failed or is unavailable and enable the system 102 to recover from the failure (e.g., by adding additional components, fixing the failed component, or having other components complete the tasks assigned to the failed component). In certain cases, the orchestration system may determine when to add components to or remove components from a particular system 110, 112, 114, 116 (e.g., based on usage, user/tenant requests, etc.). In embodiments where the system 102 is implemented in a shared computing resource environment, the orchestration system may facilitate the creation and/or destruction of isolated execution environments or instances of the components of the system 102, etc.

In certain embodiments, the system 102 may include various components that enable it to provide stateless services or enable it to recover from an unavailable or unresponsive component without data loss in a time efficient manner. For example, the system 102 may store contextual information about its various components in a distributed way such that if one of the components becomes unresponsive or unavailable, the system 102 may replace the unavailable component with a different component and provide the replacement component with the contextual information. In this way, the system 102 may quickly recover from an unresponsive or unavailable component while reducing or eliminating the loss of data that was being processed by the unavailable component.

In some embodiments, the system 102 may store the contextual information in a catalog, as described herein. In certain embodiments, the contextual information may correspond to information that the system 102 has determined or learned based on use. In some cases, the contextual information may be stored as annotations (manual annotations and/or system annotations), as described herein.

In certain embodiments, the system 102 may include an additional catalog that monitors the location and storage of data in the storage system 116 to facilitate efficient access of the data during search time. In certain embodiments, such a catalog may form part of the storage system 116.

In some embodiments, the system 102 may include a gateway or other mechanism to interact with external devices or to facilitate communications between components of the system 102. In some embodiments, the gateway may be implemented using an application programming interface (API). In certain embodiments, the gateway may be implemented using a representational state transfer API (REST API).

In some environments, a user of a system 102 may install and configure, on computing devices owned and operated by the user, one or more software applications that implement some or all of the components of the system 102. For example, with reference to FIG. 1, a user may install a software application on server computers owned by the user and configure each server to operate as one or more components of the intake system 110, indexing system 112, query system 114, shared storage system 116, or other components of the system 102. This arrangement generally may be referred to as an "on-premises" solution. That is, the system 102 is installed and operates on computing devices directly controlled by the user of the system 102. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 102 operate.

In certain embodiments, one or more of the components of the system 102 may be implemented in a shared computing resource environment. In this context, a shared computing resource environment or cloud-based service may refer to a service hosted by one more computing resources that are accessible to end users over a network, for example, by using a web browser or other application on a client device to interface with the remote computing resources. For example, a service provider may provide a system 102 by managing computing resources configured to implement various aspects of the system (e.g., intake system 110, indexing system 112, query system 114, shared storage system 116, other components, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

When implemented in a shared computing resource environment, the underlying hardware (non-limiting examples: processors, hard drives, solid-state memory, RAM, etc.) on which the components of the system 102 execute may be shared by multiple customers or tenants as part of the shared computing resource environment. In addition, when implemented in a shared computing resource environment as a cloud-based service, various components of the system 102 may be implemented using containerization or operating-system-level virtualization, or other virtualization technique. For example, one or more components of the intake system 110, indexing system 112, or query system 114 may be implemented as separate software containers or container instances. Each container instance may have certain computing resources (e.g., memory, processor, etc.) of an underlying hosting computing system (e.g., server, microprocessor, etc.) assigned to it, but may share the same operating system and may use the operating system's system call interface. Each container may provide an isolated execution environment on the host system, such as by providing a memory space of the hosting system that is logically isolated from memory space of other containers. Further, each container may run the same or different computer applications concurrently or separately and may interact with each other. Although reference is made herein to containerization and container instances, it will be understood that other virtualization techniques may be used. For example, the components may be implemented using virtual machines using full virtualization or paravirtualization, etc. Thus, where reference is made to "containerized" components, it should be understood that such components may additionally or alternatively be implemented in other isolated execution environments, such as a virtual machine environment.

Implementing the system 102 in a shared computing resource environment may provide a number of benefits. In some cases, implementing the system 102 in a shared computing resource environment may make it easier to install, maintain, and update the components of the system 102. For example, rather than accessing designated hardware at a particular location to install or provide a component of the system 102, a component may be remotely instantiated or updated as desired. Similarly, implementing the system 102 in a shared computing resource environment or as a cloud-based service may make it easier to meet dynamic demand. For example, if the system 102 experiences significant load at indexing or search, additional compute resources may be deployed to process the additional data or queries. In an "on-premises" environment, this type of flexibility and scalability may not be possible or feasible.

In addition, by implementing the system 102 in a shared computing resource environment or as a cloud-based service may improve compute resource utilization. For example, in an on-premises environment if the designated compute resources are not being used by, they may sit idle and unused. In a shared computing resource environment, if the compute resources for a particular component are not being used, they may be re-allocated to other tasks within the system 102 and/or to other systems unrelated to the system 102.

As mentioned, in an on-premises environment, data from one instance of a system 102 is logically and physically separated from the data of another instance of a system 102 by virtue of each instance having its own designated hardware. As such, data from different customers of the system 102 is logically and physically separated from each other. In a shared computing resource environment, components of a system 102 may be configured to process the data from one customer or tenant or from multiple customers or tenants. Even in cases where a separate component of a system 102 is used for each customer, the underlying hardware on which the components of the system 102 are instantiated may still process data from different tenants. Accordingly, in a shared computing resource environment, the data from different tenants may not be physically separated on distinct hardware devices. For example, data from one tenant may reside on the same hard drive as data from another tenant or be processed by the same processor. In such cases, the system 102 may maintain logical separation between tenant data. For example, the system 102 may include separate directories for different tenants and apply different permissions and access controls to access the different directories or to process the data, etc.

In certain cases, the tenant data from different tenants is mutually exclusive and/or independent from each other. For example, in certain cases, Tenant A and Tenant B do not share the same data, similar to the way in which data from a local hard drive of Customer A is mutually exclusive and independent of the data (and not considered part) of a local hard drive of Customer B. While Tenant A and Tenant B may have matching or identical data, each tenant would have a separate copy of the data. For example, with reference again to the local hard drive of Customer A and Customer B example, each hard drive could include the same file. However, each instance of the file would be considered part of the separate hard drive and would be independent of the other file. Thus, one copy of the file would be part of Customer's A hard drive and a separate copy of the file would be part of Customer B's hard drive. In a similar manner, to the extent Tenant A has a file that is identical to a file of Tenant B, each tenant would have a distinct and independent copy of the file stored in different locations on a data store or on different data stores.

Further, in certain cases, the system 102 may maintain the mutual exclusivity and/or independence between tenant data even as the tenant data is being processed, stored, and searched by the same underlying hardware. In certain cases, to maintain the mutual exclusivity and/or independence between the data of different tenants, the system 102 may use tenant identifiers to uniquely identify data associated with different tenants.

In a shared computing resource environment, some components of the system 102 may be instantiated and designated for individual tenants and other components may be shared by multiple tenants. In certain embodiments, a separate intake system 110, indexing system 112, and query system 114 may be instantiated for each tenant, whereas the shared storage system 116 or other components (e.g., data store, metadata catalog, and/or acceleration data store, described below) may be shared by multiple tenants. In some such embodiments where components are shared by multiple tenants, the components may maintain separate directories for the different tenants to ensure their mutual exclusivity and/or independence from each other. Similarly, in some such embodiments, the system 102 may use different hosting computing systems or different isolated execution environments to process the data from the different tenants as part of the intake system 110, indexing system 112, and/or query system 114.

In some embodiments, individual components of the intake system 110, indexing system 112, and/or query system 114 may be instantiated for each tenant or shared by multiple tenants. For example, some individual intake system components (e.g., forwarders, output ingestion buffer) may be instantiated and designated for individual tenants, while other intake system components (e.g., a data retrieval subsystem, intake ingestion buffer, and/or streaming data processor), may be shared by multiple tenants.

In certain embodiments, an indexing system 112 (or certain components thereof) may be instantiated and designated for a particular tenant or shared by multiple tenants. In some embodiments where a separate indexing system 112 is instantiated and designated for each tenant, different resources may be reserved for different tenants. For example, Tenant A may be consistently allocated a minimum of four indexing nodes and Tenant B may be consistently allocated a minimum of two indexing nodes. In some such embodiments, the four indexing nodes may be reserved for Tenant A and the two indexing nodes may be reserved for Tenant B, even if Tenant A and Tenant B are not using the reserved indexing nodes.

In embodiments where an indexing system 112 is shared by multiple tenants, components of the indexing system 112 may be dynamically assigned to different tenants. For example, if Tenant A has greater indexing demands, additional indexing nodes may be instantiated or assigned to Tenant A's data. However, as the demand decreases, the indexing nodes may be reassigned to a different tenant or terminated. Further, in some embodiments, a component of the indexing system 112 may concurrently process data from the different tenants.

In some embodiments, one instance of query system 114 may be shared by multiple tenants. In some such cases, the same search head may be used to process/execute queries for different tenants and/or the same search nodes may be used to execute query for different tenants. Further, in some such cases, different tenants may be allocated different amounts of compute resources. For example, Tenant A may be assigned more search heads or search nodes based on demand or based on a service level arrangement than another tenant. However, once a search is completed the search head and/or nodes assigned to Tenant A may be assigned to Tenant B, deactivated, or their resource may be re-allocated to other components of the system 102, etc.

In some cases, by sharing more components with different tenants, the functioning of the system 102 may be improved. For example, by sharing components across tenants, the system 102 may improve resource utilization thereby reducing the number of resources allocated as a whole. For example, if four indexing nodes, two search heads, and four search nodes are reserved for each tenant then those compute resources are unavailable for use by other processes or tenants, even if they go unused. In contrast, by sharing the indexing nodes, search heads, and search nodes with different tenants and instantiating additional compute resources, the system 102 may use fewer resources overall while providing improved processing time for the tenants that are using the compute resources. For example, if tenant A is not using any search nodes and tenant B has many searches running, the system 102 may use search nodes that would have been reserved for tenant A to service tenant B. In this way, the system 102 may decrease the number of compute resources used/reserved, while improving the search time for tenant B and improving compute resource utilization.

2.0. Data Ingestion, Indexing, and Storage

FIG. 2 is a flow diagram illustrating an embodiment of a routine implemented by the system 102 to process, index, and store data received from host devices 104. The data flow illustrated in FIG. 2 is provided for illustrative purposes only. It will be understood that one or more of the steps of the processes illustrated in FIG. 2 may be removed or that the ordering of the steps may be changed. Furthermore, for the purposes of illustrating a clear example, one or more particular system components are described in the context of performing various operations during each of the data flow stages. For example, the intake system 110 is described as receiving machine data and the indexing system 112 is described as generating events, grouping events, and storing events. However, other system arrangements and distributions of the processing steps across system components may be used. For example, in some cases, the intake system 110 may generate events.

At block 202, the intake system 110 receives data from a host device 104. The intake system 110 initially may receive the data as a raw data stream generated by the host device 104. For example, the intake system 110 may receive a data stream from a log file generated by an application server, from a stream of network data from a network device, or from any other source of data. Non-limiting examples of machine data that may be received by the intake system 110 is described herein with reference to FIG. 3A.

In some embodiments, the intake system 110 receives the raw data and may segment the data stream into messages, possibly of a uniform data size, to facilitate subsequent processing steps. The intake system 110 may thereafter process the messages in accordance with one or more rules to conduct preliminary processing of the data. In one embodiment, the processing conducted by the intake system 110 may be used to indicate one or more metadata fields applicable to each message. For example, the intake system 110 may include metadata fields within the messages or publish the messages to topics indicative of a metadata field. These metadata fields may, for example, provide information related to a message as a whole and may apply to each event that is subsequently derived from the data in the message. For example, the metadata fields may include separate fields specifying each of a host, a source, and a sourcetype related to the message. A host field may contain a value identifying a host name or IP address of a device that generated the data. A source field may contain a value identifying a source of the data, such as a pathname of a file or a protocol and port related to received network data. A sourcetype field may contain a value specifying a particular sourcetype label for the data. Additional metadata fields may also be included, such as a character encoding of the data, if known, and possibly other values that provide information relevant to later processing steps. In certain embodiments, the intake system 110 may perform additional operations, such as, but not limited to, identifying individual events within the data, determining timestamps for the data, further enriching the data, etc.

At block 204, the indexing system 112 generates events from the data. In some cases, as part of generating the events, the indexing system 112 may parse the data of the message. In some embodiments, the indexing system 112 may determine a sourcetype associated with each message (e.g., by extracting a sourcetype label from the metadata fields associated with the message, etc.) and refer to a sourcetype configuration corresponding to the identified sourcetype to parse the data of the message. The sourcetype definition may include one or more properties that indicate to the indexing system 112 to automatically determine the boundaries within the received data that indicate the portions of machine data for events. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a sourcetype for the data is unknown to the indexing system 112, the indexing system 112 may infer a sourcetype for the data by examining the structure of the data. Then, the indexing system 112 may apply an inferred sourcetype definition to the data to create the events.

In addition, as part of generating events from the data, the indexing system 112 may determine a timestamp for each event. Similar to the process for parsing machine data, the indexing system 112 may again refer to a sourcetype definition associated with the data to locate one or more properties that indicate instructions for determining a timestamp for each event. The properties may, for example, instruct the indexing system 112 to extract a time value from a portion of data for the event (e.g., using a regex rule), to interpolate time values based on timestamps associated with temporally proximate events, to create a timestamp based on a time the portion of machine data was received or generated, to use the timestamp of a previous event, or use any other rules for determining timestamps, etc.

The indexing system 112 may also associate events with one or more metadata fields. In some embodiments, a timestamp may be included in the metadata fields. These metadata fields may include any number of "default fields" that are associated with all events and may also include one more custom fields as defined by a user. In certain embodiments, the default metadata fields associated with each event may include a host, source, and sourcetype field including or in addition to a field storing the timestamp.

In certain embodiments, the indexing system 112 may also apply one or more transformations to event data that is to be included in an event. For example, such transformations may include removing a portion of the event data (e.g., a portion used to define event boundaries, extraneous characters from the event, other extraneous text, etc.), masking a portion of event data (e.g., masking a credit card number), removing redundant portions of event data, etc. The transformations applied to event data may, for example, be specified in one or more configuration files and referenced by one or more sourcetype definitions.

At block 206, the indexing system 112 may group events. In some embodiments, the indexing system 112 may group events based on time. For example, events generated within a particular time period or events that have a time stamp within a particular time period may be grouped together to form a bucket. A non-limiting example of a bucket is described herein with reference to FIG. 3B.

In certain embodiments, multiple components of the indexing system, such as an indexing node, may concurrently generate events and buckets. Furthermore, each indexing node that generates and groups events may concurrently generate multiple buckets. For example, multiple processors of an indexing node may concurrently process data, generate events, and generate buckets. Further, multiple indexing nodes may concurrently generate events and buckets. As such, ingested data may be processed in a highly distributed manner.

In some embodiments, as part of grouping events together, the indexing system 112 may generate one or more inverted indexes for a particular group of events. A non-limiting example of an inverted index is described herein with reference to FIG. 3C. In certain embodiments, the inverted indexes may include location information for events of a bucket. For example, the events of a bucket may be compressed into one or more files to reduce their size. The inverted index may include location information indicating the particular file and/or location within a particular file of a particular event.

In certain embodiments, the inverted indexes may include keyword entries or entries for field values or field name-value pairs found in events. In some cases, a field name-value pair may include a pair of words connected by a symbol, such as an equal's sign or colon. The entries may also include location information for events that include the keyword, field value, or field value pair. In this way, relevant events may be quickly located. In some embodiments, fields may automatically be generated for some or all of the field names of the field name-value pairs at the time of indexing. For example, if the string "dest=10.0.1.2" is found in an event, a field named "dest" may be created for the event and assigned a value of "10.0.1.2." In certain embodiments, the indexing system may populate entries in the inverted index with field name-value pairs by parsing events using one or more regex rules to determine a field value associated with a field defined by the regex rule. For example, the regex rule may indicate how to find a field value for a userID field in certain events. In some cases, the indexing system 112 may use the sourcetype of the event to determine which regex to use for identifying field values.

Figure 3C:
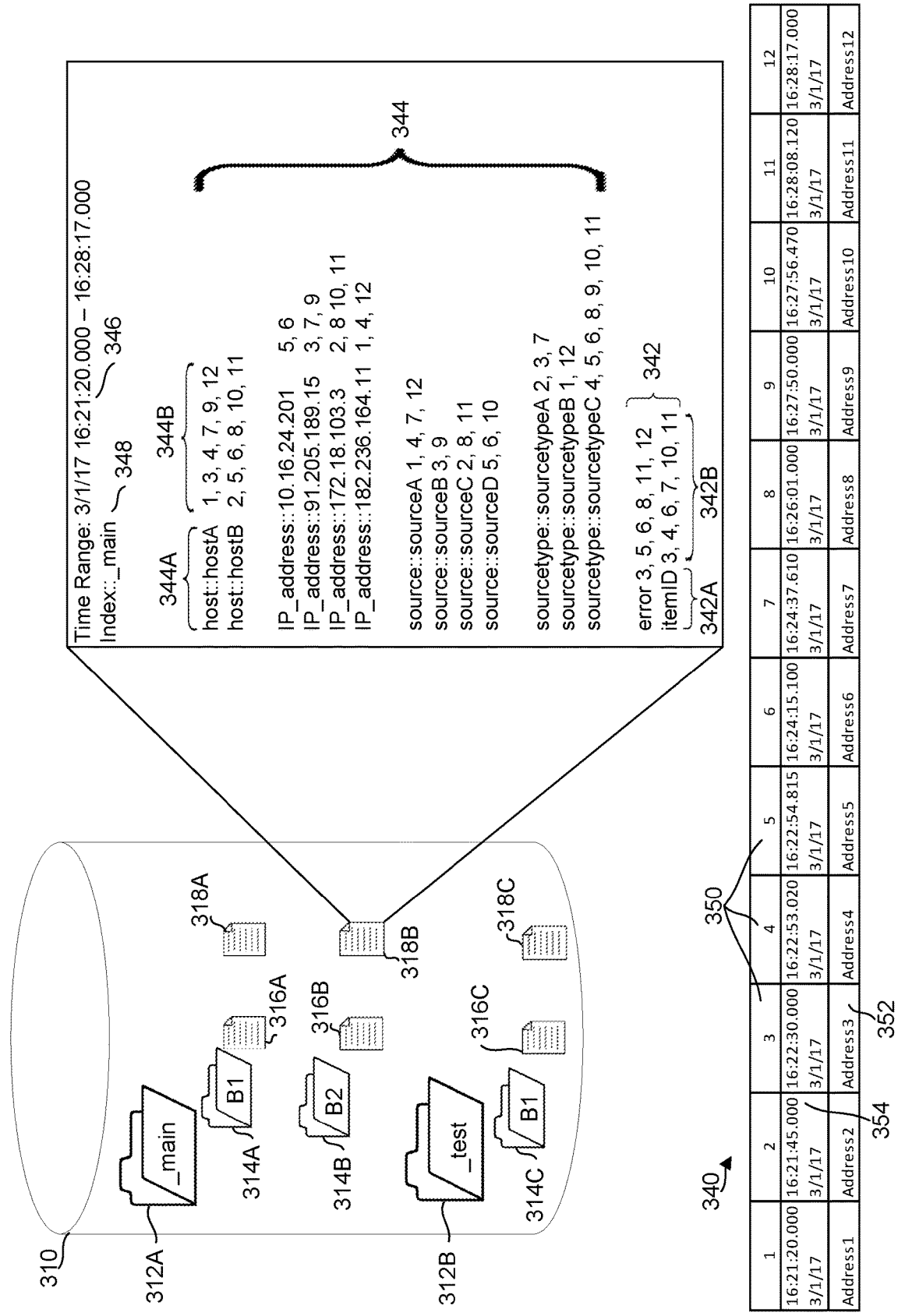

At block 208, the indexing system 112 stores the events with an associated timestamp in the storage system 116, which may be in a local data store and/or in a shared storage system. Timestamps enable a user to search for events based on a time range. In some embodiments, the stored events are organized into "buckets," where each bucket stores events associated with a specific time range based on the timestamps associated with each event. As mentioned, FIGS. 3B and 3C illustrate an example of a bucket. This improves time-based searching, as well as allows for events with recent timestamps, which may have a higher likelihood of being accessed, to be stored in a faster memory to facilitate faster retrieval. For example, buckets containing the most recent events may be stored in flash memory rather than on a hard disk. In some embodiments, each bucket may be associated with an identifier, a time range, and a size constraint.

The indexing system 112 may be responsible for storing the events in the storage system 116. As mentioned, the events or buckets may be stored locally on a component of the indexing system 112 or in a shared storage system 116. In certain embodiments, the component that generates the events and/or stores the events (indexing node) may also be assigned to search the events. In some embodiments separate components may be used for generating and storing events (indexing node) and for searching the events (search node).

By storing events in a distributed manner (either by storing the events at different components or in a shared storage system 116), the query system 114 may analyze events for a query in parallel. For example, using map-reduce techniques, multiple components of the query system (e.g., indexing or search nodes) may concurrently search and provide partial responses for a subset of events to another component (e.g., search head) that combines the results to produce an answer for the query. By storing events in buckets for specific time ranges, the indexing system 112 may further optimize the data retrieval process by the query system 114 to search buckets corresponding to time ranges that are relevant to a query. In some embodiments, each bucket may be associated with an identifier, a time range, and a size constraint. In certain embodiments, a bucket may correspond to a file system directory and the machine data, or events, of a bucket may be stored in one or more files of the file system directory. The file system directory may include additional files, such as one or more inverted indexes, high performance indexes, permissions files, configuration files, etc.

In embodiments where components of the indexing system 112 store buckets locally, the components may include a home directory and a cold directory. The home directory may store hot buckets and warm buckets, and the cold directory stores cold buckets. A hot bucket may refer to a bucket that is capable of receiving and storing additional events. A warm bucket may refer to a bucket that may no longer receive events for storage but has not yet been moved to the cold directory. A cold bucket may refer to a bucket that may no longer receive events and may be a bucket that was previously stored in the home directory. The home directory may be stored in faster memory, such as flash memory, as events may be actively written to the home directory, and the home directory may typically store events that are more frequently searched and thus are accessed more frequently. The cold directory may be stored in slower and/or larger memory, such as a hard disk, as events are no longer being written to the cold directory, and the cold directory may typically store events that are not as frequently searched and thus are accessed less frequently. In some embodiments, components of the indexing system 112 may also have a quarantine bucket that contains events having potentially inaccurate information, such as an incorrect timestamp associated with the event or a timestamp that appears to be an unreasonable timestamp for the corresponding event. The quarantine bucket may have events from any time range; as such, the quarantine bucket may always be searched at search time. Additionally, components of the indexing system may store old, archived data in a frozen bucket that is not capable of being searched at search time. In some embodiments, a frozen bucket may be stored in slower and/or larger memory, such as a hard disk, and may be stored in offline and/or remote storage.

In some embodiments, components of the indexing system 112 may not include a cold directory and/or cold or frozen buckets. For example, in embodiments where buckets are copied to a shared storage system 116 and searched by separate components of the query system 114, buckets may be deleted from components of the indexing system as they are stored to the storage system 116. In certain embodiments, the shared storage system 116 may include a home directory that includes warm buckets copied from the indexing system 112 and a cold directory of cold or frozen buckets as described above.

FIG. 3A is a block diagram illustrating an embodiment of machine data received by the system 102. The machine data may correspond to data from one or more host devices 104 or data sources. As mentioned, the data source may correspond to a log file, data stream or other data structure that is accessible by a host device 104. In the illustrated embodiment of FIG. 3A, the machine data has different forms. For example, the machine data 302 may be log data that is unstructured or that does not have any clear structure or fields and include different portions 302A-302E that correspond to different entries of the log and that separated by boundaries. Such data may also be referred to as raw machine data.

The machine data 304 may be referred to as structured or semi-structured machine data as it does include some data in a JSON structure defining certain field and field values (e.g., machine data 304A showing field name: field values container_name: kube-apiserver, host:ip 172 20 43 173. ec2.internal, pod_id:0a73017b-4efa-11e8-a4e1-0a2bf2ab-4bba, etc.), but other parts of the machine data 304 is unstructured or raw machine data (e.g., machine data 304B). The machine data 306 may be referred to as structured data as it includes particular rows and columns of data with field names and field values.

In some embodiments, the machine data 302 may correspond to log data generated by a host device 104 configured as an Apache server, the machine data 304 may correspond to log data generated by a host device 104 in a shared computing resource environment, and the machine data 306 may correspond to metrics data. Given the differences between host devices 104 that generated the log data 302, 304, the form of the log data 302, 304 is different. In addition, as the log data 304 is from a host device 104 in a shared computing resource environment, it may include log data generated by an application being executed within an isolated execution environment (304B, excluding the field name "log:") and log data generated by an application that enables the sharing of computing resources between isolated execution environments (all other data in 304). Although shown together in FIG. 3A, it will be understood that machine data with different hosts, sources, or sourcetypes may be received separately and/or found in different data sources and/or host devices 104.

As described herein, the system 102 may process the machine data based on the form in which it is received. In some cases, the intake system 110 may utilize one or more rules to process the data. In certain embodiments, the intake system 110 may enrich the received data. For example, the intake system may add one or more fields to the data received from the host devices 104, such as fields denoting the host, source, sourcetype, index, or tenant associated with the incoming data. In certain embodiments, the intake system 110 may perform additional processing on the incoming data, such as transforming structured data into unstructured data (or vice versa), identifying timestamps associated with the data, removing extraneous data, parsing data, indexing data, separating data, categorizing data, routing data based on criteria relating to the data being routed, and/or performing other data transformations, etc.

In some cases, the data processed by the intake system 110 may be communicated or made available to the indexing system 112, the query system 114, and/or to other systems. In some embodiments, the intake system 110 communicates or makes available streams of data using one or more shards. For example, the indexing system 112 may read or receive data from one shard and another system may receive data from another shard. As another example, multiple systems may receive data from the same shard.

As used herein, a partition may refer to a logical division of data. In some cases, the logical division of data may refer to a portion of a data stream, such as a shard from the intake system 110. In certain cases, the logical division of data may refer to an index or other portion of data stored in the storage system 116, such as different directories or file structures used to store data or buckets. Accordingly, it will be understood that the logical division of data referenced by the term partition will be understood based on the context of its use.

FIGS. 3B and 3C are block diagrams illustrating embodiments of various data structures for storing data processed by the system 102. FIG. 3B includes an expanded view illustrating an example of machine data stored in a data store 310 of the data storage system 116. It will be understood that the depiction of machine data and associated metadata as rows and columns in the table 319 of FIG. 3B is merely illustrative and is not intended to limit the data format in which the machine data and metadata is stored in various embodiments described herein. In one particular embodiment, machine data may be stored in a compressed or encrypted format. In such embodiments, the machine data may be stored with or be associated with data that describes the compression or encryption scheme with which the machine data is stored. The information about the compression or encryption scheme may be used to decompress or decrypt the machine data, and any metadata with which it is stored, at search time.

In the illustrated embodiment of FIG. 3B the data store 310 includes a directory 312 (individually referred to as 312A, 312B) for each index (or partition) that contains a portion of data stored in the data store 310 and a sub-directory 314 (individually referred to as 314A, 314B, 314C) for one or more buckets of the index. In the illustrated embodiment of FIG. 3B, each sub-directory 314 corresponds to a bucket and includes an event data file 316 (individually referred to as 316A, 316B, 316C) and an inverted index 318 (individually referred to as 318A, 318B, 318C). However, it will be understood that each bucket may be associated with fewer or more files and each sub-directory 314 may store fewer or more files.

In the illustrated embodiment, the data store 310 includes a _main directory 312A associated with an index "_main" and a _test directory 312B associated with an index "_test." However, the data store 310 may include fewer or more directories. In some embodiments, multiple indexes may share a single directory, or all indexes may share a common directory. Additionally, although illustrated as a single data store 310, it will be understood that the data store 310 may be implemented as multiple data stores storing different portions of the information shown in FIG. 3C. For example, a single index may span multiple directories or multiple data stores.

Furthermore, although not illustrated in FIG. 3B, it will be understood that, in some embodiments, the data store 310 may include directories for each tenant and sub-directories for each index of each tenant, or vice versa. Accordingly, the directories 312A and 312B may, in certain embodiments, correspond to sub-directories of a tenant or include sub-directories for different tenants.

In the illustrated embodiment of FIG. 3B, two sub-directories 314A, 314B of the main directory 312A and one sub-directory 312C of the _test directory 312B are shown. The sub-directories 314A, 314B, 314C may correspond to buckets of the indexes associated with the directories 312A, 312B. For example, the sub-directories 314A and 314B may correspond to buckets "B1" and "B2," respectively, of the index "_main" and the sub-directory 314C may correspond to bucket "B1" of the index "_test." Accordingly, even though there are two "B1" buckets shown, as each "B1" bucket is associated with a different index (and corresponding directory 312), the system 102 may uniquely identify them.

Although illustrated as buckets "B1" and "B2," it will be understood that the buckets (and/or corresponding sub-directories 314) may be named in a variety of ways. In certain embodiments, the bucket (or sub-directory) names may include information about the bucket. For example, the bucket name may include the name of the index with which the bucket is associated, a time range of the bucket, etc.

As described herein, each bucket may have one or more files associated with it, including, but not limited to one or more raw machine data files, bucket summary files, filter files, inverted indexes (also referred to herein as high-performance indexes or keyword indexes), permissions files, configuration files, etc. In the illustrated embodiment of FIG. 3B, the files associated with a particular bucket may be stored in the sub-directory corresponding to the particular bucket. Accordingly, the files stored in the sub-directory 314A may correspond to or be associated with bucket "B1," of index "_main," the files stored in the sub-directory 314B may correspond to or be associated with bucket "B2" of index "_main," and the files stored in the sub-directory 314C may correspond to or be associated with bucket "B1" of index "_test."

FIG. 3B further illustrates an expanded event data file 316C showing an example of data that may be stored therein. In the illustrated embodiment, four events 320, 322, 324, 326 of the machine data file 316C are shown in four rows. Each event 320-326 includes machine data 330 and a timestamp 332. The machine data 330 may correspond to the machine data received by the system 102. For example, in the illustrated embodiment, the machine data 330 of events 320, 322, 324, 326 corresponds to portions 302A, 302B, 302C, 302D, respectively, of the machine data 302 after it was processed by the indexing system 112.

Metadata 334-338 associated with the events 320-326 is also shown in the table 319. In the illustrated embodiment, the metadata 334-338 includes information about a host 334, source 336, and sourcetype 338 associated with the events 320-326. Any of the metadata may be extracted from the corresponding machine data, or supplied or defined by an entity, such as a user or computer system. The metadata fields 334-338 may become part of, stored with, or otherwise associated with the events 320-326. In certain embodiments, the metadata 334-338 may be stored in a separate file of the sub-directory 314C and associated with the machine data file 316C. In some cases, while the timestamp 332 may be extracted from the raw data of each event, the values for the other metadata fields may be determined by the indexing system 112 based on information it receives pertaining to the host device 104 or data source of the data separate from the machine data.

While certain default or user-defined metadata fields may be extracted from the machine data for indexing purposes, the machine data within an event may be maintained in its original condition. As such, in embodiments in which the portion of machine data included in an event is unprocessed or otherwise unaltered, it is referred to herein as a portion of raw machine data. For example, in the illustrated embodiment, the machine data of events 320-326 is identical to the portions of the machine data 302A-302D, respectively, used to generate a particular event. Similarly, the entirety of the machine data 302 may be found across multiple events. As such, unless certain information needs to be removed for some reasons (e.g., extraneous information, confidential information), all the raw machine data contained in an event may be preserved and saved in its original form. Accordingly, the data store in which the event records are stored is sometimes referred to as a "raw record data store." The raw record data store contains a record of the raw event data tagged with the various fields.

In other embodiments, the portion of machine data in an event may be processed or otherwise altered relative to the machine data used to create the event. With reference to the machine data 304, the machine data of a corresponding event (or events) may be modified such that only a portion of the machine data 304 is stored as one or more events. For example, in some cases, only machine data 304B of the machine data 304 may be retained as one or more events or the machine data 304 may be altered to remove duplicate data, confidential information, etc.

In FIG. 3B, the first three rows of the table 319 present events 320, 322, and 324 and are related to a server access log that records requests from multiple clients processed by a server, as indicated by entry of "access.log" in the source column 336. In the example shown in FIG. 3B, each of the events 320-324 is associated with a discrete request made to the server by a client. The raw machine data generated by the server and extracted from a server access log may include the IP address 1140 of the client, the user id 1141 of the person requesting the document, the time 1142 the server finished processing the request, the request line 1143 from the client, the status code 1144 returned by the server to the client, the size of the object 1145 returned to the client (in this case, the gif file requested by the client) and the time spent 1146 to serve the request in microseconds. In the illustrated embodiments of FIGS. 3A, 3B, all the raw machine data retrieved from the server access log is retained and stored as part of the corresponding events 320-324 in the file 316C.

Event 326 is associated with an entry in a server error log, as indicated by "error.log" in the source column 336 that records errors that the server encountered when processing a client request. Similar to the events related to the server access log, all the raw machine data in the error log file pertaining to event 326 may be preserved and stored as part of the event 326.

Saving minimally processed or unprocessed machine data in a data store associated with metadata fields in the manner similar to that shown in FIG. 3B is advantageous because it allows search of all the machine data at search time instead of searching only previously specified and identified fields or field-value pairs. As mentioned above, because data structures used by various embodiments of the present disclosure maintain the underlying raw machine data and use a late-binding schema for searching the raw machines data, it enables a user to continue investigating and learn valuable insights about the raw data. In other words, the user is not compelled to know about all the fields of information that will be needed at data ingestion time. As a user learns more about the data in the events, the user may continue to refine the late-binding schema by defining new extraction rules or modifying or deleting existing extraction rules used by the system.

FIG. 3C illustrates an embodiment of another file that may be included in one or more subdirectories 314 or buckets. Specifically, FIG. 3C illustrates an exploded view of an embodiments of an inverted index 318B in the sub-directory 314B, associated with bucket "B2" of the index "_main," as well as an event reference array 340 associated with the inverted index 318B.

In some embodiments, the inverted indexes 318 may correspond to distinct time-series buckets. As such, each inverted index 318 may correspond to a particular range of time for an index. In the illustrated embodiment of FIG. 3C, the inverted indexes 318A, 318B correspond to the buckets "B1" and "B2," respectively, of the index "_main," and the inverted index 318C corresponds to the bucket "B1" of the index "_test." In some embodiments, an inverted index 318 may correspond to multiple time-series buckets (e.g., include information related to multiple buckets) or inverted indexes 318 may correspond to a single time-series bucket.

Each inverted index 318 may include one or more entries, such as keyword (or token) entries 342 or field-value pair entries 344. Furthermore, in certain embodiments, the inverted indexes 318 may include additional information, such as a time range 346 associated with the inverted index or an index identifier 348 identifying the index associated with the inverted index 318. It will be understood that each inverted index 318 may include less or more information than depicted. For example, in some cases, the inverted indexes 318 may omit a time range 346 and/or index identifier 348. In some such embodiments, the index associated with the inverted index 318 may be determined based on the location (e.g., directory 312) of the inverted index 318 and/or the time range of the inverted index 318 may be determined based on the name of the sub-directory 314.

Token entries, such as token entries 342 illustrated in inverted index 318B, may include a token 342A (e.g., "error," "itemID," etc.) and event references 342B indicative of events that include the token. For example, for the token "error," the corresponding token entry includes the token "error" and an event reference, or unique identifier, for each event stored in the corresponding time-series bucket that includes the token "error." In the illustrated embodiment of FIG. 3C, the error token entry includes the identifiers 3, 5, 6, 8, 11, and 12 corresponding to events located in the bucket "B2" of the index "main."

In some cases, some token entries may be default entries, automatically determined entries, or user specified entries. In some embodiments, the indexing system 112 may identify each word or string in an event as a distinct token and generate a token entry for the identified word or string. In some cases, the indexing system 112 may identify the beginning and ending of tokens based on punctuation, spaces, etc. In certain cases, the indexing system 112 may rely on user input or a configuration file to identify tokens for token entries 342, etc. It will be understood that any combination of token entries may be included as a default, automatically determined, or included based on user-specified criteria.

Similarly, field-value pair entries, such as field-value pair entries 344 shown in inverted index 318B, may include a field-value pair 344A and event references 344B indicative of events that include a field value that corresponds to the field-value pair (or the field-value pair). For example, for a field-value pair sourcetype::sendmail, a field-value pair entry 344 may include the field-value pair "sourcetype::sendmail" and a unique identifier, or event reference, for each event stored in the corresponding time-series bucket that includes a sourcetype "sendmail."

In some cases, the field-value pair entries 344 may be default entries, automatically determined entries, or user specified entries. As a non-limiting example, the field-value pair entries for the fields "host," "source," and "sourcetype" may be included in the inverted indexes 318 as a default. As such, all of the inverted indexes 318 may include field-value pair entries for the fields "host," "source," and "sourcetype." As yet another non-limiting example, the field-value pair entries for the field "IP_address" may be user specified and may only appear in the inverted index 318B or the inverted indexes 318A, 318B of the index "main" based on user-specified criteria. As another non-limiting example, as the indexing system 112 indexes the events, it may automatically identify field-value pairs and create field-value pair entries 344. For example, based on the indexing system's 212 review of events, it may identify IP_address as a field in each event and add the IP_address field-value pair entries to the inverted index 318B (e.g., based on punctuation, like two keywords separated by an '=' or ':' etc.). It will be understood that any combination of field-value pair entries may be included as a default, automatically determined, or included based on user-specified criteria.

With reference to the event reference array 340, each unique identifier 350, or event reference, may correspond to a unique event located in the time series bucket or machine data file 316B. The same event reference may be located in multiple entries of an inverted index 318. For example, if an event has a sourcetype "splunkd," host "www1" and token "warning," then the unique identifier for the event may appear in the field-value pair entries 344 "sourcetype::splunkd" and "host::www1," as well as the token entry "warning." With reference to the illustrated embodiment of FIG. 3C and the event that corresponds to the event reference 3, the event reference 3 is found in the field-value pair entries 344 "host::hostA," "source::sourceB," "sourcetype::sourcetypeA," and "IP_address::91.205.189.15" indicating that the event corresponding to the event references is from hostA, sourceB, of sourcetypeA, and includes "91.205.189.15" in the event data.

For some fields, the unique identifier is located in only one field-value pair entry for a particular field. For example, the inverted index 318 may include four sourcetype field-value pair entries 344 corresponding to four different sourcetypes of the events stored in a bucket (e.g., sourcetypes: sendmail, splunkd, web_access, and web_service). Within those four sourcetype field-value pair entries, an identifier for a particular event may appear in only one of the field-value pair entries. With continued reference to the example illustrated embodiment of FIG. 3C, since the event reference 7 appears in the field-value pair entry "sourcetype::sourcetypeA," then it does not appear in the other field-value pair entries for the sourcetype field, including "sourcetype::sourcetypeB," "sourcetype::sourcetypeC," and "sourcetype::sourcetypeD."

The event references 350 may be used to locate the events in the corresponding bucket or machine data file 316. For example, the inverted index 318B may include, or be associated with, an event reference array 340. The event reference array 340 may include an array entry 350 for each event reference in the inverted index 318B. Each array entry 350 may include location information 352 of the event corresponding to the unique identifier (non-limiting example: seek address of the event, physical address, slice ID, etc.), a timestamp 354 associated with the event, or additional information regarding the event associated with the event reference, etc.

For each token entry 342 or field-value pair entry 344, the event reference 342B, 344B, respectively, or unique identifiers may be listed in chronological order or the value of the event reference may be assigned based on chronological data, such as a timestamp associated with the event referenced by the event reference. For example, the event reference 1 in the illustrated embodiment of FIG. 3C may correspond to the first-in-time event for the bucket, and the event reference 12 may correspond to the last-in-time event for the bucket. However, the event references may be listed in any order, such as reverse chronological order, ascending order, descending order, or some other order (e.g., based on time received or added to the machine data file), etc. Further, the entries may be sorted. For example, the entries may be sorted alphabetically (collectively or within a particular group), by entry origin (e.g., default, automatically generated, user-specified, etc.), by entry type (e.g., field-value pair entry, token entry, etc.), or chronologically by when added to the inverted index, etc. In the illustrated embodiment of FIG. 3C, the entries are sorted first by entry type and then alphabetically.

In some cases, inverted indexes 318 may decrease the search time of a query. For example, for a statistical query, by using the inverted index, the system 102 may avoid the computational overhead of parsing individual events in a machine data file 316. Instead, the system 102 may use the inverted index 318 separate from the raw record data store to generate responses to the received queries.

3.0. Query Processing and Execution

FIG. 4A is a flow diagram illustrating an embodiment of a routine implemented by the query system 114 for executing a query. At block 402, the query system 114 receives a search query. As described herein, the query may be in the form of a pipelined command language or other query language and include filter criteria used to identify a set of data and processing criteria used to process the set of data.

At block 404, the query system 114 processes the query. As part of processing the query, the query system 114 may determine whether the query was submitted by an authenticated user and/or review the query to determine that it is in a proper format for the data intake and query system 102, has correct semantics and syntax, etc. In addition, the query system 114 may determine what, if any, configuration files or other configurations to use as part of the query.

In addition, as part of processing the query, the query system 114 may determine what portion(s) of the query to execute in a distributed manner (e.g., what to delegate to search nodes) and what portions of the query to execute in a non-distributed manner (e.g., what to execute on the search head). For the parts of the query that are to be executed in a distributed manner, the query system 114 may generate specific commands, for the components that are to execute the query. This may include generating subqueries, partial queries or different phases of the query for execution by different components of the query system 114. In some cases, the query system 114 may use map-reduce techniques to determine how to map the data for the search and then reduce the data. Based on the map-reduce phases, the query system 114 may generate query commands for different components of the query system 114.

As part of processing the query, the query system 114 may determine where to obtain the data. For example, in some cases, the data may reside on one or more indexing nodes or search nodes, as part of the storage system 116 or may reside in a shared storage system or a system external to the system 102. In some cases, the query system 114 may determine what components to use to obtain and process the data. For example, the query system 114 may identify search nodes that are available for the query, etc.

At block 406, the query system 114 distributes the determined portions or phases of the query to the appropriate components (e.g., search nodes). In some cases, the query system 114 may use a catalog to determine which components to use to execute the query (e.g., which components include relevant data and/or are available, etc.).

At block 408, the components assigned to execute the query, execute the query. As mentioned, different components may execute different portions of the query. In some cases, multiple components (e.g., multiple search nodes) may execute respective portions of the query concurrently and communicate results of their portion of the query to another component (e.g., search head). As part of the identifying the set of data or applying the filter criteria, the components of the query system 114 may search for events that match the criteria specified in the query. These criteria may include matching keywords or specific values for certain fields. The searching operations at block 408 may use the late-binding schema to extract values for specified fields from events at the time the query is processed. In some embodiments, one or more rules for extracting field values may be specified as part of a sourcetype definition in a configuration file or in the query itself. In certain embodiments where search nodes are used to obtain the set of data, the search nodes may send the relevant events back to the search head, or use the events to determine a partial result, and send the partial result back to the search head.

At block 410, the query system 114 combines the partial results and/or events to produce a final result for the query. As mentioned, in some cases, combining the partial results and/or finalizing the results may include further processing the data according to the query. Such processing may entail joining different set of data, transforming the data, and/or performing one or more mathematical operations on the data, preparing the results for display, etc.

In some examples, the results of the query are indicative of performance or security of the IT environment and may help improve the performance of components in the IT environment. This final result may comprise different types of data depending on what the query requested. For example, the results may include a listing of matching events returned by the query, or some type of visualization of the data from the returned events. In another example, the final result may include one or more calculated values derived from the matching events.

The results generated by the query system 114 may be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring to the search jobs.

The query system 114 may also perform various operations to make the search more efficient. For example, before the query system 114 begins execution of a query, it may determine a time range for the query and a set of common keywords that all matching events include. The query system 114 may then use these parameters to obtain a superset of the eventual results. Then, during a filtering stage, the query system 114 may perform field-extraction operations on the superset to produce a reduced set of search results. This speeds up queries, which may be particularly helpful for queries that are performed on a periodic basis. In some cases, to make the search more efficient, the query system 114 may use information known about certain data sets that are part of the query to filter other data sets. For example, if an early part of the query includes instructions to obtain data with a particular field, but later commands of the query do not rely on the data with that particular field, the query system 114 may omit the superfluous part of the query from execution.

Various embodiments of the present disclosure may be implemented using, or in conjunction with, a pipelined command language. A pipelined command language is a language in which a set of inputs or data is operated on by a first command in a sequence of commands, and then subsequent commands in the order they are arranged in the sequence. Such commands may include any type of functionality for operating on data, such as retrieving, searching, filtering, aggregating, processing, transmitting, and the like. As described herein, a query may thus be formulated in a pipelined command language and include any number of ordered or unordered commands for operating on data.

Splunk Processing Language (SPL) is an example of a pipelined command language in which a set of inputs or data is operated on by any number of commands in a particular sequence. A sequence of commands, or command sequence, may be formulated such that the order in which the commands are arranged defines the order in which the commands are applied to a set of data or the results of an earlier executed command. For example, a first command in a command sequence may include filter criteria used to search or filter for specific data. The results of the first command may then be passed to another command listed later in the command sequence for further processing.

In various embodiments, a query may be formulated as a command sequence defined in a command line of a search UI. In some embodiments, a query may be formulated as a sequence of SPL commands. Some or all of the SPL commands in the sequence of SPL commands may be separated from one another by a pipe symbol "|." In such embodiments, a set of data, such as a set of events, may be operated on by a first SPL command in the sequence, and then a subsequent SPL command following a pipe symbol "|" after the first SPL command operates on the results produced by the first SPL command or other set of data, and so on for any additional SPL commands in the sequence. As such, a query formulated using SPL comprises a series of consecutive commands that are delimited by pipe "|" characters. The pipe character indicates to the system that the output or result of one command (to the left of the pipe) should be used as the input for one of the subsequent commands (to the right of the pipe). This enables formulation of queries defined by a pipeline of sequenced commands that refines or enhances the data at each step along the pipeline until the desired results are attained. Accordingly, various embodiments described herein may be implemented with Splunk Processing Language (SPL) used in conjunction with the SPLUNK® ENTERPRISE system.

While a query may be formulated in many ways, a query may start with a search command and one or more corresponding search terms or filter criteria at the beginning of the pipeline. Such search terms or filter criteria may include any combination of keywords, phrases, times, dates, Boolean expressions, fieldname-field value pairs, etc. that specify which results should be obtained from different locations. The results may then be passed as inputs into subsequent commands in a sequence of commands by using, for example, a pipe character. The subsequent commands in a sequence may include directives for additional processing of the results once it has been obtained from one or more indexes. For example, commands may be used to filter unwanted information out of the results, extract more information, evaluate field values, calculate statistics, reorder the results, create an alert, create summary of the results, or perform some type of aggregation function. In some embodiments, the summary may include a graph, chart, metric, or other visualization of the data. An aggregation function may include analysis or calculations to return an aggregate value, such as an average value, a sum, a maximum value, a root mean square, statistical values, and the like.

Due to its flexible nature, use of a pipelined command language in various embodiments is advantageous because it may perform "filtering" as well as "processing" functions. In other words, a single query may include a search command and search term expressions, as well as data-analysis expressions. For example, a command at the beginning of a query may perform a "filtering" step by retrieving a set of data based on a condition (e.g., records associated with server response times of less than 1 microsecond). The results of the filtering step may then be passed to a subsequent command in the pipeline that performs a "processing" step (e.g., calculation of an aggregate value related to the filtered events such as the average response time of servers with response times of less than 1 microsecond). Furthermore, the search command may allow events to be filtered by keyword as well as field criteria. For example, a search command may filter events based on the word "warning" or filter events based on a field value "10.0.1.2" associated with a field "clientip."

The results obtained or generated in response to a command in a query may be considered a set of results data. The set of results data may be passed from one command to another in any data format. In one embodiment, the set of result data may be in the form of a dynamically created table. Each command in a particular query may redefine the shape of the table. In some implementations, an event retrieved from an index in response to a query may be considered a row with a column for each field value. Columns may contain basic information about the data and/or data that has been dynamically extracted at search time.

FIG. 4B provides a visual representation of the manner in which a pipelined command language or query may operate in accordance with the disclosed embodiments. The query 430 may be input by the user and submitted to the query system 114. In the illustrated embodiment, the query 430 comprises filter criteria 430A, followed by two commands 430B, 430C (namely, Command1 and Command2). Disk 422 represents data as it is stored in a data store to be searched. For example, disk 422 may represent a portion of the storage system 116 or some other data store that may be searched by the query system 114. Individual rows of may represent different events and columns may represent different fields for the different events. In some cases, these fields may include raw machine data, host, source, and sourcetype.

At block 440, the query system 114 uses the filter criteria 430A (e.g., "sourcetype=syslog ERROR") to filter events stored on the disk 422 to generate an intermediate results table 424. Given the semantics of the query 430 and order of the commands, the query system 114 may execute the filter criteria 430A portion of the query 430 before executing Command1 or Command2.

Rows in the table 424 may represent individual records, where each record corresponds to an event in the disk 422 that satisfied the filter criteria. Columns in the table 424 may correspond to different fields of an event or record, such as "user," "count," percentage," "timestamp," or the raw machine data of an event, etc. Notably, the fields in the intermediate results table 424 may differ from the fields of the events on the disk 422. In some cases, this may be due to the late binding schema described herein that may be used to extract field values at search time. Thus, some of the fields in table 424 may not have existed in the events on disk 422.

Illustratively, the intermediate results table 424 has fewer rows than what is shown in the disk 422 because only a subset of events retrieved from the disk 422 matched the filter criteria 430A "sourcetype=syslog ERROR." In some embodiments, instead of searching individual events or raw machine data, the set of events in the intermediate results table 424 may be generated by a call to a pre-existing inverted index.

At block 442, the query system 114 processes the events of the first intermediate results table 424 to generate the second intermediate results table 426. With reference to the query 430, the query system 114 processes the events of the first intermediate results table 424 to identify the top users according to Command1. This processing may include determining a field value for the field "user" for each record in the intermediate results table 424, counting the number of unique instances of each "user" field value (e.g., number of users with the name David, John, Julie, etc.) within the intermediate results table 424, ordering the results from largest to smallest based on the count, and then keeping only the top 10 results (e.g., keep an identification of the top 10 most common users). Accordingly, each row of table 426 may represent a record that includes a unique field value for the field "user," and each column may represent a field for that record, such as fields "user," "count," and "percentage."

At block 444, the query system 114 processes the second intermediate results table 426 to generate the final results table 428. With reference to query 430, the query system 114 applies the command "fields-present" to the second intermediate results table 426 to generate the final results table 428. As shown, the command "fields-present" of the query 430 results in one less column, which may represent that a field was removed during processing. For example, the query system 114 may have determined that the field "percentage" was unnecessary for displaying the results based on the Command2. In such a scenario, each record of the final results table 428 would include a field "user," and "count." Further, the records in the table 428 would be ordered from largest count to smallest count based on the query commands.

It will be understood that the final results table 428 may be a third intermediate results table, which may be pipelined to another stage where further filtering or processing of the data may be performed, e.g., preparing the data for display purposes, filtering the data based on a condition, performing a mathematical calculation with the data, etc. In different embodiments, other query languages, such as the Structured Query Language ("SQL"), may be used to create a query.

As described herein, extraction rules may be used to extract field-value pairs or field values from data. An extraction rule may comprise one or more regex rules that specify how to extract values for the field corresponding to the extraction rule. In addition to specifying how to extract field values, the extraction rules may also include instructions for deriving a field value by performing a function on a character string or value retrieved by the extraction rule. For example, an extraction rule may truncate a character string or convert the character string into a different data format. Extraction rules may be used to extract one or more values for a field from events by parsing the portions of machine data in the events and examining the data for one or more patterns of characters, numbers, delimiters, etc., that indicate where the field begins and, optionally, ends. In certain embodiments, extraction rules may be stored in one or more configuration files. In some cases, a query itself may specify one or more extraction rules.

In some cases, extraction rules may be applied at data ingest by the intake system 110 and/or indexing system 112. For example, the intake system 110 and indexing system 112 may apply extraction rules to ingested data and/or events generated from the ingested data and store results in an inverted index.

The system 102 advantageously allows for search time field extraction. In other words, fields may be extracted from the event data at search time using late-binding schema as opposed to at data ingestion time, which was a major limitation of the prior art systems. Accordingly, extraction rules may be applied at search time by the query system 114. The query system may apply extraction rules to events retrieved from the storage system 116 or data received from sources external to the system 102. Extraction rules may be applied to all the events in the storage system 116 or to a subset of the events that have been filtered based on some filter criteria (e.g., event timestamp values, etc.).

Figure 4C:
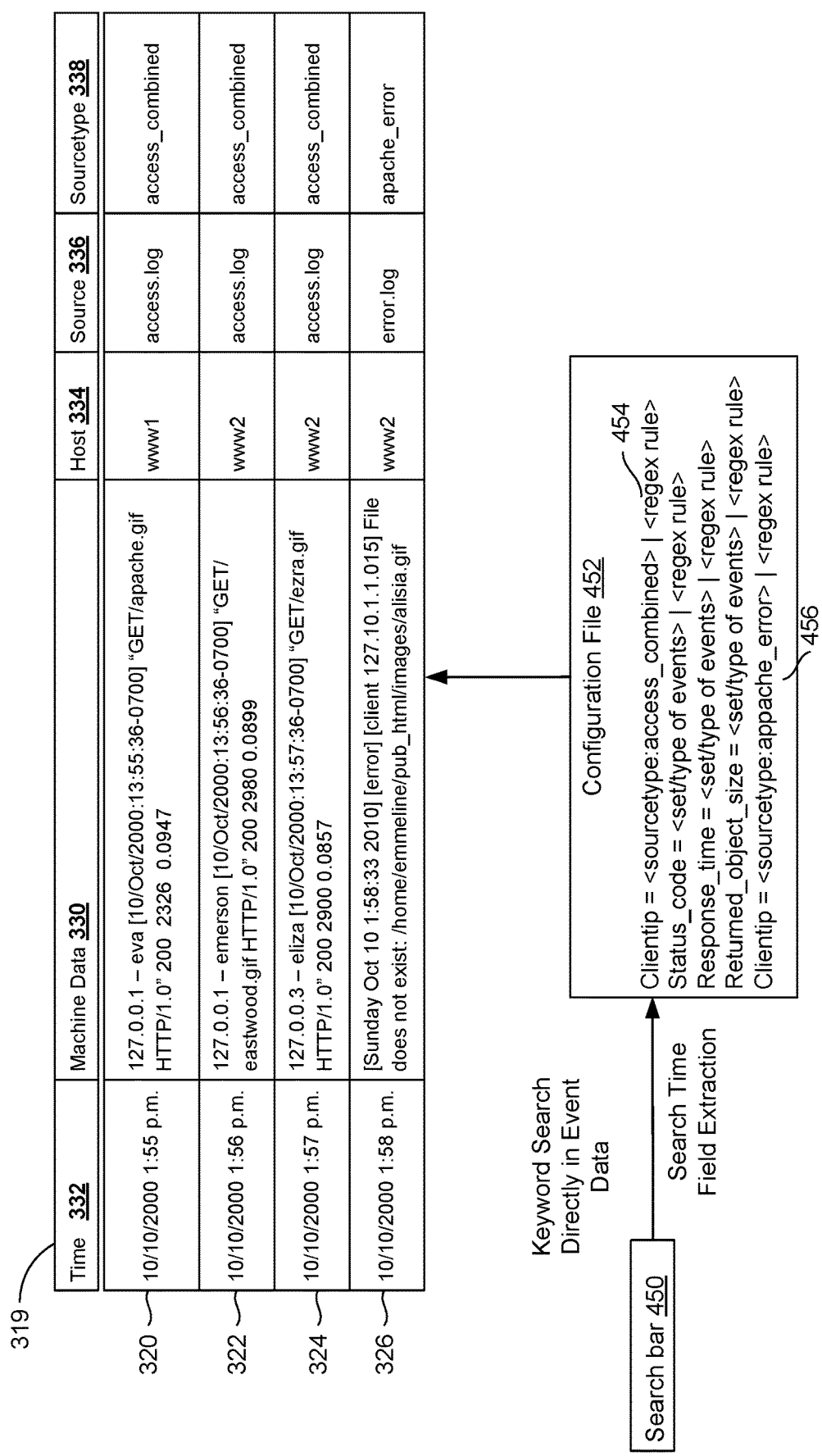
FIG. 4C is a block diagram illustrating an embodiment of a configuration file that includes various extraction rules that may be applied to events.

FIG. 4C is a block diagram illustrating an embodiment of the table 319 showing events 320-326, described previously with reference to FIG. 3B. As described herein, the table 319 is for illustrative purposes, and the events 320-326 may be stored in a variety of formats in an event data file 316 or raw record data store. Further, it will be understood that the event data file 316 or raw record data store may store millions of events. FIG. 4C also illustrates an embodiment of a search bar 450 for entering a query and a configuration file 452 that includes various extraction rules that may be applied to the events 320-326.

As a non-limiting example, if a user inputs a query into search bar 450 that includes only keywords (also known as "tokens"), e.g., the keyword "error" or "warning," the query system 114 may search for those keywords directly in the events 320-326 stored in the raw record data store.

As described herein, the indexing system 112 may optionally generate and use an inverted index with keyword entries to facilitate fast keyword searching for event data. If a user searches for a keyword that is not included in the inverted index, the query system 114 may nevertheless be able to retrieve the events by searching the event data for the keyword in the event data file 316 or raw record data store directly. For example, if a user searches for the keyword "eva," and the name "eva" has not been indexed at search time, the query system 114 may search the events 320-326 directly and return the first event 320. In the case where the keyword has been indexed, the inverted index may include a reference pointer that will allow for a more efficient retrieval of the event data from the data store. If the keyword has not been indexed, the query system 114 may search through the events in the event data file to service the search.

In many cases, a query includes fields. The term "field" refers to a location in the event data containing one or more values for a specific data item. Often, a field is a value with a fixed, delimited position on a line, or a name and value pair, where there is a single value to each field name. A field may also be multivalued, that is, it may appear more than once in an event and have a different value for each appearance, e.g., email address fields. Fields are searchable by the field name or field name-value pairs. Some examples of fields are "clientip" for IP addresses accessing a web server, or the "From" and "To" fields in email addresses.

By way of further example, consider the query, "status=404." This search query finds events with "status" fields that have a value of "404." When the search is run, the query system 114 does not look for events with any other "status" value. It also does not look for events containing other fields that share "404" as a value. As a result, the search returns a set of results that are more focused than if "404" had been used in the search string as part of a keyword search. Note also that fields may appear in events as "key=value" pairs such as "user_name=Bob." But in most cases, field values appear in fixed, delimited positions without identifying keys. For example, the data store may contain events where the "user_name" value always appears by itself after the timestamp as illustrated by the following string: "November 15 09:33:22 evaemerson."

FIG. 4C illustrates the manner in which configuration files may be used to configure custom fields at search time in accordance with the disclosed embodiments. In response to receiving a query, the query system 114 determines if the query references a "field." For example, a query may request a list of events where the "clientip" field equals "127.0.0.1." If the query itself does not specify an extraction rule and if the field is not an indexed metadata field, e.g., time, host, source, sourcetype, etc., then in order to determine an extraction rule, the query system 114 may, in one or more embodiments, locate configuration file 452 during the execution of the query.

Configuration file 452 may contain extraction rules for various fields, e.g., the "clientip" field. The extraction rules may be inserted into the configuration file 452 in a variety of ways. In some embodiments, the extraction rules may comprise regular expression rules that are manually entered in by the user.

In one or more embodiments, as noted above, a field extractor may be configured to automatically generate extraction rules for certain field values in the events when the events are being created, indexed, or stored, or possibly at a later time. In one embodiment, a user may be able to dynamically create custom fields by highlighting portions of a sample event that should be extracted as fields using a graphical user interface. The system may then generate a regular expression that extracts those fields from similar events and store the regular expression as an extraction rule for the associated field in the configuration file 452.

In some embodiments, the indexing system 112 may automatically discover certain custom fields at index time and the regular expressions for those fields will be automatically generated at index time and stored as part of extraction rules in configuration file 452. For example, fields that appear in the event data as "key=value" pairs may be automatically extracted as part of an automatic field discovery process. Note that there may be several other ways of adding field definitions to configuration files in addition to the methods discussed herein.

Events from heterogeneous sources that are stored in the storage system 116 may contain the same fields in different locations due to discrepancies in the format of the data generated by the various sources. For example, event 326 also contains a "clientip" field, however, the "clientip" field is in a different format from events 320, 322, and 324. Furthermore, certain events may not contain a particular field at all. To address the discrepancies in the format and content of the different types of events, the configuration file 452 may specify the set of events to which an extraction rule applies. For example, extraction rule 454 specifies that it is to be used with events having a sourcetype "access_combined," and extraction rule 456 specifies that it is to be used with events having a sourcetype "apache_error." Other extraction rules shown in configuration file 452 specify a set or type of events to which they apply. In addition, the extraction rules shown in configuration file 452 include a regular expression for parsing the identified set of events to determine the corresponding field value. Accordingly, each extraction rule may pertain to only a particular type of event. Accordingly, if a particular field, e.g., "clientip" occurs in multiple types of events, each of those types of events may have its own corresponding extraction rule in the configuration file 452 and each of the extraction rules would comprise a different regular expression to parse out the associated field value. In some cases, the sets of events are grouped by sourcetype because events generated by a particular source may have the same format.

The field extraction rules stored in configuration file 452 may be used to perform search-time field extractions. For example, for a query that requests a list of events with sourcetype "access_combined" where the "clientip" field equals "127.0.0.1," the query system 114 may locate the configuration file 452 to retrieve extraction rule 454 that allows it to extract values associated with the "clientip" field from the events where the sourcetype is "access_combined" (e.g., events 320-324). After the "clientip" field has been extracted from the events 320, 322, 324, the query system 114 may then apply the field criteria by performing a compare operation to filter out events where the "clientip" field does not equal "127.0.0.1." In the example shown in FIG. 4C, the events 320 and 322 would be returned in response to the user query. In this manner, the query system 114 may service queries with filter criteria containing field criteria and/or keyword criteria.

It should also be noted that any events filtered by performing a search-time field extraction using a configuration file 452 may be further processed by directing the results of the filtering step to a processing step using a pipelined search language. Using the prior example, a user may pipeline the results of the compare step to an aggregate function by asking the query system 114 to count the number of events where the "clientip" field equals "127.0.0.1."

By providing the field definitions for the queried fields at search time, the configuration file 452 allows the event data file or raw record data store to be field searchable. In other words, the raw record data store may be searched using keywords as well as fields, wherein the fields are searchable name/value pairings that may distinguish one event from another event and may be defined in configuration file 452 using extraction rules. In comparison to a search containing field names, a keyword search may result in a search of the event data directly without the use of a configuration file.

Further, the ability to add schema to the configuration file 452 at search time results in increased efficiency and flexibility. A user may create new fields at search time and simply add field definitions to the configuration file 452. As a user learns more about the data in the events, the user may continue to refine the late-binding schema by adding new fields, deleting fields, or modifying the field extraction rules in the configuration file for use the next time the schema is used by the system 102. Because the system 102 maintains the underlying raw data and uses late-binding schema for searching the raw data, it enables a user to continue investigating and learn valuable insights about the raw data long after data ingestion time. Similarly, multiple field definitions may be added to the configuration file to capture the same field across events generated by different sources or sourcetypes. This allows the system 102 to search and correlate data across heterogeneous sources flexibly and efficiently.

The system 102 may use one or more data models to search and/or better understand data. A data model is a hierarchically structured search-time mapping of semantic knowledge about one or more datasets. It encodes the domain knowledge used to build a variety of specialized searches of those datasets. Those searches, in turn, may be used to generate reports.

The above-described system provides significant flexibility by enabling a user to analyze massive quantities of minimally processed data "on the fly" at search time using a late-binding schema, instead of storing pre-specified portions of the data in a database at ingestion time. This flexibility enables a user to see valuable insights, correlate data, and perform subsequent queries to examine interesting aspects of the data that may not have been apparent at ingestion time.

Performing extraction and analysis operations at search time may involve a large amount of data and require a large number of computational operations, which may cause delays in processing the queries. In some embodiments, the system 102 may employ a number of unique acceleration techniques to speed up analysis operations performed at search time. These techniques include: performing search operations in parallel using multiple components of the query system 114, using an inverted index 118, and accelerating the process of generating reports.

To facilitate faster query processing, a query may be structured such that multiple components of the query system 114 (e.g., search nodes) perform the query in parallel, while aggregation of search results from the multiple components is performed at a particular component (e.g., search head). For example, consider a scenario in which a user enters the query "Search "error" | stats count BY host." The query system 114 may identify two phases for the query, including: (1) subtasks (e.g., data retrieval or simple filtering) that may be performed in parallel by multiple components, such as search nodes, and (2) a search results aggregation operation to be executed by one component, such as the search head, when the results are ultimately collected from the search nodes.

Based on this determination, the query system 114 may generate commands to be executed in parallel by the search nodes, with each search node applying the generated commands to a subset of the data to be searched. In this example, the query system 114 generates and then distributes the following commands to the individual search nodes: "Search "error" | prestats count BY host." In this example, the "prestats" command may indicate that individual search nodes are processing a subset of the data and are responsible for producing partial results and sending them to the search head. After the search nodes return the results to the search head, the search head aggregates the received results to form a single search result set. By executing the query in this manner, the system effectively distributes the computational operations across the search nodes while reducing data transfers. It will be understood that the query system 114 may employ a variety of techniques to use distributed components to execute a query. In some embodiments, the query system 114 may use distributed components for only mapping functions of a query (e.g., gather data, applying filter criteria, etc.). In certain embodiments, the query system 114 may use distributed components for mapping and reducing functions (e.g., joining data, combining data, reducing data, etc.) of a query.

4.0. Example Use Cases

The system 102 provides various schemas, dashboards, and visualizations that simplify developers' tasks to create applications with additional capabilities, including but not limited to security, data center monitoring, IT service monitoring, and client/customer insights.

An embodiment of an enterprise security application is as SPLUNK® ENTERPRISE SECURITY, which performs monitoring and alerting operations and includes analytics to facilitate identifying both known and unknown security threats based on large volumes of data stored by the system 102. The enterprise security application provides the security practitioner with visibility into security-relevant threats found in the enterprise infrastructure by capturing, monitoring, and reporting on data from enterprise security devices, systems, and applications. Through the use of the system 102 searching and reporting capabilities, the enterprise security application provides a top-down and bottom-up view of an organization's security posture.

An embodiment of an IT monitoring application is SPLUNK® IT SERVICE INTELLIGENCE™, which performs monitoring and alerting operations. The IT monitoring application also includes analytics to help an analyst diagnose the root cause of performance problems based on large volumes of data stored by the system 102 as correlated to the various services an IT organization provides (a service-centric view). This differs significantly from conventional IT monitoring systems that lack the infrastructure to effectively store and analyze large volumes of service-related events. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations when all of the original data may be needed to determine the root cause of or contributing factors to a service issue.

In contrast, an IT monitoring application system stores large volumes of minimally processed service-related data at ingestion time for later retrieval and analysis at search time, to perform regular monitoring, or to investigate a service issue. To facilitate this data retrieval process, the IT monitoring application enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the events that pertains to the entity, whether produced by the entity itself or by another machine and considering the many various ways the entity may be identified in machine data (such as by a URL, an IP address, or machine name). The service and entity definitions may organize events around a service so that all of the events pertaining to that service may be easily identified. This capability provides a foundation for the implementation of Key Performance Indicators.

As described herein, the system 102 may receive heterogeneous data from disparate systems. In some cases, the data from the disparate systems may be related and correlating the data may result in insights into client or customer interactions with various systems of a vendor. To aid in the correlation of data across different systems, multiple field definitions may be added to one or more configuration files to capture the same field or data across events generated by different sources or sourcetypes. This may enable the system 102 to search and correlate data across heterogeneous sources flexibly and efficiently.

Figure 4D:
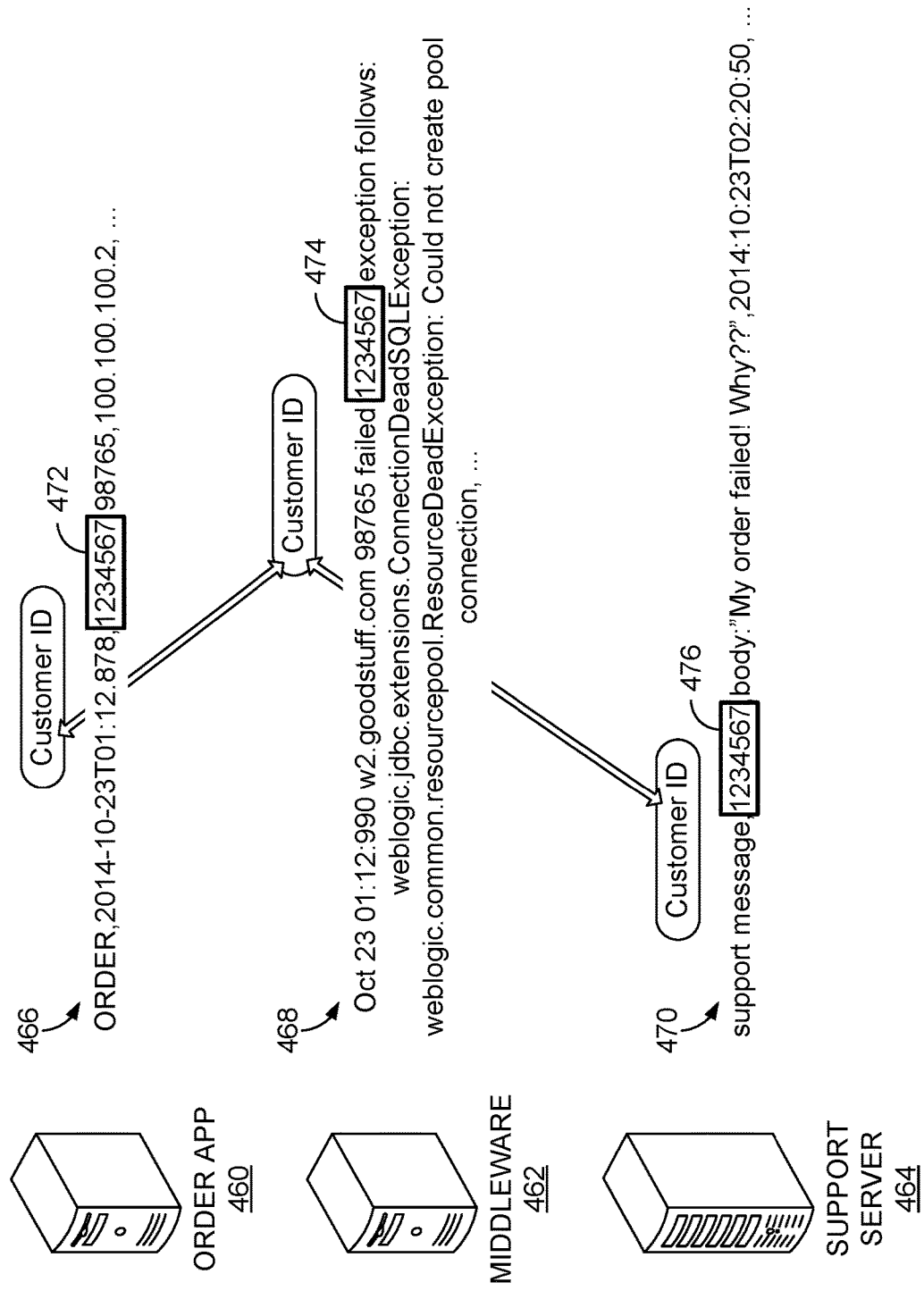
FIG. 4D is a block diagram illustrating an example scenario where a common customer identifier is found among log data received from disparate data sources.

As a non-limiting example and with reference to FIG. 4D, consider a scenario in which a common customer identifier is found among log data received from three disparate data sources. In this example, a user submits an order for merchandise using a vendor's shopping application program 460 running on the user's system. In this example, the order was not delivered to the vendor's server due to a resource exception at the destination server that is detected by the middleware code 462. The user then sends a message to the customer support server 464 to complain about the order failing to complete. The three systems 460, 462, 464 are disparate systems that do not have a common logging format. The shopping application program 460 sends log data 466 to the system 102 in one format, the middleware code 462 sends error log data 468 in a second format, and the support server 464 sends log data 470 in a third format.

Using the log data received at the system 102 from the three systems 460, 462, 464, the vendor may uniquely obtain an insight into user activity, user experience, and system behavior. The system 102 allows the vendor's administrator to search the log data from the three systems 460, 462, 464, thereby obtaining correlated information, such as the order number and corresponding customer ID number of the person placing the order. The system 102 also allows the administrator to see a visualization of related events via a user interface. The administrator may query the system 102 for customer ID field value matches across the log data from the three systems 460, 462, 464 that are stored in the storage system 116. While the customer ID field value exists in the data gathered from the three systems 460, 462, 464, it may be located in different areas of the data given differences in the architecture of the systems. The query system 114 obtains events from the storage system 116 related to the three systems 460, 462, 464. The query system 114 then applies extraction rules to the events in order to extract field values for the field "customer ID" that it may correlate. As described herein, the query system 114 may apply a different extraction rule to each set of events from each system when the event format differs among systems. In this example, a user interface may display to the administrator the events corresponding to the common customer ID field values 472, 474, and 476, thereby providing the administrator with insight into a customer's experience. The system 102 may provide additional user interfaces and reports to aid a user in analyzing the data associated with the customer.

5.0. User Interface Environment Overview

Given the amount of data ingested by a data intake and query system 108 (e.g., gigabytes of data, terabytes of data, etc.) and the myriad of ways in which the data may be identified, searched, and processed, it may be difficult for a user to know where to begin. In addition, some users of a data intake and query system 108 may be unfamiliar with the architecture of the data intake and query system 108 or the query language used to query the ingested data. These obstacles may make it difficult for a user to obtain meaningful insights from the data.

Queries displayed on a user interface, such as a graphical user interface (also referred to herein as a GUI) may span many lines of code and be complex and difficult to understand or parse. While the query may include comments or an outline, they are written by a user and static in that they do not dynamically change without user input. In addition, depending on how they are written, the outline or comments may not improve the understanding of the query commands themselves. Moreover, the comments or data processing package outline do not enable a user to modify the query indirectly (e.g., by modifying the outline).

The content of a user interface that displays a query may also be relatively static or unidirectional. For example, the user interface may provide a data processing package outline to help understand the structure of a query or display the results of the query but require direct editing of the query to make any changes to the query, data processing package outline, or search results. Alternatively, a user interface may allow a user to click on one or more display objects, and, based on the selection, run a predetermined back-end query that the user does not see and therefore may not understand or modify.

Given the amount and complexity of the data being ingested and the complexity of corresponding queries, such limitations may make it difficult to create a meaningful query that searches and transforms the data in a meaningful way. Moreover, given the amount of data to be searched and complexity of a query, one query may take several minutes, hours, or even days to complete. Thus, running additional queries or inefficient queries may create a bottleneck or burden on the underlying hardware resources.

To address these issues, a bi-directional user interface may be provided that enables a user to view and directly modify a query and/or modify the query via interaction with other portions of the GUI, such as a models panel or search results panel. In some cases, to implement the bi-directional GUI interface, multiple systems may communicate with each other to perform different tasks. In certain cases, these systems may be remotely located from each other and communicate by sending messages via a network. The messages may be HTTP messages or other internet protocol messages that enable the underlying computing devices to interpret and act on the message.

In some cases, the GUI may enable a user to view a data processing package that includes one or more data processing statements (non-limiting examples: import statements, function statements, search-related statements, export statements, etc.) and/or generate search-related statements for execution by a data intake and query system (also referred to herein as a search service). In certain cases, the GUI may enable a user to create, modify, or use interactive charts that result in the generation of one or more search-related statements and/or in the execution of one or more searches in a data intake and query system. In some cases, as a result of one or more interactions with the GUI, the system may generate a child search-related statement (e.g., using a parent search-related statement and/or one or more chart parameters), and append the generated search-related statement to a data processing package for execution by the data intake and query system. The GUI may also enable different time ranges to be applied to different statements of a data processing package.

Moreover, by generating/providing a bi-directional GUI interface, the system may enable a user to modify one or more search-related statements and/or a data processing package in a variety of ways, increasing productivity and improving the queries executed by the system.

Further, the system may generate one or more action models that correspond to one or more commands of a search-related statement, statement models that correspond to one or more search-related statements, and/or package models that correspond to a data processing package. The GUI may display the model summaries to improve the understandability of a search-related statement and/or data processing package.

The model summaries may be interactive to enable indirect editing of the search-related statements and/or data processing package. For example, an interaction with an action model display object may cause the system to determine modifications for a command or search-related statement and then implement those modifications without the user having to write code or understand the syntax of the underlying query language of the search-related statement.

The system may also automatically initiate execution of the search-related statement that is updated based on the user interactions with the action model display object and/or the data processing package to which the search-related statement belongs. This may result in the system generating improved and more efficient queries that require less time to parse or that use fewer resources. In addition, this may reduce the number of queries executed by the system, and therefore the amount of compute resources used.

In some cases, automatically executing a search-related statement may be undesired. For example, given the size of data accessed, it may take several minutes or hours for a particular search-related statements to execute. To prevent automatic execution of the search-related statement upon update, the GUI may include a pause display object selectable by a user. By pausing the automatic execution, the user can update and/or add several query parameters and/or search-related statements at one time and initiate execution of the search-related statements (or data processing package) manually. To allow automatic execution, the user can interact with the pause display object a second time to turn off automatic query pause functionality.

Utilizing the bi-directional GUI interface, a user may cause the data intake and query system to query large datasets (e.g., datasets with millions or billions of data records). Querying large datasets may take a considerable length of time as the data intake and query system retrieves and processes thousands, millions, or billions of data records. In some cases, query parameter added to a particular search-related statement may not affect the quantity of data records retrieved from the data intake and query system but may affect how the retrieved data is processed. Despite the query parameter not affecting the quantity of data records retrieved, the data intake and query system may re-retrieve all of the data records from the data sources.

To address this issue, the GUI interface may include a query acceleration data object. Upon user interaction with the search acceleration display object, the system may limit the data being processed to the data records that were retrieved (and separately stored) as part of a previous search-related statement. In this way, the GUI system may reduce or eliminate the re-retrieval of data records from data stores. This can reduce the amount of compute resources uses to retrieve data records, reduce network traffic, and reduce the amount time used to execute a search-related statement. In some cases, upon interaction with the search acceleration display object, the system may adjust one or more search-related statements. In some cases, the system may adjust a data source identifier (or dataset identifier) in a search-related statement to a different dataset identifier that references a copy of the previously retrieved data records stored separately from the original data records.

In some cases, the system directly adjusts the search-related statement in the GUI and/or may use a semantic processing system (e.g., by sending a request or command with the requested changes, receiving an updated package, and displaying the updated package as described herein).

As a user continues to modify the data processing package and/or specific search-related statements within the data processing package, the system may determine whether any of the changes affect the data records to be retrieved from the data intake and query system. If the system determines that a search-related statement references data records not found in the set of previously retrieved records, the system may automatically (or manually upon user request) retrieve the new set of data records for the search-related statement (e.g., by sending an appropriate search-related statement to the data intake and query system) and update the dataset identifier in the search-related statement to reference the copy of the new set of data records.

In some cases, by interacting with the search acceleration display object again, the user can cause the GUI to return the search-related statement to its previous form (e.g., including the data source identifier). For example, based on the determined interaction with the search acceleration display object, the system may modify (directly or using a semantic processing system) the relevant search-related statement to display the data source identifier or dataset identifier that was present before the previous interaction with the search acceleration display object.

Figure 5:
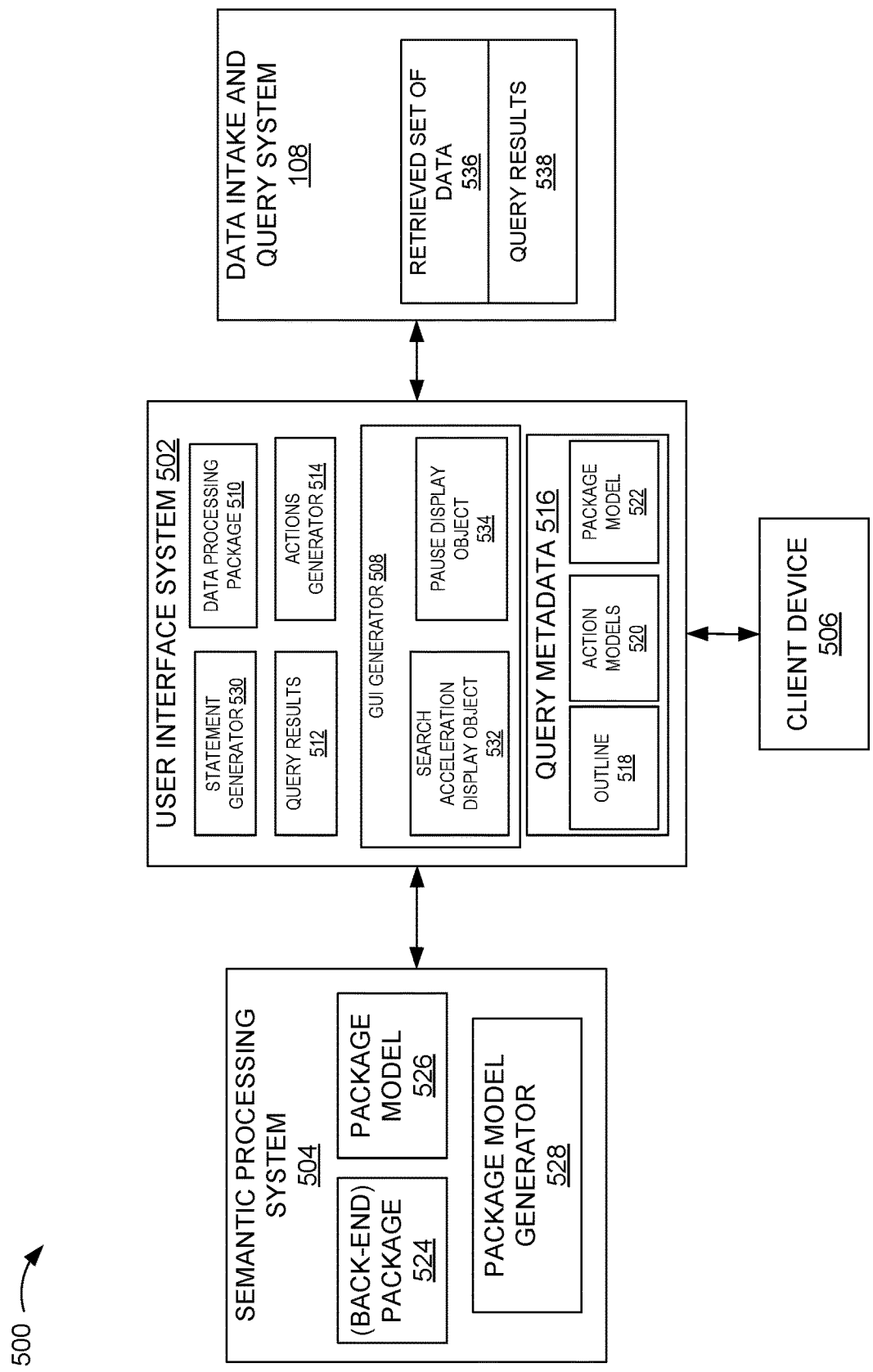
FIG. 5 is a block diagram of an embodiment of a user interface generation environment.

FIG. 5 is a block diagram of an embodiment of a user interface generation environment 500. In the illustrated embodiment, the environment 500 includes the data intake and query system 108 (also referred to herein as a search service), a user interface system 502, semantic processing system 504, and a client device 506. In some cases, the various systems may communicate with each other via one or more networks, such as a wide area network (e.g., the internet), local area network, etc. For example, the various systems may communicate using internet protocol (IP) messages, such as HTTP, that enable the underling computing devices to understand and act on the messages. In some cases, the systems may send hundreds, thousands, or millions of IP messages each minute, hour, or day, and the IP messages may cause the underlying computing devices to generate or modify data structures stored in non-transitory computer readable media, conduct distributed searches across multiple remotely located computing devices, modify graphical user interfaces displayed on a screen, etc.

In cases where one or more components are implemented on the same computing device, such as where the client device 506 and portions or all of the user interface system 502 or where the user interface system 502 and semantic processing system 504, the corresponding components may communicate via a message bus. Similar to the IP messages, the messages sent via a message bus may use a computer protocol that enables the underlying computing devices to understand and act on the messages.

The user interface system 502, semantic processing system 504, and/or client device 506, may be implemented, without limitation, using one or more smart phones, tablet computers, handheld computers, wearable devices, laptop computers, desktop computers, servers, portable media players, gaming devices, or other device that includes computer hardware (e.g., processors, non-transitory, computer-readable media, etc.) and so forth. In certain cases, the user interface system 502, semantic processing system 504, and/or client device 506 may include a hosted, virtualized, or containerized device, such as an isolated execution environment, that shares computing resources (e.g., processor, memory, etc.) of a particular machine with other isolated execution environments. The isolated execution environment may be configured to perform one or more functions of the user interface system 502, semantic processing system 504, and/or client device 506.

In the illustrated example, the user interface system 502 includes a GUI generator 508 that may generate user interface data for rendering as a graphical user interface (GUI) on the client device 506, an actions model generator 514, a statement generator 530, and one or more data stores, RAM, or cache (generically referred to herein as "memory"). The memory may store a data processing package 510 for display in the GUI (also referred to herein as the "display data processing package 510" or "displayed data processing package 510"), search results 512 received from the data intake and query system 108, and data processing metadata 516. It will be understood that the user interface system 502 may include fewer or more components as desired. For example, although not illustrated, the user interface system 502 may include a package editor that enables editing of the displayed data processing package 510 and/or a package model generator 528.

In some cases, some, or all of the components of the user interface system 502 may reside on the client device 506. For example, some or all of the user interface system 502 may be implemented as a client-side application, such as a web browser executing on one or more processors of the client device 506. In some such cases, the data processing package 510, search results 512, and data processing metadata 516 may be stored in the cache of the browser.

In certain cases, the user interface system 502 may be implemented in a distributed fashion with some functions being performed at one location and other portions being performed at one or more different locations. For example, part of the user interface system 502, such as the GUI generator 508, may be implemented as a client-side application (e.g., on the client device), and other parts, such as the actions model generator 514 and/or package editor, may be implemented as one or more server-side applications. In such cases, the different portions of the user interface system 502 may communicate via a network using one or more IP messages.

In some cases, the GUI generator 508, actions model generator 514, and/or the statement generator 530 may be implemented using software modules, threads, or computer-executable instructions executing on one or more processors or in one or more isolated execution environments of the user interface system 502 (or client device 506).

In some cases, the GUI generator 508 may generate a search acceleration display object 532 and/or a pause display object 534 for inclusion in a GUI. The search acceleration display object 532 may be used to modify one or more search-related statements in the displayed data processing package 510. In some cases, based on an interaction with the search acceleration display object 532, the user interface system 502 may modify a search-related statement of the displayed data processing package 510 to reference (a copy of) data records that were previously retrieved from one or more data stores in the query system 108 and stored in a separate location. For example, the GUI generator 508 may replace a data source identifier in a search-related statement with a different dataset identifier or replace a first datasets identifier with a second dataset identifier, or adjust the location to which a dataset identifier references (e.g., change a pointer to change its reference location from a first location to a second location).

Additional interactions with the search acceleration display object 532 may cause the user interface system 502 to modify the search-related statement again. For example, the user interface system 502 may revert to the previous data source identifier and/or dataset identifier (e.g., the identifier in the search-related statement before the earlier interaction with the search acceleration display object 532). As described herein, the user interface system 502 may modify the displayed data processing package 510 itself (e.g., without interaction with the semantic processing system 504) and/or modify the displayed data processing package 510 by sending package modification messages to the semantic processing system 504 and receiving display modification messages in response.

The pause display object 534 may be used to pause or prevent automatic execution of search-related statements of the data processing package 510. For example, rather than automatically communicating the data processing package 510 to the data intake and query system 108 upon detecting one or more changes (or a threshold number of changes), the user interface system 502 may wait for a particular user interaction with the GUI (e.g., interacting with a display object that indicates the displayed data processing package 510 should be executed) before communicating the displayed data processing package 510 to the query system 108 for execution. Additional interactions with the pause display object 534 may cause the user interface system 502 to again automatically communicate the displayed data processing package 510 to the data intake and query system 108.

The statement generator 530 may be configured to generate one or more query commands and/or search-related statements based on one or more system query parameters and/or user query parameters received via the GUI. For example, as described herein, the user interface system 502 may generate one or GUIs or GUI windows associated with different query commands, such as an aggregation command. The GUI windows may include one or more interactive fields that enable a user to select or enter data field identifiers (corresponding to data fields), functions, keywords, or values, or other user query parameters or system query parameters. Using the input from the interactive fields and an understanding of the associated query command (e.g., what argument of a query command each interactive field corresponds to), the statement generator 530 may generate a statement, such as a search-related statement. For example, if the GUI window is associated with an aggregation command, and the GUI window includes interactive fields for the user to specify a data field from which to obtain data for a function, a function to perform on the data, a data field by which to group the data, and a data field by which to split the groups, the statement generator 530 may generate one or more query commands and an aggregation-related statement. Moreover, the user interface system 502 may include the generated aggregation-related statement in the GUI or as part of a displayed data processing package 510.

As another example, the statement generator may receive a first search-related statement and one or more additional parameters (e.g., parameters received in association with a chart). Using the query commands of the first-search related statement and the received parameters, the statement generator 530 may generate a (child) second search-related statement. In some cases, the statement generator 530 may generate one or more query commands using the received parameters (e.g., the parameters may include a function or other command token and data fields to use for the functions) and an understanding of query commands (e.g., what arguments (and their order) are used for what query commands, etc.), and append the generated query commands to the (parent) first search-related statement to provide a child search-related statement. In some cases, the user interface system 502 may communicate the child-related statement to the data intake and query system 108 to execute a search.

The data processing package model 522 may correspond to a data processing package model 526 generated by the semantic processing system 504. As described herein in greater detail, the semantic processing system 504 may use a version of the data processing package 510 to generate the data processing package model 526 and communicate the generated data processing package model 526 to the user interface system 502. The user interface system 502 may store the received data processing package model 526 as the data processing package model 522 and/or use the received data processing package model 526 (or data processing package model 522) to generate the data processing package outline 518 and/or the models 520.

The client device 506 may render the GUI for display and enable a user to interact with the GUI. As described herein, the GUI may include, in different areas of the GUI, a package editor panel to display the displayed data processing package 510, a models panel (also referred to herein as an actions panel) to display one or more of the models 520, a data processing package outline panel to display the data processing package outline 518, and a search results panel to display the search results 512 of the data processing package 510 (or search-related statements of the data processing package 510) being executed by the data intake and query system 108. In some cases, within the package editor panel, a package editor may be implemented to enable a user to edit the displayed data processing package 510.

As a user interacts with the various portions of the GUI (e.g., clicks on, hovers, selects, types, highlights, etc.), the user interface system 502 may communicate messages to the semantic processing system 504 and/or the data intake and query system 108. For example, if an interaction with the GUI indicates that a data processing package is to be executed, the user interface system 502 may communicate the data processing package (or one or more statements) to the data intake and query system 108 for execution and display the search results 512 in the GUI.

In some cases, as a user edits the displayed data processing package 510 (or search-related statements of the displayed data processing package 510) or interacts with the models 520, search results 512, or charts, the user interface system 502 may send package modification messages to the semantic processing system 504. The semantic processing system 504 may process the package modification messages and respond with display modification messages. Based on the display modification messages, the user interface system 502 may, for example, edit the displayed data processing package 510, edit the data processing package model 522, generate updated models 520 and/or an outline 518 and/or communicate the displayed data processing package 510 to the data intake and query system 108 (or one or more search-related statements of the displayed data processing package 510) for execution. As described herein, the package modification messages and the display modification messages may be implemented as IP messages or other computer protocol messages that enable the underlying computing devices to receive, understand, and perform computer functions based on the messages.

In response to the user interface system 502 communicating a data processing package 510 (or one or more search-related statements) to the data intake and query system 108, the data and intake query system 108 may execute the displayed data processing package 510, store the data records retrieved from one or more data stores or data sources of the query system 108 as illustrated by the retrieved set of data 536, and communicate the query results to the user interface system 502. In certain cases, the query system 108 may store the query results of the search-related statements (e.g., final results after processing the retrieved set of data), as illustrated by the query results 538. In some cases, each time the data intake and query system 108 executes a search-related statement or retrieves data records from a data source, the data intake and query system 108 can store the retrieved records (also referred to herein as the retrieved set of data 536) and/or the resulting query results 538.

In some cases, the query system 108 may store a copy of the retrieved data records separately from their original location. For example, the retrieved data records may represent a fraction of the data records in the data sources that the query system 108 could have retrieved in response to a search-related statement. To facilitate accelerated searching or processing of search-related statements that rely on the retrieved records, the query system 108 may separately store a copy of the retrieved data records for future use. In some cases, the query system 108 may store pointers to the original location of the retrieved data and store the set of pointers as the "copy" of the retrieved data records. In certain cases, the query system 108 may store a physical copy of the retrieved data records.

The data intake and query system 108 may also return a dataset identifier before, after or with the query results 512. The dataset identifier (or search identifier) may identify the copy of the set of retrieved set of data 536 (e.g., the data records) retrieved by the query system 108 during the query and reference the location where the copy of the set of retrieved set of data 536 is stored.

In some cases, the query system 108 may return multiple dataset identifiers (also referred to herein as search identifiers). One dataset identifier may identify the retrieved set of data 536 (and reference the location where the retrieved set of data 536 is stored) and another dataset identifier may identify the query results 538 of a search-related statement (e.g., the final result after processing the retrieved data) and reference the location where the query results 538 are stored in the query system 108.

In certain cases, such as where the displayed data processing package 510 includes multiple search-related statements that refer to different sets of data, the query system 108 may return a dataset identifier for some or all of the retrieved sets of data 536 for the respective search-related statements and/or a dataset identifier for some or all of the query results 538 for the respective search-related statements. Although described herein with reference to search-related statements, it will be understood that the query system 108 may store and return dataset identifiers for any statement that results in the query system 108 retrieving a set of data from one or more data sources of the query system 108.

In response to a determined user interaction with the search acceleration display object 532, the user interface system 502 may send a package modification message including the dataset identifier to the sematic processing system 504. In response, the semantic processing system 504 may edit the back-end package 524 to include the dataset identifier (e.g., by replacing the data source identifier or dataset identifier that is already in the search-related statement, and respond with display a modification message. Based on the display modification message, the user interface system 502 the system may edit the displayed data processing package 510 (or display the edited displayed data processing package 510 received from the semantic processing system 504) and communicate the displayed data processing package 510 to the data intake and query system 108. Using the modified displayed data processing package 510, the data intake and query system 108 may retrieve the copy of the previously retrieved data records (e.g., the retrieved set of data 536) and process them according to the search-related statement rather than retrieving the data records from the data source previously referenced in the search-related statement (e.g., the "original" data source).

Based on additional interactions with the search acceleration display object 532, the process may be repeated (or undone) except that the user interface system 502 can return the GUI to displaying the previously displayed data source identifier (or dataset identifier), and instruct the query system 108 to resume retrieving the data records from the "original" data source in the query system 108.

In the illustrated example of FIG. 5, the semantic processing system 504 includes a package model generator 528 and one or more data stores, RAM, or cache (generically referred to herein as "memory"). The memory may store a data processing package 524 (also referred to herein as the back-end data processing package 524) that is associated with the displayed data processing package 510 and a data processing package model 526. In certain cases, the semantic processing system 504 may be implemented in a distributed fashion with some functions being performed at one location and other portions being performed at one or more different locations.

In some cases, the displayed data processing package 510 and back-end data processing package 524 match or are identical. In certain cases, when the displayed data processing package 510 and back-end data processing package 524 do not match the semantic processing system 504 and the user interface system 502 communicate with each other to address any differences. As a non-limiting example, as described herein, edits or changes to the displayed data processing package 510 may be propagated to the back-end data processing package 524 and vice versa. In some such cases during the time in which the changes from the displayed data processing package 510 are not yet reflected in the back-end data processing package 524, the displayed data processing package 510 and the back-end data processing package 524 may be referred to as being out-of-sync. And when the displayed data processing package 510 and the back-end data processing package 524 match or are identical they may be referred to as being in-sync or synchronized.

The package model generator 528 may be implemented using one or more software modules, threads, or applications executing on one or more processors or in one or more isolated execution environments of the semantic processing system 504. In some cases, the package model generator 528 updates the back-end data processing package 524 based on the package modification messages received from the user interface system 502. For example, a package modification message may indicate that a user has added a new command to the displayed data processing package 510. In some such cases, the semantic processing system 504 may update the back-end data processing package 524 with the change.

The manner in which the semantic processing system 504 updates the back-end data processing package 524 may vary depending on the package modification message. For example, if the package modification message includes an indication of an edit to the displayed data processing package 510, the semantic processing system 504 may update the back-end data processing package 524 based on the edit. In certain cases, the semantic processing system 504 receives a complete copy of the updated version of the displayed data processing package 510. In some such cases, the semantic processing system 504 may replace the back-end data processing package 524 with the received updated version of the displayed data processing package 510. In some cases, the semantic processing system 504 compares the received updated version with the back-end data processing package 524 to determine the differences. Based on the differences, the semantic processing system 504 updates the back-end data processing package 524.

In some cases, the semantic processing system 504 may make more changes to the 524 than what is indicated in the package modification message. For example, if the semantic processing system 504 determines that the edits to the displayed data processing package 510 reference data records that are not included in the retrieved set of data 536, the semantic processing system 504 may update the back-end data processing package 524 to indicate that the retrieved set of data 536 is outdated and should be updated. In some cases, the semantic processing system 504 may make this change my editing the dataset identifier in the back-end data processing package 524.

In certain cases, the semantic processing system 504 may receive an instruction in a package modification message to edit the back-end data processing package 524. These instructions may not correspond to changes to the displayed data processing package 510. Rather, in some cases, the semantic processing system 504 may receive an instruction to edit the back-end data processing package 524 before the displayed data processing package 510 has been modified. In some such cases, the package modification message may be generated based on a user interaction with an action model 520 displayed in a GUI (e.g., an action model display object), a user interaction with the search results 512, a user interaction with the search acceleration display object 532, and/or a determination that a search-related statement references data not included in the retrieved set of data 536.

As a non-limiting example, based on a user interaction with the search acceleration display object 532, the user interface system 502 may communicate a package modification message to the semantic processing system 504 indicating that the retrieved set of data 536 (or copy of the data records retrieved from the data sources) should be used for the search-related statement in lieu of retrieving the data records from the data sources.

Alternatively, in certain cases, based on a user interaction with the search acceleration display object 532, the user interface system 502 may directly adjust the displayed data processing package 510 using the dataset identifier to the retrieved set of 536. In some such cases, the user interface system 502 may communicate the revised displayed data processing package 510 and an indication that the displayed data processing package 510 has changed and the status or state of the search acceleration display object 532 has changed.

Based on the package modification message, the semantic processing system 504 may update the back-end data processing package 524. In some cases, this may include replacing a data source identifier or dataset identifier in the back-end data processing package 524 with a dataset identifier for the retrieved set of data 536. In certain cases, this may include adding a comment to the displayed data processing package 510 that the search-related statement has been modified to refer to the retrieved set of data 536. The comment may also include the data source identifier and/or dataset identifier that was replaced by the dataset identifier for the retrieved set of data 536. As a non-limiting example, based on a user interaction with certain search results, the package modification message may indicate that a particular command is to be added to a particular location of the package, search-related statement, or query command. Based on the package modification message, the semantic processing system 504 may update the back-end data processing package 524.

As another example, the package modification message may include certain query parameters, such as a field identifier, field value, and associated action (e.g., "filter by") or command token (e.g., identifier for a particular command, such as "where"). Based on the package modification message, the semantic processing system 504 may determine the command to be added (and its location) to the package, search-related statement, or query command. Based on the received information, the semantic processing system 504 may update the back-end data processing package 524.

As described herein, the package model generator 528 may generate a data processing package model 526 based on the back-end data processing package 524. In some cases, the data processing package model 526 may be a parsed representation of the data processing package that identifies the various parts of the data processing package with metadata and/or identifiers. For example, the data processing package model 526 may include identifiers for distinct system query parameters and user query parameters. In some cases, the data processing package model 526 may include categorization information for the different query parameters. For example, the data processing package model 526 may categorize system query parameters as command tokens, functions, grammar, clauses, Boolean operators, etc. and/or provide the type of a particular command token, such as streaming, generating, transforming, orchestrating and/or dataset processing, etc. In certain cases, the data processing package model 526 is stored as a data structure and in a format that is more readily understood by a computing device. For example, the data processing package model 526 may be stored in a JSON format.

In addition, the data processing package model 526 may include contextual information about the data processing package, such as the location of particular query parameters within the data processing package, location of commands within the data processing package, location of grammar within the data processing package, identification and location of related or statements, etc.

In some cases, the data processing package model 526 may include a command model that corresponds to one or more commands in the data processing package or multiple commands that correspond to one command in the data processing package. The command model may include references to system query parameters and user query parameters of a particular command(s) in the data processing package or other characters in the data processing package, as well as contextual information, such as the location of the system query parameters or user query parameters (or other characters) within the data processing package or the location of the command within the data processing package, etc.

In certain cases, the data processing package model 526 may include a different dataset identifier. For example, as described herein, the semantic processing system 504 may replace the data source identifier or dataset identifier in at least one search-related statement received from the user interface system 502 with a dataset identifier to the retrieved set of data 536. a different dataset identifier. The semantic processing system 504 may communicate updates to the back-end data processing package 524 and/or data processing package model 526 to the to the user interface system 502 via a display modification message. As described herein, the display modification message may include the entire back-end data processing package 524 or just the changes to synchronize the displayed data processing package 510 with the back-end data processing package 524. Similarly, the display modification message may include the entire data processing package model 526 or just the changes to synchronize the data processing package model 522 with the data processing package model 526. In addition, the display modification messages may provide instructions for the user interface system 502. For example, the display modification messages may include instructions to modify the displayed data processing package 510, update the data processing package model 522, generate an updated outline 518 and/or models 520 based on the data processing package model 526. Based on the display modification messages, the user interface system 502 may update the displayed data processing package 510, outline 518, models 520 and/or package model 522.

In certain cases, based on an update to the displayed data processing package 510 and/or the data processing metadata 516, the user interface system 502 may automatically communicate the displayed data processing package 510 to the data intake and query system 108 for execution and may receive and display the search results 512 received from the data intake and query system 108.

In some cases, based on receiving the search results 512, the user interface system 502 may communicate a package modification message to the semantic processing system 504 indicating that the dataset identifier in a search-related statement should be replaced with a dataset identifier corresponding to the retrieved set of data 536 that were processed as a result of the search-related statement and/or replaced with a dataset identifier corresponding to the query results 538 (and the search results 512).

Although described herein as being separate systems, in some cases one or more components of the semantic processing system 504 may be included with the user interface system 502. In certain cases, the functionality of the semantic processing system 504 may be implemented in the user interface system 502. For example, the user interface system 502 may generate a data processing package model 522 from the displayed data processing package 510 and then use the data processing package model 522 to generate the models 520 (e.g., action models and/or statement models; for simplicity, also referred to herein as action/statement model(s)).

In certain cases, the semantic processing system 504 may be omitted. In some such cases, the user interface system 502 may generate the models 520 based on the displayed data processing package 510. For example, the actions model generator 514 may use one or more rules or policies, similar to the rules or policies to identify the different query parameters and commands in the data processing package and generate action/statement models based on the query parameters and commands. As described herein, in some cases, one data processing package command may result in one or more action/statement models, or multiple data processing package commands may result in one action model. Furthermore, as a user interacts with one of the displayed data processing package 510, the search results 512, outline 518, and/or models 520, the user interface system 502 may update the others, such as, by generating an updated data processing package model 522, or directly updating the various components of the user interface system 502, etc.

Figure 6:
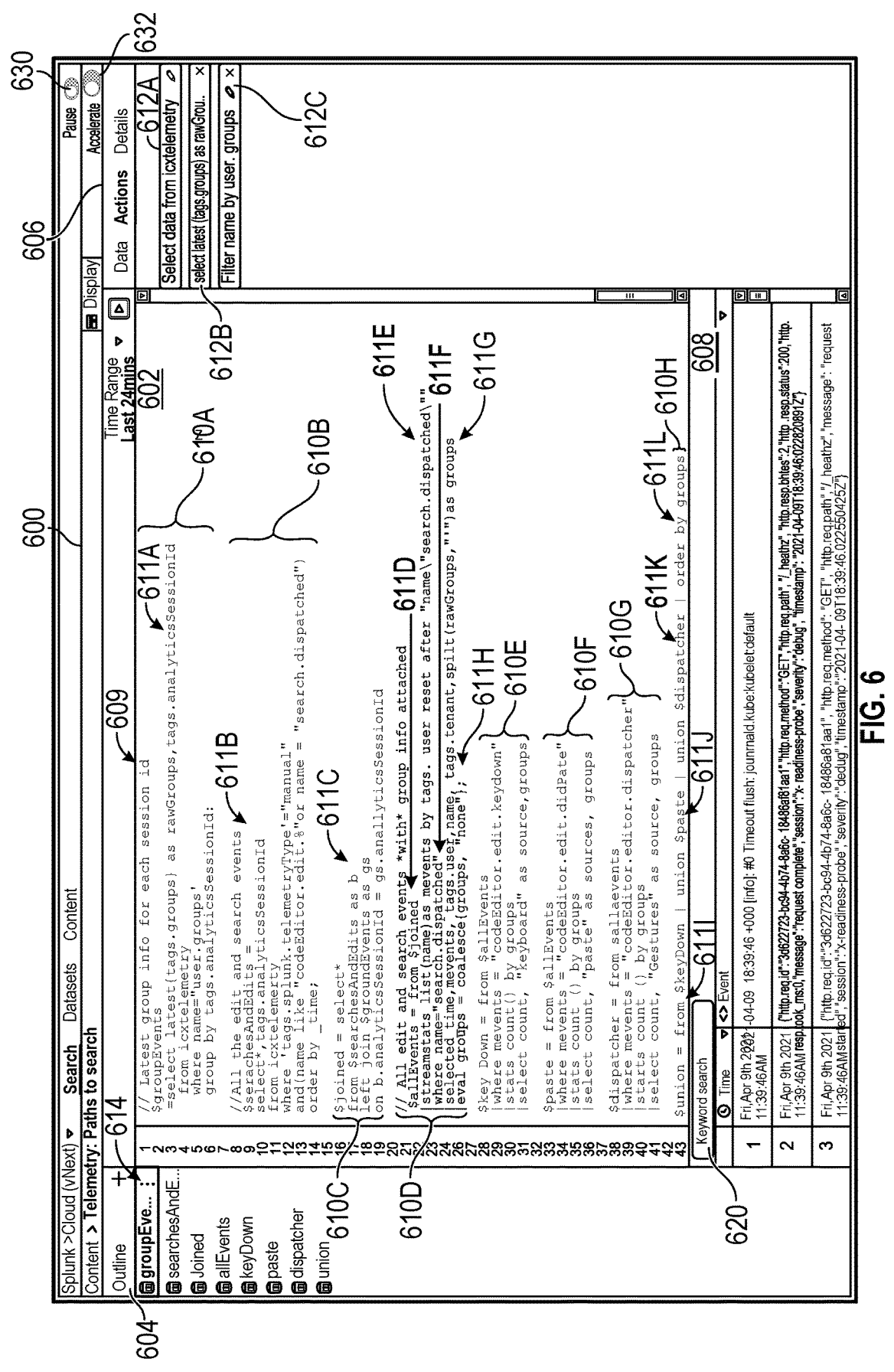

FIG. 6 is a non-limiting example of a GUI 600 that may be generated by the GUI generator 508 of the user interface system 502. In the illustrated example, the GUI 600 includes a package editor panel 602, time range selector 603, models panel 606, outline panel 604, and search results panel 608 located in different areas of the GUI 600, any combination of which may be displayed concurrently in the GUI 600. The following description of FIG. 6 will also serve to illustrate examples of and the interplay between the various components of the environment 500.

The package editor panel 602 may enable a user to edit the data processing package 609 (non-limiting example of the displayed data processing package 510). In some cases, the underlying package editor of the package editor panel 602 may be implemented in a distributed fashion with one or more functions being performed locally on a client device 506 and one or more functions being performed remotely on a server. In certain cases, the package editor may be implemented using the opensource program Monaco Editor.

When the user edits the data processing package 609, the user interface system 502 may automatically send the data processing package 609 to the query system 108 for execution. To prevent automatic execution of the data processing package 609, a user may enable the pause display object 630, which shown as disabled or deactivated. When enabled, the user interface system 502 may not automatically send the data processing package 609 to the query system 108 for execution when an edit to the data processing package 609 is detected. For example, the user interface system 502 may postpone execution of the data processing package 609 until the user interacts again with the pause display object 630 to disable the functionality. In some cases, while the pause display object 630 is activated, the user may manually initiate execution of the data processing package 609 may interacting with another display object (e.g., an execute query display object).

In the illustrated example of FIG. 6, the data processing package 609 includes 43 lines of query parameters. Within the data processing package 609, there are eight statements 610A-610H (individually or collectively referred to as statement 610) identified as "groupEvents," "searchesAndEdits," "joined," "allEvents," "keyDown," "paste," "dispatcher," and "union," respectively. In the illustrated example, each of the statements 610 is a search-related statement as it relates to a search that may be performed via the data intake and query system 108. As described herein, the 609 may include different types of statements, such as import statements to import data, function statements to perform functions, search-related statements including aggregation statements to search/process data, pipeline statements to process (streaming) data and direct it to a particular destination, and/or export statements to export data.

In the illustrated example, each statement 610 is separated by an additional hard return, a semi-colon, and/or an identifier for the statement 610 (e.g., $ [identifier]). Each statement 610 may span multiple lines or be located on a single line. In the illustrated example, the statement 610H "union" is located on a single line, whereas the other statements 610A-610G are located on multiple lines.

Further, each statement 610 (or statement 610) includes at least one command (individually or collectively referred to as command(s) 611). The commands 611 in a data processing package may be separated by a delimiter. In the illustrated example of GUI 600, the commands are separated by a '|."

The statements 610A-610C include one command each, identified as commands 611A-611C, respectively, while the statements 610D-610H include multiple commands. For example, the statement 610D "allEvents" has five commands 611D-611H and the statement 610H has four commands 611I-611L. Similar to the statements 610, one command 611 may span one or more lines in a data processing package or multiple commands 611 may be located on one data processing package line. For example, the commands 611A-611C span multiple lines, whereas the commands 611I-611L are on a single line.

Each command 611 in a statement 610 has multiple query parameters. Generally speaking, the commands 611 of a data processing package may be made up of different kinds of query parameters, including system query parameters and user query parameters. The system query parameters may refer to query parameters that are defined by the data intake and query system 108, such as command tokens (e.g., "from," "select," "where," "join," "streamstats," "stats," etc.), functions (e.g., "count," "average," etc.), clauses (e.g., "by," "order by," "group by" etc.), Boolean operators (e.g., "and," "or," etc.), command delimiters (e.g., '|' etc.) or statement delimiters (e.g., ';' etc.) and/or query parameters that maintain their meaning across tenants. For example, the manner in which the data intake and query system 108 interprets "from," "|," "stats," "avg," and "by," is determined by the data intake and query system 108 and maintains its meaning across different users and tenants.

The user query parameters may refer to query parameters that are defined by the user or the user's data, such as the name of search terms in the data processing package, the time range for a search-related statement, field names, keywords, dataset identifiers, etc. In some embodiments, the user query parameters are user or tenant specific such that a user query parameter for one user or tenant may have a different meaning (or no meaning at all) or apply to different data for another user or tenant. For example, even if two tenants have a "main" dataset, the data associated with the "main" dataset for one tenant is different from the data associated with the "main" dataset from the other tenant. Similarly, the data to which user query parameters correspond to may be based on the tenant's data, such as the data in a particular index and/or based on one or more regular expression rules for a particular sourcetype. As such, the same dataset identifiers may refer to different data for different datasets or for different tenant data. Accordingly, the meaning or what is referenced by the user query parameters may be user or data specific and may not be universally applicable to users of different tenants.

The user query parameters and system query parameters may be further categorized based on type and subtypes. In some cases, the user query parameters may include query parameters of the types of datasets, field, and keyword tokens, and the system query parameters may include query parameters of type functions and command tokens, clauses, Boolean operators, etc. Some system query parameters may include subtypes. For example, command tokens may include streaming command tokens (e.g., command tokens that operate on events as they are returned by a search, such as "append," "bin," or "join," "streamstats," etc.), generating command tokens (e.g., command tokens that generates events or reports from one or more dataset sources without transforming the events, such as "from," "tstats," etc.), transforming command tokens (e.g., command tokens that order results into a data table and transform specified cell values for each event into numerical values for statistical purposes, such as "stats," "table," "top," etc.), orchestrating command tokens (e.g., command tokens that control some aspect of how a search is processed, such as whether to enable search optimization, such as "lookup," "redistribute," etc.), and/or dataset processing command tokens (e.g., commands that use or require the entire dataset to run, such as "sort," "tail," etc.). In some cases, a command token may be part of multiple categories or be part of different categories depending on the mode or settings of the data intake and query system 108 or data processing package. For example, in some cases, "bin," "append," and "join" may be streaming command tokens and/or dataset processing command tokens.

A combination of user query parameters and system query parameters may be used to form commands or query commands. For example, the query command 611I "from $keyDown" includes one system query parameter, "from," and one user query parameter "$keyDown." The system query parameter "from" may further be categorized as a "command word" or "command token" of the generating type and the user query parameter $keyDown may be further categorized as a dataset or dataset identifier. In this case the dataset "$keyDown" may correspond to the results output by the statement "keyDown".

With continued reference to FIG. 6, the outline panel 604 may display a data processing package outline 518 (also referred to herein as outline 518) that corresponds to the displayed data processing package 510 in the package editor panel 602. In the illustrated example of FIG. 6, the outline panel 604 includes an outline 614 that corresponds to the data processing package 609.

In some cases, the actions model generator 514 may generate the outline 614. In certain cases, the actions model generator 514 generates the outline 614 based on identifiers for statements in the data processing package 609 or identifiers in the data processing package model 526. For example, as described herein, the data processing package 609 includes eight identifiers for eight different statements 610. As such, the package model generator 528 may include the identifiers in the data processing package model 526 for the different statements. The actions model generator 514 may use the identifiers from the data processing package model 526, the data processing package 609 itself, or some other identifier for each statement 610, to create the outline 614.

In some cases, the GUI 600 may enable a user to interact with the outline 614 to change what is displayed in the GUI. For example, in the illustrated example of FIG. 6, "groupEvents" is selected from the outline panel 604. As such, the "groupEvents" statement is shown at the top of the package editor panel 602 and/or information about "groupEvents" is displayed in the results panel 608 and/or models panel 606. For example, model display objects 612A-612C associated with the commands in the "groupEvents" statement are shown in the models panel 606.

Selecting a different identifier within the outline 614 may cause the package editor to scroll down to that statement. In addition, depending on the selected statement, the models panel 606 may include the action/statement models associated with the statement. For example, selecting "union" from the outline 614 may cause the package editor to scroll down so that the "union" statement is displayed at the top of the package editor panel 602. Similarly, the models panel 606 would be updated to show action summaries associated with the "union" statement.

In some cases, the GUI 600 may enable the user to use the outline 614 to modify the data processing package 609. For example, the GUI 600 may enable the user to delete the "keyDown" statement by interacting with the "keyDown" identifier in the outline 614. Based on the interaction, the user interface system 502 may send a package modification message to the semantic processing system 504 instructing the semantic processing system 504 to delete the "key-Down" statement. Based on the package modification message, the semantic processing system 504 may remove the "keyDown" statement from the back-end data processing package 524, generate an updated data processing package model 526, and communicate a display modification message to the user interface system 502 that includes the changes to the back-end data processing package 524 and updated data processing package model 526. The user interface system 502 may use the received changes and updates to modify the displayed data processing package 609, re-generate any models 520 (and summaries) associated with the modified data processing package 609, and update the outline 518.

As another example, the GUI 600 may enable the user to add a statement 610 by presenting a user with one or more GUI windows to select parameters for the statement, enable a user to generate a chart by presenting the user with one or more panels or GUI windows to select parameters for the chart, etc.

Similarly, the GUI 600 may enable a user to move statements to different locations within the package editor using the outline 614 (518) (or models panel 606), perform other package edits, etc. As with other changes, the user interface system 502 may perform the change itself and/or send a package modification message to the semantic processing system 504. The semantic processing system 504 may process the package modification message and respond with a display modification message. The user interface system 502 may use the display modification message to update the displayed data processing package 609 (510), models 520, and the outline 614 (518).

In certain cases, the GUI 600 may enable a user to edit a statement 610 or a query command 611 by interacting with the search acceleration display object 632. In the illustrated example, the search acceleration display object 632 is disabled. When enabled, the user interface system 502 may send a package modification message to the semantic processing system 504 indicating that a dataset identifier for at least one search-related statement should be changed to refer to the retrieved set of data 536 that correspond to the at least one search-related statement. For example, enabling the search acceleration display object 632, may cause the user interface system 502 to generate a package modification message indicating that the data source identifier "icxtelemetry" in command 611A and/or command 611B is to be replaced with a dataset identifier that references the retrieved set of data 536 that was retrieved when the query system 108 executed the command 611A (or corresponding 610A//) or command 611B (or corresponding 610B//). As another example, enabling the search acceleration display object 632, may cause the user interface system 502 to generate a package modification message indicating that the data source identifier "$allEvents" in 610E//and/or 610F//is to be replaced with a dataset identifier that references the query results 538 of search-related statement 610D.

The time range selector 603 may enable a user to select a time range (or package time range) to limit the data that is to be searched for different statements. For example, as various search-related statements are executed, the data intake and query system 108 may use the time range specified by the time range selector 603 (or package time range) to identify the data that is to be searched/processed. In this way, the time range specified by the time range selector 603 may be used as a filter to identify the data that is to be the subject of a search.

As described herein, in some cases, the user interface system 502 may enable a user to specify different time ranges for different statements 610, such as different search-related statements (also referred to herein as statement time ranges). In some such cases, the user interface system 502 may append different time ranges to different statements 610 before communicating the data processing package 609 and/or the statement 610 to the data intake and query system 108. For example, the user interface system 502 may generate an enriched data processing package 609 using the different time ranges and communicate the enriched data processing package 609 to the data intake and query system 108 for execution. In this way, the user interface system 502 may not edit or modify the data processing package 609 itself.

The models panel 606 may display summaries of or display objects associated with the models 520 generated by the actions model generator 514. In addition, the models panel 606 may enable a user to modify the models 520. For example, the models panel 606 may enable a user to delete, edit the content of, or rearrange action/statement models summaries, which may result in changes to the underlying models 520.

In the illustrated example of FIG. 6, the models panel 606 displays the model display objects 612A-612C (non-limiting examples of summaries of the models 520) corresponding to the selected statement (the "groupEvents" statement). It will be understood that the models panel 606 may include fewer or more model display objects 612A-612C (individually or collectively referred to as model display objects 612). In some cases, the models panel 606 may display all of the model display objects corresponding to a query command, statement, and/or the data processing package 609.

The search results panel 608 may be used to display one or more search results 512 received from the data intake and query system 108. In the illustrated example of FIG. 6, the results panel 608 includes three events. Each event includes a timestamp and machine data or raw machine data. In some cases, the results 512 may be referred to as interactive search results given that a user may interact with the search results 512 to update the data processing package 609 and/or model display objects 612.

The search results panel 608 includes a keyword search field 620 that enables a user to enter keywords that may be used to filter the search results. In some cases, entering a keyword into the keyword search field 620 causes an update to the data processing package 609 (e.g., user interface system 502 communicates the keyword to the semantic processing system 504, which updates the back-end data processing package 524 and/or generates an updated data processing package model 526 and sends back a display modification message to the user interface system 502 to update the data processing package 609 and/or the model display objects 612). In certain cases, entering the keyword into the keyword search field 620 does not result in any updates to the data processing package 609. For example, the search results 512 may be stored in a browser cache and the keyword may be used to filter those results without sending a new data processing package to the data intake and query system 108, whereas updating the data processing package 609 may result in the updated data processing package being sent to the data intake and query system 108 for execution.

Although not displayed in FIG. 6, it will be understood that the GUI 600 may include fewer or more panels or components. In some cases, the GUI 600 may include additional search results based on additional queries generated by the user interface system 502. In certain cases, based on the identification of a particular dataset within the data processing package 510, the user interface system 502 may generate one or more additional search-related statements to obtain data about the dataset. For example, the user interface system 502 may generate a search-related statement to identify field identifiers for fields in the dataset or keywords in the dataset, etc. The results of these additional search-related statements may be displayed on the GUI 600 to enable the user to add additional query parameters or search-related statements. Based on interactions with the additional search results, additional query parameters may be added to one or more search-related statements.

In some cases, the user interface system 502 may generate the additional query parameters (e.g., using the statement generator 530). In certain cases, the additional query parameters may be added by the user interface system 502 communicating a package modification message similar to the package modification message generated in response to interactions with the search results 512 to the semantic processing system 504, receiving edits for the displayed data processing package 510, and update the data processing package 510 based on the received edits. In addition, as described herein the user interface system 502 may receive an updated data processing package model 526, generate action/statement models based on the data processing package model 526, and update the model display objects based on the action/statement models.

5.1. Data Processing Models and Action Models

As described herein, the data processing package 609, which is an example of a displayed data processing package 510, may include various types of system query parameters, user query parameters, commands, statements (e.g., import statement, export statement, search-related statements (including aggregation-related statements), pipeline statements, function statements, etc.), etc. The back-end data processing package 524 may include that same or similar content.

With reference to FIGS. 5 and 6, in certain cases, the data processing package 609 and/or a back-end data processing package 524 that corresponds to the data processing package 609 may be used to generate a data processing package model (e.g., data processing package model 522, 526—also referred to herein as a package model 522, 526. The generated data processing package model may be used to generate the action and/or statement models (e.g., models of actions or commands and models of statements, respectively) and model display objects 612 displayed in the models panel 606.

5.1.1. Data Processing Package Models

As described herein, the data processing package model 526 may be generated by the semantic processing system 504 based on the back-end data processing package 524 and/or the package modification messages received from the user interface system 502. For example, once the back-end data processing package 524 is updated in response to a package modification message, the semantic processing system 504 may generate the data processing package model 526 based on (e.g., using or from) the updated back-end data processing package 524. In some cases, each time the back-end data processing package 524 is updated, the semantic processing system 504 may generate an updated data processing package model 526. In certain cases, the semantic processing system 504 may update the back-end data processing package 524 and data processing package model 526 concurrently. For example, based on a package modification message, the semantic processing system 504 may determine that one or more statements or (query) commands is to be added to the back-end data processing package 524. As the semantic processing system 504 updates the back-end data processing package 524 with the one or more statements or commands, it may concurrently generate one or more statement models or command models, respectively, that correspond to the added one or more statements or commands and add the statement model or command model to the data processing package model 526.

To generate the data processing package model 526, the package model generator 528 may parse the back-end data processing package 524, or in some cases, the displayed data processing package 510 (e.g., data processing package 609) (generically referred to as the data processing package 510). As it parses the data processing package 510, the package model generator 528 may identify and/or categorize different query parameters of the data processing package 510. For example, the package model generator 528 may identify and/or categorize different system query parameters and user query parameters. In addition, the package model generator 528 may identify related commands or statements. As the package model generator 528 parses the data processing package 510, it may generate the data processing package model 526.

The data processing package model 526 may include a parsed representation of the data processing package 510. In some cases, the data processing package model 526 may be in a JSON format. For example, the data processing package model 526 may include symbols or representations for the various query parameters, as well as contextual information, such as the location of different query parameters within the data processing package.

In some cases, the data processing package model 526 may include command models that correspond to or are generated from (query) commands of the data processing package. In certain cases, a command model may include a reference or otherwise identify, the command(s) or portion of a command to which it corresponds. The command model may include an identifier for system query parameters (e.g., command tokens, functions, grammar, etc.) and/or user query parameters within the query command that corresponds to the command model. In some cases, the command model may also include categorization information for the different query parameters of the command. For example, the command model may indicate the type of a command token in the command or the type of a user query parameter. The command model may also indicate the placement of each system query parameter and user query parameter within the query command and the placement of the query command within a search-related statement or data processing package.

In some cases, each query command in the data processing package may have a corresponding command model in the data processing package model 526. With reference to data processing package 609, a corresponding data processing package model 526 may have twenty-four command models or more (or fewer). In some such cases, the package model generator 528 may identify each command based on a command delimiter (e.g., '|') and generate a command model for each command.

In certain cases, the data processing package model 526 may include a command model for only some of the commands in the data processing package. For example, the data processing package model 526 may include a command model for system query parameters of a particular type (e.g., command tokens) or subtype (e.g., streaming commands), etc. In some cases, the package model generator 528 may use a lookup table or other data structure to determine whether to generate a command model for a particular command. The lookup table may indicate what should be included in a command model for each system query parameter. For example, the lookup table may indicate that for the command token "WHERE" a new command model should be created. Similarly, the lookup table may indicate that the clause "group by," should be included as part of a current command model (e.g., the command model that is being edited/created). In other words, the lookup table may indicate that no new command model should be created for the clause "group by." Similarly, the package model generator 528 may include rules and/or policies for each system query parameter. In certain cases, the package model generator 528 may include rules or policies for system query parameters based on their type or subtype. These rules or policies may indicate that the package model generator 528 is to create a new command model for some system query parameter, include certain system query parameters as part of a command model of another system query parameter (e.g., the system query parameter that (immediately) precedes it or (immediately) follows it), or generate a new command model for a particular system query parameter based on its location within a search-related command or the data processing package and based on which query parameters precede it or follow it. Accordingly, the package model generator 528 may use different policies and rules to generate command models for the commands in the data processing package.

In some cases, the package model generator 528 may use different policies and rules to generate command models based on the type or subtype of a query parameter. For example, the package model generator 528 may include a rule that user query parameters are to be included as part of a current command model (e.g., do not create a new command model when a user query parameter is encountered as the data processing package is parsed). However, it will be understood that the package model generator 528 may use different rules or policies to create command models as desired. For example, the package model generator 528 may include a rule to sometimes or always create a new command model for a user query parameter. The rule may indicate that the package model generator 528 should create a new command model for a user query parameter based on its location within a query command, search-related statement, or the data processing package 524.

As another example in which the package model generator 528 may use different policies or rules to generate command models, in certain cases, the package model generator 528 may include a rule that each command token should be part of its own command model or that clauses are always part of the same command model as the command token that (immediately) precedes the clause in the data processing package. As another example, the package model generator 528 may include a rule that certain command tokens are to be part of their own command model, while others are to be part of the command model of a command token that (immediately) precedes it or (immediately) follows it. In some cases, the package model generator 528 may make this determination based on a specific command token and/or based on types of command tokens.

Accordingly, when building the data processing package model 526, the package model generator 528, may identify a command in the data processing package and determine whether it should generate one or more command models for the command or whether it should generate one command model from multiple commands.

In certain cases, one command model may correspond to multiple commands in the data processing package or multiple command models may correspond to one command in the data processing package. For example, if the data processing package 524 uses multiple commands to perform a particular action, such as to generate a trend line, the package model generator 528 may generate a single command model for the multiple commands. In some cases, to generate one command model from multiple commands, the semantic processing system 504 may analyze the combination of commands to determine if they perform a particular action. For example, the semantic processing system 504 may compare the combination of commands with known patterns of commands that result in the particular action. If the combination of commands matches the known pattern, the semantic processing system 504 may determine that one command model should be generated from the combination of commands.

As another example, if a command in the data processing package 524 is relatively complicated, includes a Boolean operator, or may be factored into multiple parts (e.g., could have been written as distinct commands), the package model generator 528 may generate multiple command models for the single command. For example, for the command "WHERE sourcetype='kube' AND host='app_default_pool'" the package model generator 528 may determine that based on the presence of the Boolean operator "AND," the command could have been written as two separate commands (e.g., "WHERE sourcetype='kube'" and "WHERE host='app_default_pool,'"). Accordingly, the package model generator 528 may generate two command models for the command (e.g., a command model for filtering data based on the source "kube" and a second command model for filtering data based on the host "app_default_pool."). In some cases, the package model generator 528 may include a rule or policy to not factor commands into multiple command models or it may include a rule or policy to sometimes factor commands into multiple command models for some system query parameters, but not for others. Again, these rules may apply to individual system query parameters or based on a type or subtype of the relevant system query parameter or user query parameter.

In some cases, the package model generator 528 may include a rule or policy that a new command model based on the presence of a command delimiter. For example, for each '|' in the data processing package 609, the package model generator 528 may create a new command model. Thus, in some cases, where the package model generator 528 may not have created a new command model based on a system query parameter, the presence of the command delimiter may make the system query parameters part of a new command model. For example, consider the command 611L "order by groups." The command 611L includes the system query parameter "order by," which is a clause, and a user query parameter "groups" and is immediately preceded by the system query parameter '|,' which is a command delimiter. Based on the clause "order by," the package model generator 528 may determine no new command model is to be created, however, because the command delimiter 'I' immediately precedes (excluding spaces) the clause "order by," the package model generator 528 may create a new command model for the command. In contrast, with reference to the "groupEvents" command 611A "select latest (tags.groups) as rawGroups, tags.analyticsSessionID from icxtelemetry where name='user.groups' group by tags.analyticsSessionId;" the package model generator 528 may not create a new command model for the clause "group by" because there is not a command delimiter that immediately precedes it.

With continued reference to the command 611A, the package model generator 528 may create multiple command models. For example, in the illustrated example, the package model generator 528 created command model for each of the command tokens "select," "from," and "where" within the command 611A. Accordingly, the package model generator 528 may generate command models based on the type and/or subtype of a query parameter and its location within the data processing package.

In some cases, the package model generator 528 may group command models together as a statement model. For example, as the package model generator 528 parses a data processing package 524, it can distinguish between different statements in the data processing package 524 (e.g., based on statement delimiters). The package model generator 528 may then parse the commands of individual statements to generate command models for those commands. The resulting command models may be grouped or related together as a statement model, similar to the way in which multiple commands are grouped together as a statement. With reference to FIG. 6, the package model generator 528 may generate eight statement models corresponding to statements 610A-610H.

In certain cases, the data processing package model 526 may include identifiers for related commands or statements. For example, with reference to FIG. 6, the data processing statements 610A-610H, identified as "groupEvents," package 609 includes eight "searchesAndEdits," "joined," "allEvents," "keyDown," "paste," "dispatcher," and "union," respectively. Accordingly, a data processing package model 526 for the data processing package 609 may include an identifier for each of the distinct statements.

5.1.2. ACTION MODELS

With continued reference to FIGS. 5 and 6, the data processing package 510 (or 524) may be used to generate the action and/or statement models 520 (also referred to herein as models 520) and/or corresponding model display objects displayed in the models panel 606 (although reference is made to the data processing package model 526 being used to generate action/statement models, it will be understood that the data processing package model 522 may be used). The relationship between the data processing package model 526 and models 520 may be similar to the relationship between the data processing package 524 and the data processing package model 526 in that the actions model generator 514 may parse the data processing package model 526 to generate the models 520. In some cases, such as where the data processing package model 526 is stored as a parsed representation of the data processing package (e.g., as a data structure and/or in a format that is more readily interpreted by a computing device, such as a JSON format), parsing the data processing package model 526 may be relatively easier than parsing the data processing package 524.

Accordingly, the actions model generator 514 may use the structure and/or metadata of the data processing package model 526 to generate a data processing package actions model, which may be made up of individual action/statement models. In some cases, the actions model generator 514 may generate an action model for each command model. For example, if the rules and policies of the package model generator 528 and actions model generator 514 are similar in terms of how different parts of the data processing package are to be parsed and interpreted, the actions model generator 514 may generate an action model for each command model.

In certain cases, the actions model generator 514 may generate multiple action models from one command model or combine multiple command models as one action model. For example, similar to the way in which the package model generator 528 uses rules and policies to determine whether to generate one or multiple command models from one command or to generate one command model from multiple commands, the actions model generator 514 may use rules and policies to determine whether to generate one or multiple action models from one command model or to generate one action model from multiple command models.

As a non-limiting example, the actions model generator 514 may identify command models that perform multiple actions and create multiple action models from the command model, or the actions model generator 514 may determine that a particular sequence of command models performs a particular action and generate an action model for the sequence of command models. Similar to the package model generator 528, the actions model generator 514 may identify the sequence of commands using pattern matching. For example, the actions model generator 514 may compare command tokens from the sequence of command models with known patterns of command tokens that perform different actions. If the command tokens in the sequence of command models matches a known pattern, the actions model generator 514 may generate an action model from the sequence of command models.

In some cases, the rules and policies of the package model generator 528 and actions model generator 514 may diverge. For example, where the rules and policies of the package model generator 528 may be focused on creating a data structure with granular information about each query parameter that is more readily understood by a computing device, the actions model generator 514 may be focused on creating a data structure with a summary that is more readily understood by a human. Accordingly, the package model generator 528 may break down the data processing package into as many command models as possible to aid a computing device in understanding the data processing package 524, whereas the actions model generator 514 may seek to combine command models in a way that aids a human in understanding the actions that will occur as a result of the data processing package 510.

In certain cases, the generation of the command model may be relatively simple in that the package model generator 528 may generate a command model for each command, without attempting to perform higher-level parsing tasks, such as splitting commands into multiple command models or combining commands into one command model. In some such cases, the actions model generator 514 may perform the higher-level tasks by splitting command models and/or combining command models. In certain cases, these higher-level functions may be split between the semantic processing system 504 and the user interface system 502. For example, the semantic processing system 504 may split commands into multiple command models and the user interface system 502 may combine commands into multiple action models (e.g., by combining command models of the data processing package model 526 that correspond to the commands).

Although the package model generator 528 and actions model generator 514 may have a different purpose and therefore use different rules and polices, the actions model generator 514 may use similar mechanisms to generate the action models. For example, actions model generator 514 may create action models based on the type/subtype of query parameters and/or context (location of the query parameters within the command, search-related statement, or data processing package; location of command within the data processing package). Accordingly, the actions model generator 514 may treat system query parameters of the same type/subtype a similar way and/or include rules for particular system query parameters. In addition, the actions model generator 514 may use contextual information to determine how to generate action models from the data processing package model 526.

In some cases, each action model may be linked to or reference the command model(s) of the data processing package model 526 (or commands of the data processing package 524) used to generate the action model. In addition, the action model may include a short statement or summary of the action that occurs as a result of the relevant query command. The summary may identify the relevant command token and/or summarize the process that is being performed on the data based on the associated query command(s). For example, the summary may identify the system query parameter that initiates the action (e.g., the command token or another term that summarizes what the command token is intended to do) and the user query parameter that identifies the object (or data) on which the action is to be performed. In certain cases, the summary may provide a description of an action that results from execution of the query commands that correspond to or are associated with the action model. The GUI 600 may display the action model in the models panel 606 as a display object (also referred to herein as an action model display object or model display object).

As a non-limiting example and with reference to the models panel 606 of FIG. 6, three action model display objects 612A, 612B, 612C are shown. These action model display objects 612A, 612B, 612C correspond to the "groupEvents" command 611A in lines 3-6 of the data processing package 609. As described herein, the package model generator 528 may have broken the "groupEvents" command into three command models (e.g., a command model for each command token "select," "from," and "where"). The actions model generator 514, in this example, created three action models from the generated command models. The first action model (and corresponding action model display object 612A) corresponds to the portion of the "groupEvents" command on line 3 ("select latest (tags-.groups) as rawGroups, tags.analyticsSessionID"), action model (and corresponding action model display object 612B) corresponds to the portion of the "groupEvents" command on line 4 ("from icxtelemetry"), and the third action model (and corresponding action model display object 612C) corresponds to the portion of the "groupEvents" command on lines 5 and 6 ("where name='user.groups' group by tags.analyticsSessionId").

As described herein, the action models may include reference to the command models used to generate the action models and/or reference to the commands used to generate the command models that are used to generate the action models. As shown in FIG. 6, the model display objects 612A-612C may include a brief description of the action performed by the corresponding portions of the command 611A. For example, the action model display object 612A ("Select data from icxtelemetry") identifies the action (select data from) that will result from the command token (from) and identifies the dataset (icxtelemetry) on which the action will be performed. Similarly, the action model display object 612C ("Filter name by user.groups") identifies the action (filter by) that will result from the command token (where) and identifies the data (events with the field-value "user.groups" for the field "name") on which the action will be performed.

Notably, the model display objects 612A, 612C may be more than a mere recitation of the command or command token. Rather, the model display objects 612A, 612C may include a synopsis of the command token in a more human-comprehensible form. Put another way, the model display objects 612A, 612C may use different terms for some of the query parameters found in the corresponding command 611A or command model. In certain cases, the action models may include the same terms as the corresponding command or a subset of the same terms without adding different terms.

As described herein, interacting with model display objects 612 may result in updates to the displayed data processing package 510. For example, deleting the action model display object 612A may result in the deletion of the command(s) or portion of the command that correspond to the action model display object 612A.

If the action model corresponds to a portion of a command in the data processing package, then when the corresponding action model display object is deleted, that portion of the command may be deleted from the data processing package 510. Similarly, if an action model corresponds to multiple commands in the data processing package 510, then when the respective action model display object is deleted, all of the commands that correspond to the action model may also be deleted.

In some cases, the corresponding command(s) or portion of a command in the data processing package 510 are deleted based on the user interface system 502 sending a package modification message to the semantic processing system 504 that identifies the changes to be made, the semantic processing system 504 updating the back-end data processing package 524 and sending edits to the user interface system 502 to update the data processing package 510 to reflect the changes made to the back-end data processing package 524, and the user interface system 502 using the edits to delete the corresponding commands from the data processing package 510. In certain cases, the user interface system modifies the data processing package 510 without communicating with the semantic processing system 504. For example, the user interface system 502 may track which commands of the data processing package correspond to which action model display objects and remove them based on the removal of a respective action model display object.

In addition, rearranging the data processing model display objects 612A-612C may result in the corresponding commands to be moved or rearranged. For example, with reference to FIG. 7C, based on a user moving the data processing action model display object 712D to between data processing model display objects 712B and 712C, the user interface system 502 may generate a package modification message indicating the change and send the generated package modification message to the semantic processing system 504. The semantic processing system 504 may use the package modification message to update the back-end data processing package 524, generate an updated data processing package model 526, and communicate the relevant edits for the data processing package 709B (510) to the user interface system 502 via a display modification message. The user interface system 502 may update the data processing package 510/709B based on the display modification message.

In certain cases, the user interface system 502 may disable the rearranging of the model display objects 612A-612C if such a rearrangement would create an error in the data processing package (e.g., an error in the query language used to form the data processing package).

Given the various combinations of one or more commands being used to generate one or more command models and one or more command models being used to generate one or more action models, statement models, and model summaries, it will be understood that there may be many different types of relationships between commands, command models, and action models as summarized by the following table, where "1" indicates one command, one command model, or one action model and "multiple" indicates multiple commands, multiple command models or multiple action models. Thus, the second row indicates that one command may result in one command model in the data processing package model 526, which may result in one action model in the data processing package model, whereas the fifth row indicates that one command may result in multiple command models and multiple action models.

TABLE 1

| Number of Commands | Number of Command Models | Number of Action Models | Number of Statement Models |
|---|---|---|---|
| 1 | 1 | 1 | 1 |
| 1 | 1 | Multiple | 1 |
| 1 | Multiple | 1 | 1 |
| 1 | Multiple | Multiple | 1 |
| Multiple | 1 | 1 | 1 |
| Multiple | 1 | Multiple | 1 |
| Multiple | Multiple | 1 | 1 |
| Multiple | Multiple | Multiple | 1 |

As described herein command models may reference the commands from which they were generated. Similarly, action models may reference the command models and/or commands from which they were generated. Accordingly, in instances where one action model results from multiple commands (or command models), the action model may reference or be associated with the multiple commands (or command models). In instances where one command (or command models) corresponds to one action model, the action model may reference or be associated with the one command (or command models). Similarly, in instances where multiple action models result from one command (or command model), each action model may reference the command (or command model) and may also reference the particular portion of the command (or command model) from which the action model was generated.

In some cases, the action models may not reference the commands with which they are associated. In some such cases, an action model may reference the command model(s) or portion thereof used to generate the action model, and the command model may reference the command(s) or portion thereof used to generate the command model. In this way the user interface system 502 and/or semantic processing system 504 may identify relationships between action models (and summaries) and commands in the data processing package.

Using the references and/or associations between action models, command models and commands, the user interface system 502 may determine, based on a modification to an action model display object, which command(s) are affected, and communicate an appropriate package modification message to the semantic processing system 504 that identifies the relevant commands and the changes to be made to the commands.

For example, if an action model display object associated with a portion of a command is edited, the user interface system 502 may use the relationships between action models, command models, and commands to identify the portion of the command that is to be edited and include that information in the package modification message. Similarly, if an action model display object associated with multiple commands is deleted, the user interface system 502 may use the relationships between action models, command models, and commands to identify the commands that are to be deleted and include that information in the package modification message.

In some cases, editing one action model display object may affect multiple commands, some of which may not have an indicated relationship with the action model. For example, editing an action model (e.g., the action model that corresponds to the action model display object) may transform a corresponding command in the data processing package. Other commands in the data processing package may have referred to and/or relied on the transformed command. In some such cases, the package model generator 528 may use its knowledge of the query language to modify the other commands and generate an updated data processing package model 526. The actions model generator 514 may generate updated models 520 based on the updated data processing package model 526. Although described as being performed by the package model generator 528, it will be understood that a component of the user interface system 502 may perform a similar modification to a data processing package and send an updated data processing package to the semantic processing system 504 as part of a package modification message. In some such cases, the package model generator 528 may generate an updated data processing package model 526 based on the package modification message.

As a non-limiting example, consider the following search-related statement: $q=from main|rename a as b|where b=1. If an action model display object corresponding to "rename a as b" is deleted, a package modification message identifying the change may be communicated to the semantic processing system 504. Based on the change, the package model generator 528 may determine that the command "where b=1" will be affected because it includes reference to "b." As such, the package model generator 528 may revise the command "where b=1" to "where a=1" resulting in the following search-related statement "$q=from main|where a=1." The package model generator 528 may then generate a data processing package model 526 based on the updated search-related statement. As mentioned, it will be understood that a component of the user interface system 502 may perform a similar modification to the search-related statement and send an updated search-related statement ($q=from main|where a=1) to the semantic processing system 504 as part of a package modification message.

5.1.3. Statement Action Models and Package Action Models

The actions model generator 514 may also generate statement action models and/or package action models. As described herein, a package model may include command models generated from commands of a statement in a data processing package. The command models generated from commands of a particular statement may be related or grouped together as a statement model corresponding to the particular statement. Similarly, action models that correspond to commands from a particular statement may be grouped together as a statement action model. Moreover, the action models and/statement action models generated from a particular data processing package model may be referred to as a package action model.

In certain cases, the actions model generator 514 may generate a statement action model in a manner similar to the way in which it generates action models, e.g., by parsing a package model.

In some cases, the actions model generator 514 may relate action models generated from the commands of a particular statement of the data processing package to generate the statement action model. For example, as described herein, a statement in a data processing package 510 may include multiple commands. The semantic processing system 504 may generate one or more command models from the commands of a particular statement, and the actions model generator 514 may generate one or more action models from the command models. In some such cases, the actions model generator 514 may relate the generated action models to form a statement action model that corresponds to the statement in the data processing package used to generate the actions models. Similarly, the actions model generator 514 may relate the statement action models to a data processing package action models that corresponds to the data processing package used to generate the actions models and statement action models.

5.2. Example User Interfaces

To illustrate the interactions between the user interface system 502 and the semantic processing system 504, consider the following non-limiting examples in reference to FIGS. 7A-7F in which 1) an interaction with one or more search results causes the displayed data processing package 510 and model display objects to be updated, 2) an interaction with one or more model display objects causes the data processing package 510 to be updated, and 3) edits to the displayed data processing package 510 causes the model display objects to be updated.

Figure 7A:
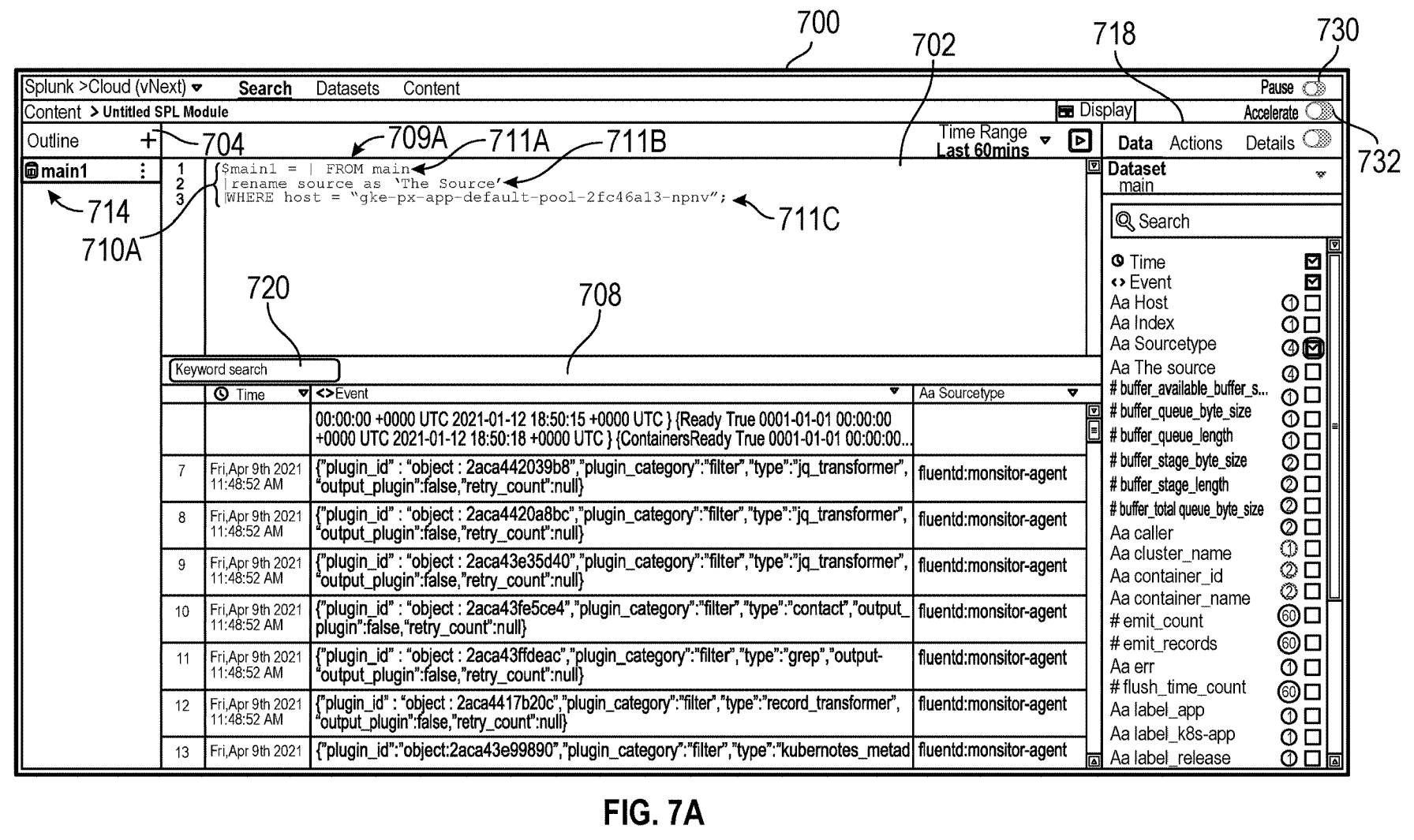
Figure 7B:
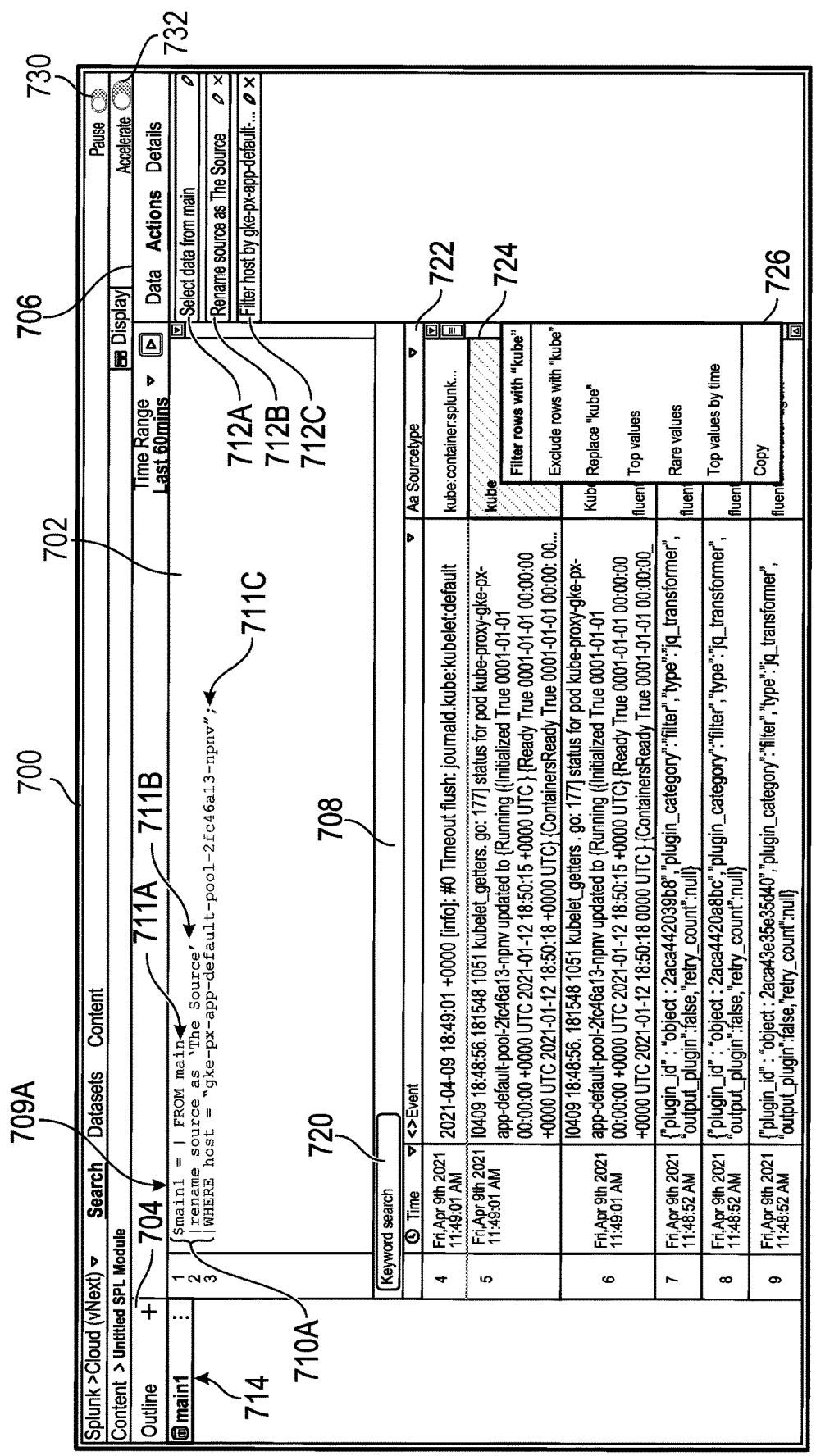
Figure 7C:
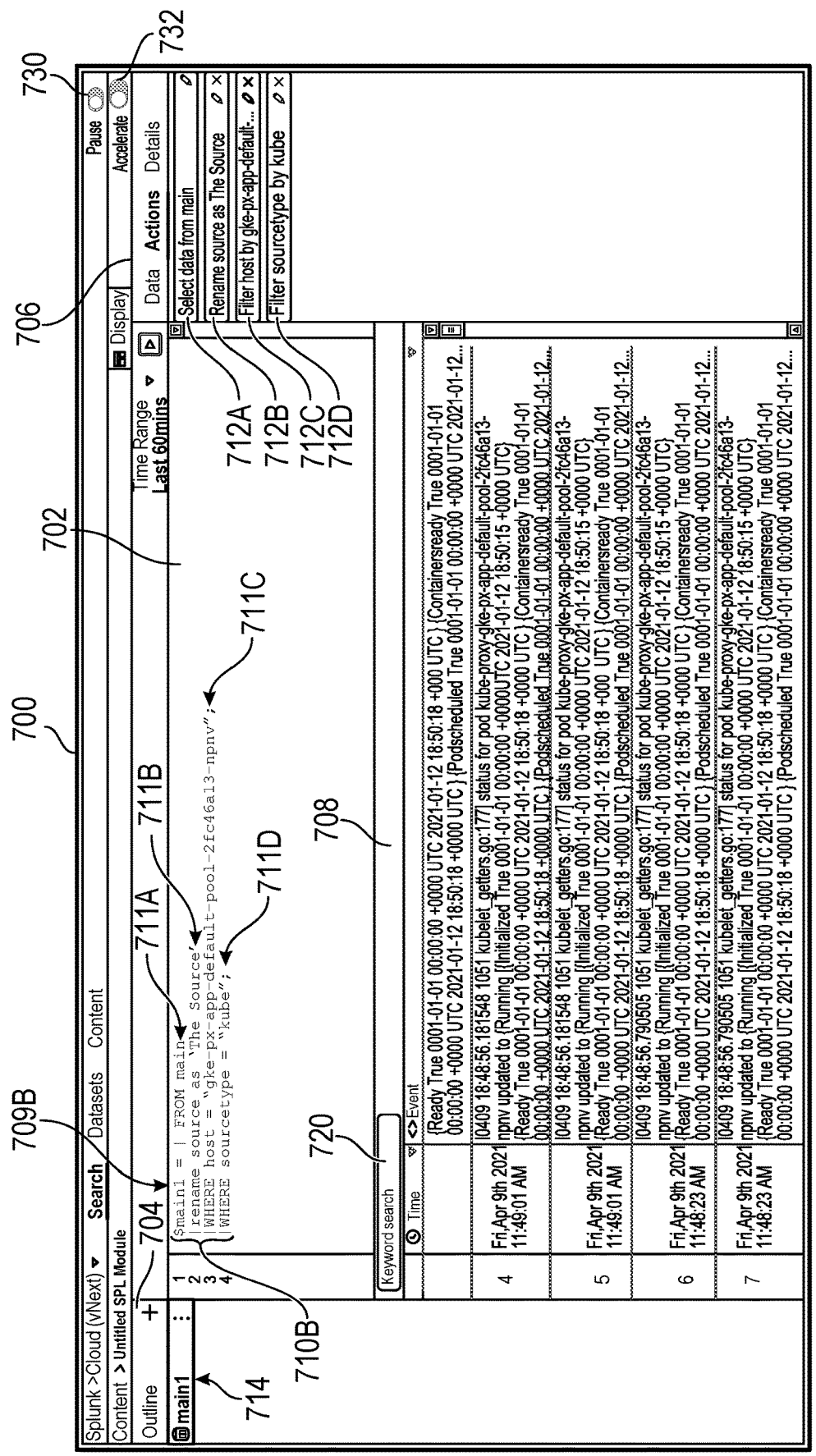
Figure 7D:
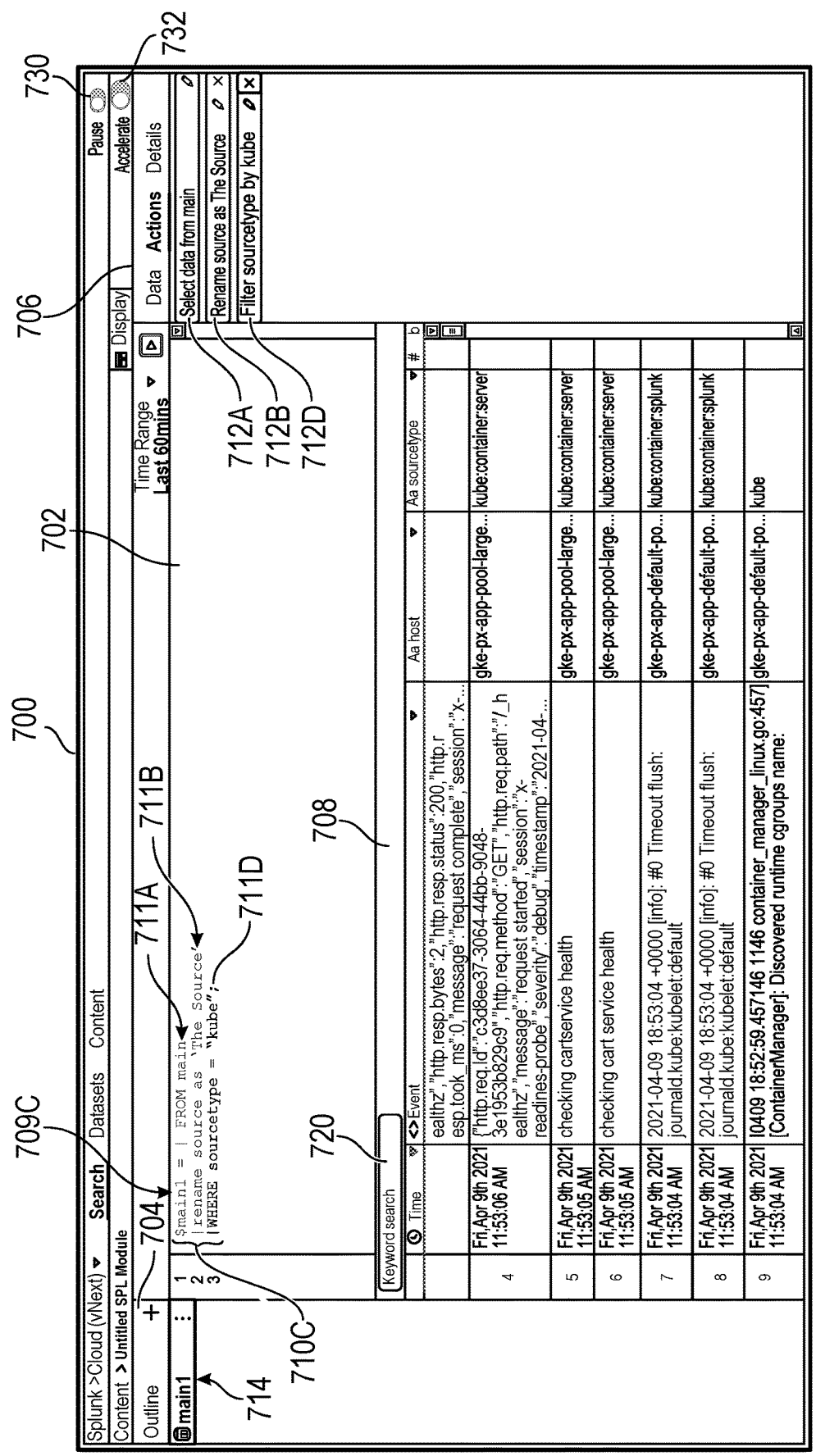

FIG. 7A illustrates an example of a GUI 700. The GUI 700 may be similar to GUI 600 in that it includes a package editor panel 702, time range selector 703, outline panel 704, and search results panel 708 with a keyword search field 720), any combination of which may be displayed concurrently in the GUI 700. The GUI 700 illustrated in FIG. 7A differs, in some respects from GUI 700 in that it includes a data panel 718 in place of a models panel. However, based on a user interaction, the GUI 700 may display a models panel 706, as illustrated in FIGS. 7B-7D. In addition, the GUI 700 displays a different data processing package 709A (non-limiting example of the displayed data processing package 510) than the GUI 600. Specifically, the data processing package 709A includes one search-related statement 710A "main1," which has three commands 711A-711C separated by the delimiters '|.' Accordingly, the outline 714 is different from the outline 614 as are the model display objects 712A-712C (shown in FIG. 7B), which correspond to the commands 711A-711C, respectively.

In certain cases, the data panel 718 may be filled based on one or more queries executed by the data intake and query system 108. The queries may be different from the data search-related statement 710A and may be generated by the user interface system 502 and/or data intake and query system 108. In some cases, the queries may include query parameters to identify additional information about datasets identified in the search-related statement 710A. For example, one additional search-related statement (which may be generated by appending one or more query commands to one or more query commands of the search-related statement 710A) may instruct the data intake and query system 108 to identify some (e.g., most common, most rare, top 10, etc.) or all of the fields within the dataset "main." Another additional search-related statement may instruct the data intake and query system 108 to identify some (e.g., most common, most rare, top 10, etc.) or all keywords found within the dataset "main." Yet other queries may instruct the data intake and query system 108 to calculate averages, sums, or other information about the dataset "main." For example, a search-related statement may request the dataset to provide the number of different fields in the dataset "main."

In some cases, interactions with the data panel 718 may result in the search results (and search results panel 708) being updated. For example, based on the selection of the field "sourcetype" in the data panel, the search results are updated to show the field value for the sourcetype field in the various events. Similar to adding keywords to the keyword search field 720, adding fields via the data panel 718 may or may not cause an update to the data processing package 709A. For example, in some cases, adding a field via the data panel 718 may cause the search results panel 708 to merely update the manner in which the search results are displayed, such as, by showing an additional field of an event. In certain cases, interactions with the data panel 718 may cause the data processing package 709A to be updated. For example, based on an interaction with a result from the additional queries, the user interface system 502 may generate a package modification message and update the data processing package 709A and model summaries 712, similar to the way in which the user interface system 502 does when a user interacts with the search results 512.

FIG. 7B illustrates an example of the GUI 700 in which the models panel 706 has been selected for display. Accordingly, model display objects 712A-712C (e.g., corresponding to models 520) are displayed. As described herein, the action model display objects 712A-712C may correspond to commands in the data processing package 709A. For example, the action model display object 712A may correspond to the command "FROM main," the action model display object 712B may correspond to the command "rename source as 'The Source,'" and the action model display object 712C may correspond to the command "WHERE host= 'gke-ox-app-default-pool-2fc46a13-npnv.'"

In addition, a user has interacted with the search results displayed in the search results panel 708, for example, by clicking on the "sourcetype" field (column) 722, hovering over "kube" in the first pop-up window 724, and then hovering over and clicking the display object associated with "Filter rows with 'kube'" in the second pop-up window 726.

Based on this interaction, the user interface system 502 may determine that the corresponding search results 512 should be filtered based on the selected field value (sourcetype="kube") and generate and communicate a package modification message to the semantic processing system 504. The instructions may be based on the display object selected within the second pop-up window. For example, each display object may be associated with a different command or action, and the user interface system 502 may determine what action is to take place (and therefore what command or parameters to send to the semantic processing system 504) based on the selected display object.

In some cases, the package modification message may include a command line that is to be added to the back-end data processing package 524 and displayed data processing package 709A. For example, the package modification message may include the command "WHERE sourcetype='kube'" with an instruction that it should be added to the end of the back-end data processing package 524 that corresponds to the displayed data processing package 709A.

In certain cases, the package modification message may include certain parameters based on the interaction. For example, the package modification message may (only) include parameters for the relevant command and corresponding field(s), and field value(s), such as "filter, sourcetype, kube." In some such cases, the semantic processing system 504 may determine the exact query parameters or command to add to the back-end data processing package 524 and displayed data processing package 709A. Accordingly, in some cases, the user interface system 502 is unaware of the edits that will be made to the displayed data processing package 510 based on a user's interaction with the search results 512. Furthermore, in certain, the back-end data processing package 524 may be updated before the displayed data processing package 510. In some such cases, the back-end data processing package 524 may include the most current version of the data processing package and the displayed data processing package may include an outdated version of the data processing package (until it is updated) in response to a display modification message.

The semantic processing system 504 may process the package modification message. In this example, as part of processing the package modification message, the semantic processing system 504 may update the back-end data processing package 524 to include a command corresponding to "Filter rows with 'kube,'" generate a data processing package model 526 based on the updated back-end data processing package 524 and respond to the user interface system 502 with a display modification message.

FIG. 7C is a diagram illustrating an example GUI 700 showing the results after the user interface system 502 has processed the display modification message. Specifically, the display modification message may include edits for the displayed data processing package 709A, and an updated data processing package model 526. The user interface system 502 may use the edits to update the displayed data processing package 709A (and search-related statement 710A) to become displayed data processing package 709B (including search-related statement 710B), initiate execution of the updated data processing package 709B (or search-related statement 710B) and display the updated search results in the search results panel 708. In addition, the user interface system 502 may use the updated data processing package model 526 to generate an updated data processing package model and update the model display objects 712A-712D.

The edits for the data processing package 709A may correspond to the command that is to be added to the displayed data processing package 709A. In this example, the edits for the data processing package 709A may include an instruction to add "WHERE sourcetype='kube" to the displayed data processing package 709A. Depending on where the command is to be added, the display modification message may include additional edits to the data processing package 709A. For example, the display modification message may indicate grammatical changes (e.g., the addition of a delimiter, such as 'J' before or after the command to be added), rearranging or modification of existing query command lines, etc. In certain cases, the display modification message may include a replacement data processing package that is to replace the data processing package 709A. For example, rather than providing the user interface system 502 with the differences between the updated and now current back-end data processing package 524, the semantic monitoring system 504 may provide user interface system 502 with the entire data processing package and instruct the user interface system 502 to replace the displayed data processing package 709A with the received data processing package. As a result of processing the display modification message, the user interface system 502 may display an updated data processing package 709B that includes a new command 711D "| WHERE sourcetype='kube" at the end.

The display modification message may, in some cases, instruct the user interface system 502 to execute the updated data processing package. In certain cases, the user interface system 502 may automatically execute the updated data processing package based on a determination that the data processing package has changed. In some cases, the user interface system 502 may wait for a user interaction instructing it to execute the data processing package. The GUI 700 may display the results of the updated data processing package 709B in the search results panel 708.

As described herein, the user interface system 502 may use the received data processing package model 526 to generate an updated outline 518 and/or updated models 520. In the illustrated example of FIG. 7C, the added command 711D "WHERE sourcetype='kube" resulted in a new action model and a corresponding action model display object 712D being displayed in the models panel 706.

Similar to the way in which a user interaction with the search results displayed in the search results panel 708 may result in an updated data processing package 709B and a new action model display object 712D, user interactions with the models panel 706 or model display objects 712A-712D may result in updates to the data processing package 709B.

FIG. 7C illustrates an example of the results of user interaction with the action model display object 712C. Specifically, a user clicks the 'X' proximate the action model display object 712C. Based on the interaction, the user interface system 502 may determine that the command 711C, which corresponds to action model display object 712C, should be deleted from the data processing package 709B. Accordingly, the user interface system 502 may generate and communicate a package modification message to the semantic processing system 504 to delete the command 711C from the back-end data processing package 524 that corresponds to the data processing package 709B.

In some cases, the package modification message may include a copy of the command 711C that is to be deleted. For example, the package modification message may include the command 711C "WHERE host='gke-ox-app-default-pool-2fc46a13-npnv.'" with an instruction that it should be added to the end of the back-end data processing package 524 that corresponds to the displayed data processing package 709A. In certain cases, the package modification message may also include any grammar or delimiters that are to be deleted, such as the '|' before the command 711C.

In certain cases, the package modification message may include certain parameters based on the interaction. For example, the package modification message may (only) include parameters for the relevant command to be deleted, such as "delete, filter, host, gke-ox-app-default-pool-2fc46a13-npnv)." In some cases, the package modification message may include an identifier for the command 711C or its corresponding command model(s). For example, as the action model display object 712C is generated from one or more command models, which in turn were generated from the command 711C, the package modification message may include an identifier for the command models used to generate it and/or an identifier for the command 711C. In some cases, the user interface system 502 may include a lookup table or other data structure that tracks the relationship between query commands, command models, and action models. In some such cases, the user interface system 502 may use the lookup table or reference thereto to identify the command 711C for deletion in the package modification message.

In certain cases, the semantic processing system 504 may determine the query parameters or command to delete from the back-end data processing package 524 and displayed data processing package 709A based on the identifiers received via the package modification message. Accordingly, in some cases, the user interface system 502 is unaware of the edits that will be made to a displayed data processing package 510 (non-limiting example data processing package 609B) based on a user's interaction with the models panel 706. Furthermore, in certain cases, the back-end data processing package 524 may be updated before the displayed data processing package 510. In some such cases, the back-end data processing package 524 may include the most current version of the data processing package and the displayed data processing package 510 may include an outdated version of the data processing package (until it is updated).

The semantic processing system 504 may process the package modification message. In this example, as part of processing the package modification message, the semantic processing system 504 may update the back-end data processing package 524, generate a data processing package model 526 based on the updated back-end data processing package 524, and respond to the user interface system 502 with a display modification message.

FIG. 7D is a diagram illustrating an example GUI 700 showing the results of the user interface system 502 processing the display modification message. Specifically, the display modification message may include edits for the data processing package 709B and an updated data processing package model 526. The user interface system 502 may use the edits to update the data processing package 709B to data processing package 709C (including search-related statement 710C), update the model display objects 712A-712D to remove action model display object 712C, initiate execution of the updated data processing package 709C (or search-related statement 710C), and display the updated search results in the search results panel 708.

In addition, similar to FIGS. 7A-7C, FIG. 7D includes the search-related statement 710 with the command "$main1=| FROM main," as the command 711A and shows the query pause display object 730 and acceleration display object 732 as disabled or deactivated. Given the status of the pause display object 730, the user interface system 502 may automatically send the data processing package 709C and/or the search-related statement 710C to the query system 108 for execution (in some cases, based on determined changes thereto) and display the results in the search results panel 708.

As described herein, the query system 108 may store a copy of the data records retrieved as a result of executing the search-related statement 710C (e.g., as a result of executing command 711A alone and/or in combination with one or more filter criteria, such as time range 60 minutes and/or other filter criteria in the search-related statement 710C) and a copy of the search results. As described herein, the retrieved data records may be stored as retrieved set of data 536 and the search results stored as the query results 538.

As described herein, activating the search acceleration display object 732 may cause the user interface system 502 to directly modify the data processing package 709C and/or search-related statement 710C and/or communicate a data modification message to the semantic processing system 504, receive a display modification message in response, and modify the data processing package 709C and/or search-related statement 710C based on the received display modification message. In either case, the user interface system 502 may modify the data processing package 709C and/or search-related statement 710C by replacing the data source identifier "main" with a different dataset identifier.

Figure 7E:
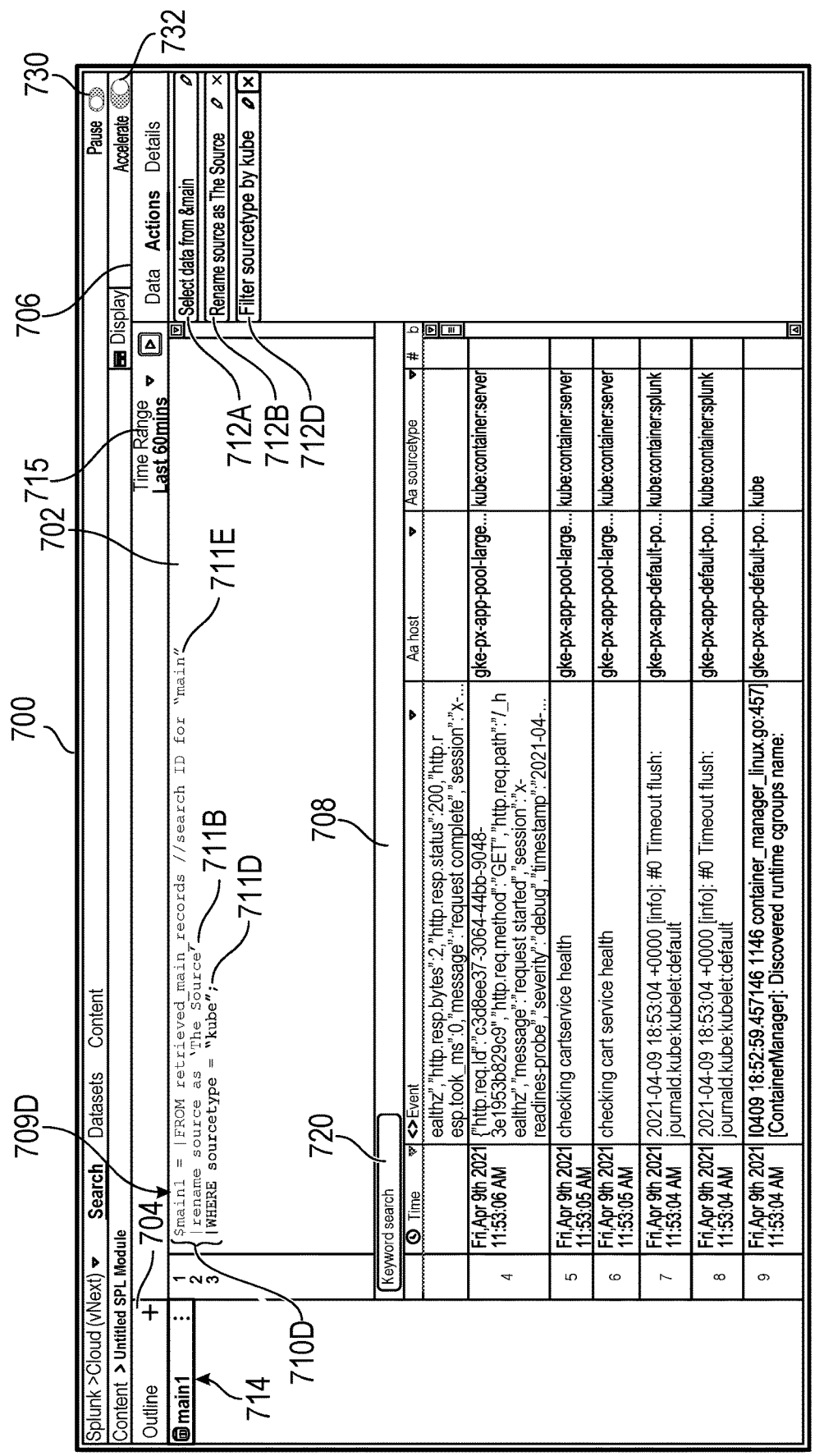

FIG. 7E is a diagram illustrating an example GUI 700 in which the search acceleration display object 732 is enabled or activated. Based on the activation of the 732, the user interface system 502 has updated the data processing package 709C (and search-related statement 710C) to the data processing package 709D (and search-related statement 710D). Specifically, in the illustrated example, the user interface system 502 has replaced the data source identifier "main" (and command 711A) with the dataset identifier "retrieved_main_records" in command 711E.

Although the string "retrieved_main_records," is used as the dataset identifier in the illustrated example, it will be understood that other dataset identifiers may be used. In some cases, the dataset identifier may include or be a search identifier that uniquely identifies the search that was run by the query system 108 as a result of executing the search-related statement 710C. In some such cases, the dataset identifier may include a search identifier ("SID") number, such as SID45324.

By replacing the data source identifier "main," with the dataset identifier "retrieved_main_records" in the command 711E, the user interface system 502 may reduce the compute resources used to execute the search-related statement 710D, reduce or eliminate data retrieved from a data source of the query system 108, reduce the amount of network traffic between components of the query system 108, and reduce the execution time of the search-related statement 710D. For example, as a user further modifies the search-related statement 710D (e.g., by modifying command 711B, command 711D, and/or adding additional commands), the user interface system 502 may communicate the search-related statement 710D to the query system 108. Using the dataset identifier "retrieved_main_records," the query system 108 may use the data records that were retrieved from the relevant data sources when the search-related statement 710C was executed (e.g., the retrieved set of data 536) to execute the query rather than re-retrieving the data records from the data sources.

Depending on the configuration of the query system 108, the retrieved set of data 536 may include some or all of the data in the data source "main." For example, the query system 108 may use one or more filter criteria in or associated with the search-related statement 710D to reduce the quantity of data records retrieved. In some cases, the query system 108 may use the time range 715 as a filter criterion to reduce the data records retrieved from "main." For example, the retrieved set of data 536 may correspond to data records from the data source "main," that have a timestamp that falls within the "last 60 minutes" from when the search-related statement 710D was executed. In certain cases, the query system 108 may use one or more other filter criteria to reduce the data records retrieved from "main." For example, as the command 711D references a field value "kube" for the field "sourcetype," the retrieved set of data 536 may correspond to data records from "main" that have a timestamp within the last sixty minutes and/or that include the sourcetype "kube."

As a user modifies the data processing package 709D or search-related statement 710D, the query system 108 may continue to use the retrieved set of data 536 to execute the query. In some cases, the query system 108 may continue to use the retrieved set of data 536 even if the filter criteria change. For example, if additional filter criteria are included, the retrieved set of data 536 may still contain all of the data that would have been retrieved if the modified displayed data processing package 510 were executed (albeit more than what would have been retrieved). In some such cases, the query system 108 may continue to use the retrieved set of data 536 as using the retrieved set of data 536 uses fewer compute resources and takes less time than re-retrieve in the data records from the data sources.

If the search-related statement 710D begins to refer to data that is not included in the retrieved set of data 536, the user interface system 502 may re-retrieve the data from the data sources (e.g., ignore the "retrieved_main_records" reference). For example, if the user changes the 715 to refer to the "last 24 hours," the user interface system 502 can determine that the search-related statement 710D references data outside of the retrieved set of data 536 and refresh the retrieved set of data 536.

In some cases, the user interface system 502 may refresh the retrieved set of data 536 by executing the updated search-related statement 710D and replacing the dataset identifier "retrieved_main_records" with a new dataset identifier (e.g., "updated_retrieved_main_records"), and/or by changing the reference of the dataset identifier "retrieved_main_records" to point to the updated retrieved set of data 536 (e.g., leave "retrieved_main_records" unchanged but change its reference to point to the location where the updated retrieved set of data 536 is stored). In some cases, if the dataset identifier is a search identifier, the user interface system 502 may replace the older search identifier with the newer search identifier that refers to the more recent results (e.g., replace SID45324 with SID65432). As described herein, the user interface system 502 may update the 510D//directly and/or via communication with the semantic processing system 504.

In certain cases, even if the time range does not change, the search-related statement 710D may refer to data not included in the retrieved set of data 536 by virtue of the fact that time moves forward. For example, ten minutes after executing the search-related statement 710D, the time range 715 will refer to new data (unless it is changed to refer to data that is at least 10 min. old). In some such cases, the user interface system 502 may use a time period threshold (e.g., thirty minutes) to determine whether to refresh the retrieved set of data 536. If the amount of time that has passed since the data records were retrieved from the data sources is greater than the time period threshold, the user interface system 502 may cause the search-related statement 710D to be re-executed without referencing the retrieved set of data 536.

In some cases, when data is to be re-retrieved from the data sources, the user interface system 502 may request that some or all of the relevant data records be retrieved. For example, the user interface system 502 may request that the query system 108 retrieve only the data records that are not already part of the retrieved set of data 536 (e.g., retrieve data records that from 2-24 hours ago because the retrieved set of data 536 already includes the data records from the last hour) or request the query system 108 to re-retrieve all of the data (e.g., retrieve all data records from the last 24 hours including the data records from the last hour).

In some cases, after the user interface system 502 determines an interaction with the search acceleration display object 732, the user interface system 502 can adjust the model summaries 712 to indicate the adjustment in the search parameters. For example, the user interface system 502 includes a first interactive action model summary 712 based on the initial search parameters that retrieved a set of data from a data source. Upon detection of user interaction with the search acceleration display object 732, the user interface system 502 may update the first interactive action model summary 712 to be a second interactive action model summary 712 that provides a description of retrieving the copy of the set of data to be queried by future queries.

Figure 7F:
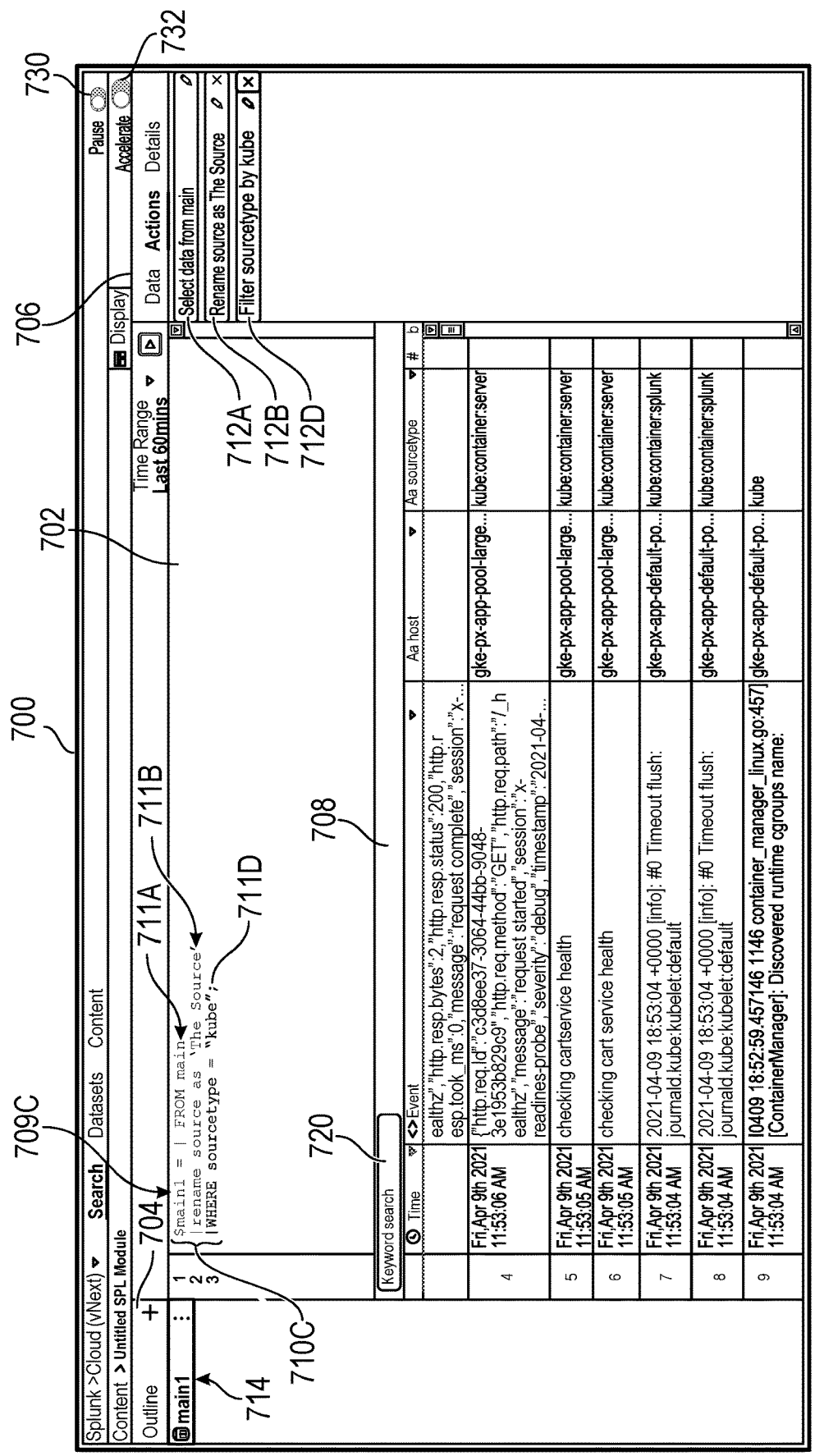

FIG. 7F is a diagram illustrating an example of the GUI 700 in which the search acceleration display object 732 is disabled or deactivated. Based on the deactivation, the dataset identifier "retrieved_main_records" is returned to the data source identifier "main" (and the comment removed). As such, in the illustrated example, the processing package 709D, search-related statement 710D, and command 711E are returned to data processing package 709C and search-related statement 710C, and command 711A, respectively.

Although in the illustrated example, processing package 709D and search-related statement 710D return to data processing package 709C and search-related statement 710C, respectively, it will be understood that if a user makes additional modifications to data processing package 709D and/or search-related statement 710D, the data source identifier (or earlier dataset identifier) may be replaced but the additional modifications may remain when the search acceleration display object 732 is deactivated. In some such cases, data processing package 709D and/or search-related statement 710D may not return to data processing package 709C and search-related statement 710C, respectively.

Although not illustrated in FIGS. 7A-7F, it will be understood that in some cases, the pause display object 730 may be activated. In some such cases, the user interface system 502 may not automatically communicate the displayed data processing package 709A, data processing package 709B, data processing package 709C, and/or data processing package 709D (individually or collectively referred to herein as data processing package 709) to the query system 108 for execution. Instead, the user interface system 502 may way for the user to interact with another display object before communicating the data processing package 709 to the query system 108.

Figure 8:
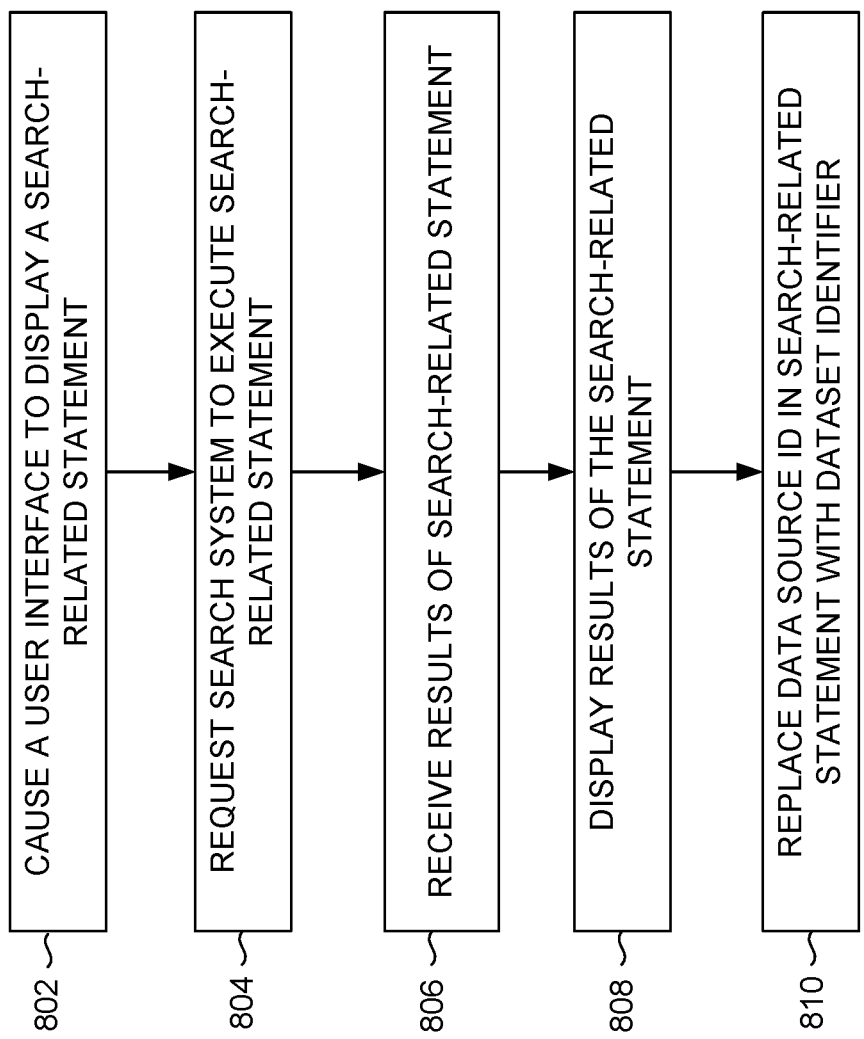
FIG. 8 is a flow diagram illustrating an example of a routine to modify a query to include a dataset identifier.

FIG. 8 is a flow diagram illustrating an example of a routine 800 implemented by one or more computing devices to modify a query to include a dataset identifier. The data flow illustrated in FIG. 8 is provided for illustrative purposes only. It will be understood that one or more of the steps of the routine illustrated in FIG. 8 may be removed or that the ordering of the steps may be changed. Furthermore, for the purposes of illustrating a clear example, one or more particular system components are described in the context of performing various operations during each of the data flow stages. However, other system arrangements and distributions of the processing steps across system components may be used.

At block 802, the user interface system 502 causes a user interface to display a search-related statement in a query editor panel and a search acceleration display object. The search-related statement may be part of a data processing package and may include a data source identifier and at least one command. The data source identifier may identify a data source that includes a set of data to be processed as part of the search-related statement. The command may indicate a function or other transformation that is to be performed on the set of data from the data source identified by the data source identifier. In some cases, the command indicates that the data corresponding to the data source identifier is to be retrieved for processing.

In some cases, the data source identifier may refer to a data source in the query system, such as an index in the query system. In certain cases, the data source identifier may refer to search results from a previously executed search-related statement.

In certain cases, the user interface may also include a package actions panel. The package actions panel may include a first interactive action model summary that corresponds to the command. In some cases, the first interactive action model summary may be displayed within the package actions panel of the user interface system, and the package actions panel may enable editing of the first interactive action model summary. Moreover, the first interactive action model summary may provide a description of the action taken by the query system to execute the command (e.g., retrieve the set of data from the data source).

At block 804, the user interface system requests a search system to execute the search-related statement. As described herein, the search system may be a query system. As part of executing the search-related statement, the query system may retrieve the set of data from the data source and/or process the set of data according to one or more commands in the search-related statement. In retrieving the set of data, the search system may apply filter criteria to the data in the data source. As such, the set of data retrieved may be a subset of the data in the data source. Moreover, when the search system retrieves the set of data, it may generate a copy of the set of data such that the "original" set of data remains in the data source. For example, the search-related statement may define the data source as "main" within a certain time range and the command may indicate one or more transformation to apply to the set of data. The user interface system may first retrieve the data from "main" that satisfies the time range. After retrieving the data, the search system may process the retrieved data according to the commands in the query and return the results of processing the retrieved data to the user interface system. Thus, the results of the search-related statement may be based on the set of data retrieved from the data source.

In some cases, the query system may generate and/or store a copy of the retrieved data and/or the search results. The query system may store the copy of the retrieved data and/or search results with the original set of data or store it separately.

In some cases, the search system may generate a dataset identifier, such as a searchID or other identifier, which references the retrieved data and/or the query results. In some cases, the dataset identifier references the copy of the set of data retrieved from the data source.

At block 806, the user interface system 502 receives the dataset identifier and the results of the search-related statement form the search system. The results of the search-related statement, for example, may include portions of the retrieved data and/or the results of processing the retrieved data. As such, the results of the query may be different from the set of data retrieved from the data source. In certain cases, the results of the query do not include the set of data retrieved from the data source. In some cases, the user interface system 502 may also receive the copy of the set of data retrieved from the data source.

At block 808, the user interface system 502 displays the results of the search-related statement. In some cases, the results can be displayed in a results panel of the user interface. As described herein, the results panel may allow the user to manipulate how the results are displayed to the user or allow further filtering of the displayed data.

At block 810, the user interface system 502 replaces the data source identifier with the dataset identifier to form a modified search-related statement. As described in certain cases, the user interface system may replace the data source identifier based on a determined interaction with the acceleration display object.

In some cases, the user interface system 502 uses the modified search-related statement to execute modified searches. In this way, the user interface system 502 may limit queries to the data source in the query system and/or reduce the amount of data retrieved from the data source during execution of the initial search-related statement. The user interface system 502 may continue to enable modifications to commands to filter through the set of data retrieved by the execution of the modified search-related statement. As each additional change is made, the query system may execute searches using the copy of the retrieved data rather than retrieving the data from the data source.

In certain cases, as part of replacing the data source identifier with the dataset identifier, the user interface system 502 adds a comment in the package editor panel indicating that the data set identifier has been replaced with the dataset identifier. For example, a comment may indicate that rather than querying the data source to create a data set that includes data from "main" in a specific time range, the search-related statement, when executed, will query (only) the results from the initial query rather than the data source.

In some cases, as part of replacing the data source identifier with the dataset identifier, the user interface system 502 communicates one or more parameters (e.g., in a package modification message) to the search-related statement results to a semantic processing system 504. The semantic processing system 504 may be configured to generate an edit for the search related statement. The parameters or package modification message may indicate the adjustment to the search-related statement that has been made or is requested to be made. In response, the semantic processing system 504 generates an edit and provides the edit to the user interface system 502. The user interface system 502 may receive the search-related statement that is to be edited according to the package modification message from the semantic processing system 504. In response to receiving the edit, the user interface system 502 may use the edit or replace the dataset identifier in the search-related statement.

Fewer, more, or different blocks may be included in routine 800. For example, in some cases, based on another interaction, or a second interaction, with the search acceleration display object, the user interface system 502 may replace the dataset identifier in the modified search-related statement with the data source identifier to re-form the search-related statement. For example, if the user interface system 502 receives a second interaction, the system may return the search parameter to the original setting and may query the data source rather than the copy of the data set retrieved from the data source. In some such cases, the query system may continue to retrieve the set of data from the data source until the user interface system receives additional interactions with the acceleration display object.

As described herein, the user interface system 502 may use the retrieved set of data 536 to execute the search-related statements even after the search-related statement is modified. In some such cases, the user interface system 502 may determine that while first modified search-related statement has changed to a second modified search-related statement based on at least one user interaction, the retrieved set of data still includes the data that is the subject of the search.

In certain cases, the user interface system 502 may retrieve a new set of data to execute the search-related statement based on a change of the search-related statement to a second search-related statement. In some cases, this may occur despite the display acceleration object indicating that the copy of the set of data is to be used rather than retrieving the data from the data source.

Specifically, in certain cases, the second modified search-related statement may refer to a second set of data that includes data that is not included in the first set of data. For example, a user may expand the time range associated with the first search-related statement and/or add a data source identifier corresponding to an additional data source. Based on determining that the first modified search-related statement has changed to the second modified search-related statement, the system retrieves the second set of data and uses the second set of data to execute the second modified search-related statement. In some such cases, the user interface system may receive a new dataset identifier or search identifier corresponding to the second set of data (or copy thereof). In certain cases, the user interface system may replace the dataset identifier in the modified query with the new dataset identifier corresponding to the second set of data. In some cases, when retrieving the second set of data, the user interface system 502 may request a copy of the second set of data that it not found in the first set of data and/or request a copy of the entire second set of data. In certain cases, the user interface system 502 requests the second set of data without executing the search-related statement (e.g., performing the commands associated with the search-related statement). In this way, the user interface system 502 may simply request an update to the set of data.

As described herein, in some cases, due to the passage of time or as a result of certain changes to the data processing package, the data processing package may refer to data that is not include in the retrieved set of data 536. For example, a user may expand a time range, change the data source and/or add a new data source, etc. As another example, a threshold time period may pass since the retrieved set of data 536 were retrieved. In some such cases, the user interface system 502 may determine that the search-related statement has been modified and/or refers to data that is not included in the retrieved set of data 536. Based on the determination, the user interface system 502 may request the search system retrieve a second set of data. Along with the second set of data, the system may receive a second dataset identifier that references a copy of the second set of data. The system can replace the first dataset identifier in the second modified search-related statement with the second dataset identifier to form a third modified search-related statement. The third modified search-related statemen may use the copy of the second set of data to execute the third modified search-related statement and will only query the second set of data In certain cases, the second set of data is from at least one data source. In some cases, a set of data can be pulled from multiple data sources to which the user is authorized to access. In certain cases, the second set of data is from a data source that is different from the at least one data source. In certain cases, the second set of data corresponds to a larger time range than the first set of data. For example, the user interface system 502 may receive a change in the time range to increase the time range used to pull the data set from the data source. The increased time range may increase the data to be included in the retrieved set of data. To collect the additional data to be included in the data set, the system may execute a search that collects the additional data.

As described herein, in some cases, the GUI may include an actions panel that, based on a determined interaction with the search acceleration display object, replaces the first interactive action model summary with a second interactive model summary. The actions panel may include a summary or description of retrieving the copy of the set of data to indicate that the copy of the set of data is being used for the query In some cases, updating the search-related statement to refer to the dataset identifier of the retrieved set of data 536 may result in a change to the actions panel or action model summaries. For example, the user interface system 502 may communicate one or more parameters corresponding to the search results to a semantic processing system 504. The semantic processing system 504 may be configured to generate an edit for the search-related statement based on the one or more parameters to generate a package model. After receiving the edit for the search-related system and the package model from the semantic processing system 504, the user interface system 502 may replace the dataset identifier in the search related statement. The dataset identifier may be replaced with the search results identifier to indicate the search results retrieved from the data source to be queried by subsequent commands. The user interface system 502, may then generate a second interactive action model summary based on the package model that provides a description of retrieving the copy of the set of data. The user interface system 502 may then update the package actions panel in the user interface to display the second interactive action model summary.

In certain cases, updating the search-related statement to refer to the dataset identifier of the retrieved set of data 536 may not result in a change to the actions panel or action model summaries. For example, the user interface system 502 may communicate one or more parameters corresponding to the search results to a semantic processing system

504. The semantic processing system 504 may be configured to generate an edit for the search-related statement based on the one or more parameters and generate a package model. After receiving the edit for the search-related system and the package model from the semantic processing system 504, the user interface system 502 may replace the dataset identifier in the search related statement. The dataset identifier may be replaced with the search results identifier to indicate the search results retrieved from the data source to be queried by subsequent commands. The user interface system 502, may then generate a second interactive action model summary based on the package model that provides a description of retrieving the set of data from the data source. The user interface system 502 may then update the package actions panel in the user interface to display the second interactive action model summary.

6.0. EXAMPLES

Various non-limiting examples of the disclosure can be described by the following clauses:

Clause 1. A method, comprising: a user interface to concurrently display: a search-related statement of a data processing package within a package editor panel of the user interface, wherein the package editor panel enables editing of the search-related statement, wherein the search-related statement includes: a data source identifier that identifies a data source, wherein the data source includes a set of data to be processed as part of the search-related statement, and at least one command to process the set of data, and a search acceleration display object; requesting a search system to execute the search-related statement, wherein the search system retrieves the set of data from the data source and processes the set of data according to the at least one command; receiving, from the search system, a dataset identifier and results of the search-related statement, wherein the dataset identifier references a copy of the set of data retrieved from the data source, wherein the results of the search-related statement are based on the set of data retrieved from the data source; displaying the results of the search-related statement in a search results panel of the user interface; and based on a determined interaction with the search acceleration display object, replacing the data source identifier in the search-related statement with the dataset identifier to form a modified search-related statement such that the search system uses the copy of the set of data to execute the modified search-related statement.

Clause 2. The method of clause 1, wherein the data source identifier references results of a previous search-related statement, wherein the data source includes the results of the previous search-related statement.

Clause 3. The method of clause 1, wherein replacing the data source identifier in the search-related statement with the dataset identifier comprises communicating one or more parameters corresponding to the search-related statement results to a semantic processing system, wherein the semantic processing system is configured to generate an edit for the search-related statement based on the one or more parameters; receiving the edit for the search-related statement from the semantic processing system; and replacing the dataset identifier in the search-related statement with the search results identifier based on the edit for the search-related statement.

Clause 4. The method of clause 1, wherein causing the user interface to concurrently display, further comprises causing the user interface to concurrently display a first interactive action model summary within a package actions panel of the user interface, wherein the first interactive action model summary provides a description of retrieving the set of data from the data source, wherein the package actions panel enables editing of the first interactive action model summary.

Clause 5. The method of clause 1, wherein replacing the data source identifier in the search-related statement within the package editor panel with the dataset identifier comprises adding a comment in the package editor panel indicating that the data set identifier has been replaced with the dataset identifier.

Clause 6. The method of clause 1, wherein the determined interaction is a first interaction, the method further comprising: based on a second determined interaction with the search acceleration display object, replacing the dataset identifier in the modified search-related statement with the data source identifier to re-form the search-related statement such that the search system uses the data source to retrieve the set of data as part of the search-related statement.

Clause 7. The method of clause 1, wherein the modified search-related statement is a first modified search-related statement, the method further comprising: determining that the first modified search-related statement has changed to a second modified search-related statement based on at least one user interaction, wherein the second modified search-related statement refers to a second set of data that includes data that is not included in the first set of data; and based on determining that the first modified search-related statement has changed to the second modified search-related statement, requesting the search system to retrieve the second set of data such that the search system uses a copy of the second set of data to execute the second modified search-related statement.

Clause 8. The method of clause 1, wherein the modified search-related statement is a first modified search-related statement, the dataset identifier is a first dataset identifier, the method further comprising: determining that the first modified search-related statement has changed to a second modified search-related statement based on at least one user interaction, wherein the second modified search-related statement refers to a second set of data that includes data that is not included in the first set of data; based on determining that the first modified search-related statement has changed to the second modified search-related statement, requesting the search system to retrieve the second set of data; receiving, from the search system, a second dataset identifier, wherein the second dataset identifier references a copy of the second set of data; and replacing the first dataset identifier in the second modified search-related statement with the second dataset identifier to form a third modified search-related statement such that the search system uses the copy of the second set of data to execute the third modified search-related statement.

Clause 9. The method of clause 8, wherein the second set of data is from the at least one data source.

Clause 10. The method of clause 8, wherein the second set of data corresponds to a larger time range than the first set of data.

Clause 11. The method of clause 8, wherein the second set of data is from a data source different from the at least one data source.

Clause 12. The method of clause 4, further comprising based on a determined interaction with the search acceleration display object, replacing the first interactive action model summary with a second interactive model summary, wherein the second interactive action model summary provides a description of retrieving the copy of the set of data.

Clause 13. The method of clause 4, wherein replacing the data source identifier in the search-related statement with dataset identifier, further comprises: communicating one or more parameters corresponding to the search results to a semantic processing system, wherein the semantic processing system is configured to generate an edit for the search-related statement based on the one or more parameters and generate a package model based on the one or more parameters; receiving the edit for the search-related statement and the package model from the semantic processing system; replacing the dataset identifier in the search-related statement with the search results identifier based on the edit for the search-related statement; generating a second interactive action model summary based on the package model, wherein the second interactive action model summary provides a description of retrieving the set of data from the data source; and updating the package actions panel in the user interface to display the second interactive action model summary.

Clause 14. The method of clause 4, wherein replacing the data source identifier in the search-related statement with dataset identifier, further comprises: communicating one or more parameters corresponding to the search results to a semantic processing system, wherein the semantic processing system is configured to generate an edit for the search-related statement based on the one or more parameters and generate a package model based on the one or more parameters; receiving the edit for the search-related statement and the package model from the semantic processing system; replacing the dataset identifier in the search-related statement with the search results identifier based on the edit for the search-related statement; generating a second interactive action model summary based on the package model, wherein the second interactive action model summary provides a description of retrieving the copy of the set of data; and updating the package actions panel in the user interface to display the second interactive action model summary.

Clause 15. A system, comprising: a data store; and one or more processors configured to: cause a user interface to concurrently display: a search-related statement of a data processing package within a package editor panel of the user interface, wherein the package editor panel enables editing of the search-related statement, wherein the search-related statement includes: a data source identifier that identifies a data source, wherein the data source includes a set of data to be processed as part of the search-related statement, and at least one command to process the set of data, and a search acceleration display object; request a search system to execute the search-related statement, wherein the search system retrieves the set of data from the data source and processes the set of data according to the at least one command; receive, from the search system, a dataset identifier and results of the search-related statement, wherein the dataset identifier references a copy of the set of data retrieved from the data source, wherein the results of the search-related statement are based on the set of data retrieved from the data source; display the results of the search-related statement in a search results panel of the user interface; and based on a determined interaction with the search acceleration display object, replace the data source identifier in the search-related statement with the dataset identifier to form a modified search-related statement such that the search system uses the copy of the set of data to execute the modified search-related statement.

Clause 16. The system of clause 15, wherein the determined interaction is a first interaction, wherein the one or more processors are further configured to: based on a second determined interaction with the search acceleration display object, replace the dataset identifier in the modified search-related statement with the data source identifier to re-form the search-related statement such that the search system uses the data source to retrieve the set of data as part of the search-related statement.

Clause 17. The system of clause 15, wherein the modified search-related statement is a first modified search-related statement, wherein the one or more processors are further configured to: determine that the first modified search-related statement has changed to a second modified search-related statement based on at least one user interaction, wherein the second modified search-related statement refers to a second set of data that includes data that is not included in the first set of data; and based on determining that the first modified search-related statement has changed to the second modified search-related statement, request the search system to retrieve the second set of data such that the search system uses a copy of the second set of data to execute the second modified search-related statement.

Clause 18. The system of clause 15, wherein the modified search-related statement is a first modified search-related statement, the dataset identifier is a first dataset identifier, wherein the one or more processors are further configured to: determine that the first modified search-related statement has changed to a second modified search-related statement based on at least one user interaction, wherein the second modified search-related statement refers to a second set of data that includes data that is not included in the first set of data; based on determine that the first modified search-related statement has changed to the second modified search-related statement, request the search system to retrieve the second set of data; receive, from the search system, a second dataset identifier, wherein the second dataset identifier references a copy of the second set of data; and replace the first dataset identifier in the second modified search-related statement with the second dataset identifier to form a third modified search-related statement such that the search system uses the copy of the second set of data to execute the third modified search-related statement.

Clause 19. Non-transitory computer-readable media including computer-executable instructions that, when executed by a computing system, cause the computing system to: cause a user interface to concurrently display: a search-related statement of a data processing package within a package editor panel of the user interface, wherein the package editor panel enables editing of the search-related statement, wherein the search-related statement includes: a data source identifier that identifies a data source, wherein the data source includes a set of data to be processed as part of the search-related statement, and at least one command to process the set of data, and a search acceleration display object; request a search system to execute the search-related statement, wherein the search system retrieves the set of data from the data source and processes the set of data according to the at least one command; receive, from the search system, a dataset identifier and results of the search-related statement, wherein the dataset identifier references a copy of the set of data retrieved from the data source, wherein the results of the search-related statement are based on the set of data retrieved from the data source; display the results of the search-related statement in a search results panel of the user interface; and based on a determined interaction with the search acceleration display object, replace the data source identifier in the search-related statement with the dataset identifier to form a modified search-related statement such that the search system uses the copy of the set of data to execute the modified search-related statement.

Clause 20. The non-transitory computer-readable media of clause 19, wherein the modified search-related statement is a first modified search-related statement, the dataset identifier is a first dataset identifier, wherein the computer-executable instructions further cause the computing system to: determine that the first modified search-related statement has changed to a second modified search-related statement based on at least one user interaction, wherein the second modified search-related statement refers to a second set of data that includes data that is not included in the first set of data; based on determine that the first modified search-related statement has changed to the second modified search-related statement, request the search system to retrieve the second set of data; receive, from the search system, a second dataset identifier, wherein the second dataset identifier references a copy of the second set of data; and replace the first dataset identifier in the second modified search-related statement with the second dataset identifier to form a third modified search-related statement such that the search system uses the copy of the second set of data to execute the third modified search-related statement.

Clause 21. A method, comprising: causing a user interface to concurrently display: a first search-related statement of a data processing package within a package editor panel of the user interface, wherein the package editor panel enables editing of the first search-related statement, wherein the first search-related statement includes: a first dataset identifier that identifies a first set of data to be processed as part of the search-related statement, wherein the first set of data is a copy of data retrieved from at least one data source, and at least one command to process the first set of data, and a display object indicating copies of sets of data are to be used to execute the first search-related statement; determining that the first search-related statement has changed to a second search-related statement based on at least one user interaction, wherein the second search-related statement refers to a second set of data that includes data that is not included in the first set of data; and based on determining that the first search-related statement has changed to the second search-related statement: requesting a search system to retrieve a copy of the second set of data, and updating the first dataset identifier to refer to the copy of the second set of data.

Clause 22. The method of clause 21, wherein the data retrieved from the at least one data source is a subset of data stored by the at least one data source.

Clause 23. The method of clause 21, wherein the first dataset identifier is a first search identifier and the second dataset identifier is a second search identifier.

Clause 24. The method of clause 21, wherein updating the first dataset identifier comprises replacing the first dataset identifier with a second dataset identifier that is different from the first dataset identifier.

Clause 25. The method of clause 21, wherein updating the first dataset identifier comprises causing the first dataset identifier to change its reference from the first set of data to the copy of the second set of data.

Clause 26. The method of clause 21, further comprising: requesting the search system to execute the second search-related statement, wherein the search system retrieves the copy of the second set of data and processes the copy of the second set of data according to the at least one command; and displaying the results of the second search-related statement in a search results panel of the user interface.

7.0. Terminology

Computer programs typically comprise one or more instructions set at various times in various memory devices of a computing device, which, when read and executed by at least one processor, will cause a computing device to execute command tokens involving the disclosed techniques. In some embodiments, a carrier containing the aforementioned computer program product is provided. The carrier is one of an electronic signal, an optical signal, a radio signal, or a non-enriched computer-readable storage medium.

Any or all of the features and functions described above may be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "may," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. Furthermore, use of "e.g.," is to be interpreted as providing a non-limiting example and does not imply that two things are identical or necessarily equate to each other.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements may be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is understood with the context as used in general to convey that an item, term, etc. may be either X, Y or Z, or any combination thereof. Thus, such conjunctive language is not generally intended to imply that certain embodiments require at least one of X, at least one of Y and at least one of Z to each be present. Further, use of the phrase "at least one of X, Y or Z" as used in general is to convey that an item, term, etc. may be either X, Y or Z, or any combination thereof.

In some embodiments, certain operations, acts, events, or functions of any of the algorithms described herein may be performed in a different sequence, may be added, merged, or left out altogether (e.g., not all are necessary for the practice of the algorithms). In certain embodiments, operations, acts, functions, or events may be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems may be distributed across multiple machines, networks, and other computing resources. Two or more components of a system may be combined into fewer components. Various components of the illustrated systems may be implemented in one or more virtual machines or an isolated execution environment, rather than in dedicated computer hardware systems and/or computing devices. Likewise, the data repositories shown may represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown may communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-enriched computer-readable memory that may direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention may be modified, if necessary, to employ the systems, functions, and concepts of the various references described above to provide yet further implementations of the invention. These and other changes may be made to the invention in light of the above Detailed Description. While the above description describes certain examples of the invention, and describes the best mode contemplated, no matter how detailed the above appears in text, the invention may be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C sec. 112(f)(AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A method, comprising:
a user interface to concurrently display:
a search-related statement of a data processing package within a package editor panel of the user interface, wherein the package editor panel enables editing of the search-related statement, wherein the search-related statement includes:
a data source identifier that identifies a data source, wherein the data source includes a set of data to be processed as part of the search-related statement, and
at least one command to process the set of data, and
a search acceleration display object;
requesting a search system to execute the search-related statement, wherein the search system retrieves the set of data from the data source and processes the set of data according to the at least one command;
receiving, from the search system, a dataset identifier and results of the search-related statement, wherein the dataset identifier references a copy of the set of data retrieved from the data source, wherein the results of the search-related statement are based on the set of data retrieved from the data source;
displaying the results of the search-related statement in a search results panel of the user interface; and
based on a determined interaction with the search acceleration display object, replacing the data source identifier in the search-related statement within the package editor panel of the user interface with the dataset identifier to form a modified search-related statement such that the search system uses the copy of the set of data to execute the modified search-related statement.

2. The method of claim 1, wherein the data source identifier references results of a previous search-related statement, wherein the data source includes the results of the previous search-related statement.

3. The method of claim 1, wherein replacing the data source identifier in the search-related statement with the dataset identifier comprises communicating one or more parameters corresponding to the search-related statement results to a semantic processing system, wherein the semantic processing system is configured to generate an edit for the search-related statement based on the one or more parameters;
receiving the edit for the search-related statement from the semantic processing system; and
replacing the dataset identifier in the search-related statement with the search results identifier based on the edit for the search-related statement.

4. The method of claim 1, wherein causing the user interface to concurrently display, further comprises causing the user interface to concurrently display a first interactive action model summary within a package actions panel of the user interface, wherein the first interactive action model summary provides a description of retrieving the set of data from the data source, wherein the package actions panel enables editing of the first interactive action model summary.

5. The method of claim 1, wherein replacing the data source identifier in the search-related statement within the package editor panel with the dataset identifier comprises adding a comment in the package editor panel indicating that the data source identifier has been replaced with the dataset identifier.

6. The method of claim 1, wherein the determined interaction is a first interaction, the method further comprising:
based on a second determined interaction with the search acceleration display object, replacing the dataset identifier in the modified search-related statement with the data source identifier to re-form the search-related statement such that the search system uses the data source to retrieve the set of data as part of the search-related statement.

7. The method of claim 1, wherein the modified search-related statement is a first modified search-related statement, the method further comprising:
determining that the first modified search-related statement has changed to a second modified search-related statement based on at least one user interaction, wherein the second modified search-related statement refers to a second set of data that includes data that is not included in the first set of data; and
based on determining that the first modified search-related statement has changed to the second modified search-related statement, requesting the search system to retrieve the second set of data such that the search system uses a copy of the second set of data to execute the second modified search-related statement.

8. The method of claim 1, wherein the modified search-related statement is a first modified search-related statement, the dataset identifier is a first dataset identifier, the method further comprising:
determining that the first modified search-related statement has changed to a second modified search-related statement based on at least one user interaction, wherein the second modified search-related statement refers to a second set of data that includes data that is not included in the first set of data;
based on determining that the first modified search-related statement has changed to the second modified search-related statement, requesting the search system to retrieve the second set of data;
receiving, from the search system, a second dataset identifier, wherein the second dataset identifier references a copy of the second set of data; and
replacing the first dataset identifier in the second modified search-related statement with the second dataset identifier to form a third modified search-related statement such that the search system uses the copy of the second set of data to execute the third modified search-related statement.

9. The method of claim 8, wherein the second set of data is from the at least one data source.

10. The method of claim 8, wherein the second set of data corresponds to a larger time range than the first set of data.

11. The method of claim 8, wherein the second set of data is from a data source different from the at least one data source.

12. The method of claim 4, further comprising based on a determined interaction with the search acceleration display object, replacing the first interactive action model summary with a second interactive model summary, wherein the second interactive action model summary provides a description of retrieving the copy of the set of data.

13. The method of claim 4, wherein replacing the data source identifier in the search-related statement with dataset identifier, further comprises:
communicating one or more parameters corresponding to the search results to a semantic processing system, wherein the semantic processing system is configured to generate an edit for the search-related statement based on the one or more parameters and generate a package model based on the one or more parameters;

receiving the edit for the search-related statement and the package model from the semantic processing system;

replacing the dataset identifier in the search-related statement with the search results identifier based on the edit for the search-related statement;

generating a second interactive action model summary based on the package model, wherein the second interactive action model summary provides a description of retrieving the set of data from the data source; and updating the package actions panel in the user interface to display the second interactive action model summary.

14. The method of claim 4, wherein replacing the data source identifier in the search-related statement with dataset identifier, further comprises:

communicating one or more parameters corresponding to the search results to a semantic processing system, wherein the semantic processing system is configured to generate an edit for the search-related statement based on the one or more parameters and generate a package model based on the one or more parameters;

receiving the edit for the search-related statement and the package model from the semantic processing system;

replacing the dataset identifier in the search-related statement with the search results identifier based on the edit for the search-related statement;

generating a second interactive action model summary based on the package model, wherein the second interactive action model summary provides a description of retrieving the copy of the set of data; and updating the package actions panel in the user interface to display the second interactive action model summary.

15. A system, comprising:

a data store; and one or more processors configured to:

cause a user interface to concurrently display:

a search-related statement of a data processing package within a package editor panel of the user interface, wherein the package editor panel enables editing of the search-related statement, wherein the search-related statement includes:

a data source identifier that identifies a data source, wherein the data source includes a set of data to be processed as part of the search-related statement, and at least one command to process the set of data, and a search acceleration display object;

request a search system to execute the search-related statement, wherein the search system retrieves the set of data from the data source and processes the set of data according to the at least one command;

receive, from the search system, a dataset identifier and results of the search-related statement, wherein the dataset identifier references a copy of the set of data retrieved from the data source, wherein the results of the search-related statement are based on the set of data retrieved from the data source;

display the results of the search-related statement in a search results panel of the user interface; and based on a determined interaction with the search acceleration display object, replace the data source identifier in the search-related statement within the package editor panel of the user interface with the dataset identifier to form a modified search-related statement such that the search system uses the copy of the set of data to execute the modified search-related statement.

16. The system of claim 15, wherein the determined interaction is a first interaction, wherein the one or more processors are further configured to:

based on a second determined interaction with the search acceleration display object, replace the dataset identifier in the modified search-related statement with the data source identifier to re-form the search-related statement such that the search system uses the data source to retrieve the set of data as part of the search-related statement.

17. The system of claim 15, wherein the modified search-related statement is a first modified search-related statement, wherein the one or more processors are further configured to:

determine that the first modified search-related statement has changed to a second modified search-related statement based on at least one user interaction, wherein the second modified search-related statement refers to a second set of data that includes data that is not included in the first set of data; and based on determining that the first modified search-related statement has changed to the second modified search-related statement, request the search system to retrieve the second set of data such that the search system uses a copy of the second set of data to execute the second modified search-related statement.

18. The system of claim 15, wherein the modified search-related statement is a first modified search-related statement, the dataset identifier is a first dataset identifier, wherein the one or more processors are further configured to:

determine that the first modified search-related statement has changed to a second modified search-related statement based on at least one user interaction, wherein the second modified search-related statement refers to a second set of data that includes data that is not included in the first set of data;

based on determine that the first modified search-related statement has changed to the second modified search-related statement, request the search system to retrieve the second set of data;

receive, from the search system, a second dataset identifier, wherein the second dataset identifier references a copy of the second set of data; and replace the first dataset identifier in the second modified search-related statement with the second dataset identifier to form a third modified search-related statement such that the search system uses the copy of the second set of data to execute the third modified search-related statement.

19. Non-transitory computer-readable media including computer-executable instructions that, when executed by a computing system, cause the computing system to:

cause a user interface to concurrently display:

a search-related statement of a data processing package within a package editor panel of the user interface, wherein the package editor panel enables editing of the search-related statement, wherein the search-related statement includes:

a data source identifier that identifies a data source, wherein the data source includes a set of data to be processed as part of the search-related statement, and at least one command to process the set of data, and a search acceleration display object;

request a search system to execute the search-related statement, wherein the search system retrieves the set of data from the data source and processes the set of data according to the at least one command;

receive, from the search system, a dataset identifier and results of the search-related statement, wherein the dataset identifier references a copy of the set of data retrieved from the data source, wherein the results of the search-related statement are based on the set of data retrieved from the data source;

display the results of the search-related statement in a search results panel of the user interface; and based on a determined interaction with the search acceleration display object, replace the data source identifier in the search-related statement within the package editor panel of the user interface with the dataset identifier to form a modified search-related statement such that the search system uses the copy of the set of data to execute the modified search-related statement.

20. The non-transitory computer-readable media of claim 19, wherein the modified search-related statement is a first modified search-related statement, the dataset identifier is a first dataset identifier, wherein the computer-executable instructions further cause the computing system to:

determine that the first modified search-related statement has changed to a second modified search-related statement based on at least one user interaction, wherein the second modified search-related statement refers to a second set of data that includes data that is not included in the first set of data;

based on determine that the first modified search-related statement has changed to the second modified search-related statement, request the search system to retrieve the second set of data;

receive, from the search system, a second dataset identifier, wherein the second dataset identifier references a copy of the second set of data; and replace the first dataset identifier in the second modified search-related statement with the second dataset identifier to form a third modified search-related statement such that the search system uses the copy of the second set of data to execute the third modified search-related statement.

* * * * *